US011975277B2

(12) United States Patent
Oomori

(10) Patent No.: US 11,975,277 B2
(45) Date of Patent: May 7, 2024

(54) FILTRATION DEVICE, AND FILTRATION SYSTEM

(71) Applicant: MITSUBISHI KAKOKI KAISHA, LTD., Kanagawa (JP)

(72) Inventor: Kazuki Oomori, Kanagawa (JP)

(73) Assignee: MITSUBISHI KAKOKI KAISHA, LTD., Kanagawa (JP)

( * ) Notice: Subject to any disclaimer, the term of this patent is extended or adjusted under 35 U.S.C. 154(b) by 54 days.

(21) Appl. No.: 18/029,012

(22) PCT Filed: Sep. 17, 2021

(86) PCT No.: PCT/JP2021/034434
§ 371 (c)(1),
(2) Date: Mar. 28, 2023

(87) PCT Pub. No.: WO2022/071002
PCT Pub. Date: Apr. 7, 2022

(65) Prior Publication Data
US 2023/0294023 A1    Sep. 21, 2023

(30) Foreign Application Priority Data

Sep. 29, 2020 (WO) .................. PCT/JP2020/037014
Sep. 29, 2020 (WO) .................. PCT/JP2020/037015
(Continued)

(51) Int. Cl.
*B01D 35/06* (2006.01)
(52) U.S. Cl.
CPC .................................... *B01D 35/06* (2013.01)

(58) Field of Classification Search
CPC ...................................................... B01D 35/06
See application file for complete search history.

(56) References Cited

U.S. PATENT DOCUMENTS 4,569,739 A   2/1986 Klinkowski
4,778,584 A   10/1988 Inoue et al.
(Continued)

FOREIGN PATENT DOCUMENTS

JP   S48-095662 A    2/1973
JP   S48-004161 B1   12/1973
(Continued)

OTHER PUBLICATIONS

Jul. 5, 2022, Decision to Grant a Patent for related JP application No. 2022-505363.
(Continued)

*Primary Examiner* — Brian W Cohen
(74) *Attorney, Agent, or Firm* — Paratus Law Group, PLLC

(57) ABSTRACT

A filtration device includes a first electrode provided with a plurality of first openings. a second electrode provided with a plurality of second openings and provided to face one surface of the first electrode, a filter medium provided with a plurality of apertures and provided between the first electrode and the second electrode, a filter chamber provided in contact with the other surface of the first electrode and supplied with a material to be treated containing particles to be separated and a liquid, and a third electrode facing the first electrode across the filter chamber.

14 Claims, 24 Drawing Sheets

(30) Foreign Application Priority Data

Oct. 30, 2020 (WO) .................. PCT/JP2020/040886
Oct. 30, 2020 (WO) .................. PCT/JP2020/040888

(56) References Cited

U.S. PATENT DOCUMENTS

| | | | |
|---|---|---|---|
| 5,468,385 A | | 11/1995 | Inoue |
| 5,785,834 A | * | 7/1998 | Thompson ............... B03C 5/02 |
| | | | 204/571 |
| 2004/0129654 A1 | | 7/2004 | Posten |
| 2005/0072675 A1 | | 4/2005 | Dudziak et al. |
| 2018/0050935 A1 | | 2/2018 | Kundalgurki |

FOREIGN PATENT DOCUMENTS

| | | |
|---|---|---|
| JP | S50-076657 A | 6/1975 |
| JP | S59-193111 A | 11/1984 |
| JP | S61-018410 A | 1/1986 |
| JP | S61-161108 A | 7/1986 |
| JP | S62-071509 A | 4/1987 |
| JP | S62-216616 A | 9/1987 |
| JP | S63-176512 U | 11/1988 |
| JP | H07-100302 A | 4/1995 |
| JP | H11-300170 A | 11/1999 |
| JP | 2005-254118 A | 9/2005 |
| JP | 2008-290008 A | 12/2008 |
| JP | 2012-239946 A | 12/2012 |
| WO | WO 2004/045748 A1 | 6/2004 |
| WO | WO 2008/142868 A1 | 11/2008 |

OTHER PUBLICATIONS

Nov. 9, 2021, International Search Report for related PCT application No. PCT/JP2021/034434.
Nov. 9, 2021, International Search Opinion for related PCT application No. PCT/JP2021/034434.
Apr. 12, 2022, Notice of Reasons for Refusal for related JP application No. 2022-505363.
Nov. 24, 2022, International Search Report for related PCT application No. PCT/JP2020/037014.
Nov. 24, 2022, International Search Opinion for related PCT application No. PCT/JP2020/037014.
Nov. 24, 2022, International Search Report for related PCT application No. PCT/JP2020/037015.
Nov. 24, 2022, International Search Opinion for related PCT application No. PCT/JP2020/037015.
Dec. 1, 2020, International Search Report for related PCT application No. PCT/JP2020/040886.
Dec. 1, 2020, International Search Opinion for related PCT application No. PCT/JP2020/040886.
Dec. 1, 2020, International Search Report for related PCT application No. PCT/JP2020/040888.
Dec. 1, 2020, International Search Opinion for related PCT application No. PCT/JP2020/040888.
Oct. 2, 2023, European Search Report issued for related EP Application No. 21875304.4.

* cited by examiner

FILTRATION DEVICE, AND FILTRATION SYSTEM

CROSS REFERENCE TO PRIOR APPLICATION

This application is a National Stage Patent Application of PCT International Patent Application No. PCT/JP2021/034434 (filed on Sep. 17, 2021) under 35 U.S.C. § 371, which claims priority to International Application Nos. PCT/JP2020/037014 (filed on Sep. 29, 2020), PCT/JP2020/037015 (filed on Sep. 29, 2020), PCT/JP2020/040886 (filed on Oct. 30, 2020), and PCT/JP2020/040888 (filed on Oct. 30, 2020), which are all hereby incorporated by reference in their entirety.

TECHNICAL FIELD

The present disclosure relates to a filtration device and a filtration system.

BACKGROUND ART

For a solid-liquid separation by the filtration of particle fluid system slurry, a method is known, which separates particles from liquid using electroosmosis or electrophoresis (see Patent Literatures 1 and 2, for example). The solid-liquid separation using electroosmosis is a method of applying voltage and pressure to a cake layer interposed between electrodes, and expelling moisture in the cake layer through a filter medium by electroosmosis. The solid-liquid separation using electrophoresis is a method of moving particles in a slurry by electrophoresis and bringing the particles into direct contact with a filter medium to separate the particles in the slurry.

CITATION LIST

Patent Literature

Patent Literature 1: JP-A-S61-018410
Patent Literature 2: WO 2004/045748 A

SUMMARY OF INVENTION

Technical Problem

Regarding the method that performs solid-liquid separation by bringing the particles in the slurry into direct contact with the filter medium, there is a possibility that the filtration rate will decrease due to clogging of the filter medium.

An object of the present disclosure is to provide a filtration device and a filtration system capable of improving filtration rate.

Solution to Problem

A filtration device according to a first aspect of the present disclosure includes: a first electrode provided with a plurality of first openings; a second electrode provided with a plurality of second openings and provided to face one surface of the first electrode; a filter medium provided with a plurality of apertures and provided between the first electrode and the second electrode; a filter chamber provided in contact with the other surface of the first electrode and supplied with a material to be treated containing particles to be separated and a liquid; and a third electrode facing the first electrode across the filter chamber.

A filtration system according to a second aspect of the present disclosure includes a first filtration device and a second filtration device, in which each of the first filtration device and the second filtration device includes: a first electrode provided with a plurality of first openings; a second electrode provided with a plurality of second openings and provided to face one surface of the first electrode; a filter medium provided with a plurality of apertures and provided between the first electrode and the second electrode; a first filter chamber provided in contact with the other surface of the first electrode; a third electrode provided in the first filter chamber and facing the first electrode; and a second filter chamber provided in contact with the other surface of the second electrode, and an intermediate treated material in the second filter chamber of the first filtration device is supplied to the first filter chamber of the second filtration device.

A filtration device according to a third aspect of the present disclosure includes a plurality of filtration units, in which the filtration unit includes: a first electrode provided with a plurality of first openings; a second electrode provided with a plurality of second openings and provided to face one surface of the first electrode; a filter medium provided with a plurality of apertures and provided between the first electrode and the second electrode; a first filter chamber provided in contact with the other surface of the first electrode; and a third electrode provided in the first filter chamber and facing the first electrode, and two of the filtration units are arranged side by side in one direction, and include a second filter chamber provided between the two second electrodes.

Advantageous Effects of Invention

According to the filtration device and the filtration system of the present disclosure, the filtration rate is improved.

DESCRIPTION OF EMBODIMENTS

Hereinafter, the present disclosure will be described in detail with reference to the drawings. The present disclosure is not limited by the following modes for carrying out the invention (hereinafter referred to as embodiments). Components in the following embodiments include components that can be easily assumed by a person skilled in the art, those that are substantially the same, and those that fall within a so-called equivalent range. The components disclosed in the following embodiments can be combined as appropriate.

First Embodiment

Figure 1:
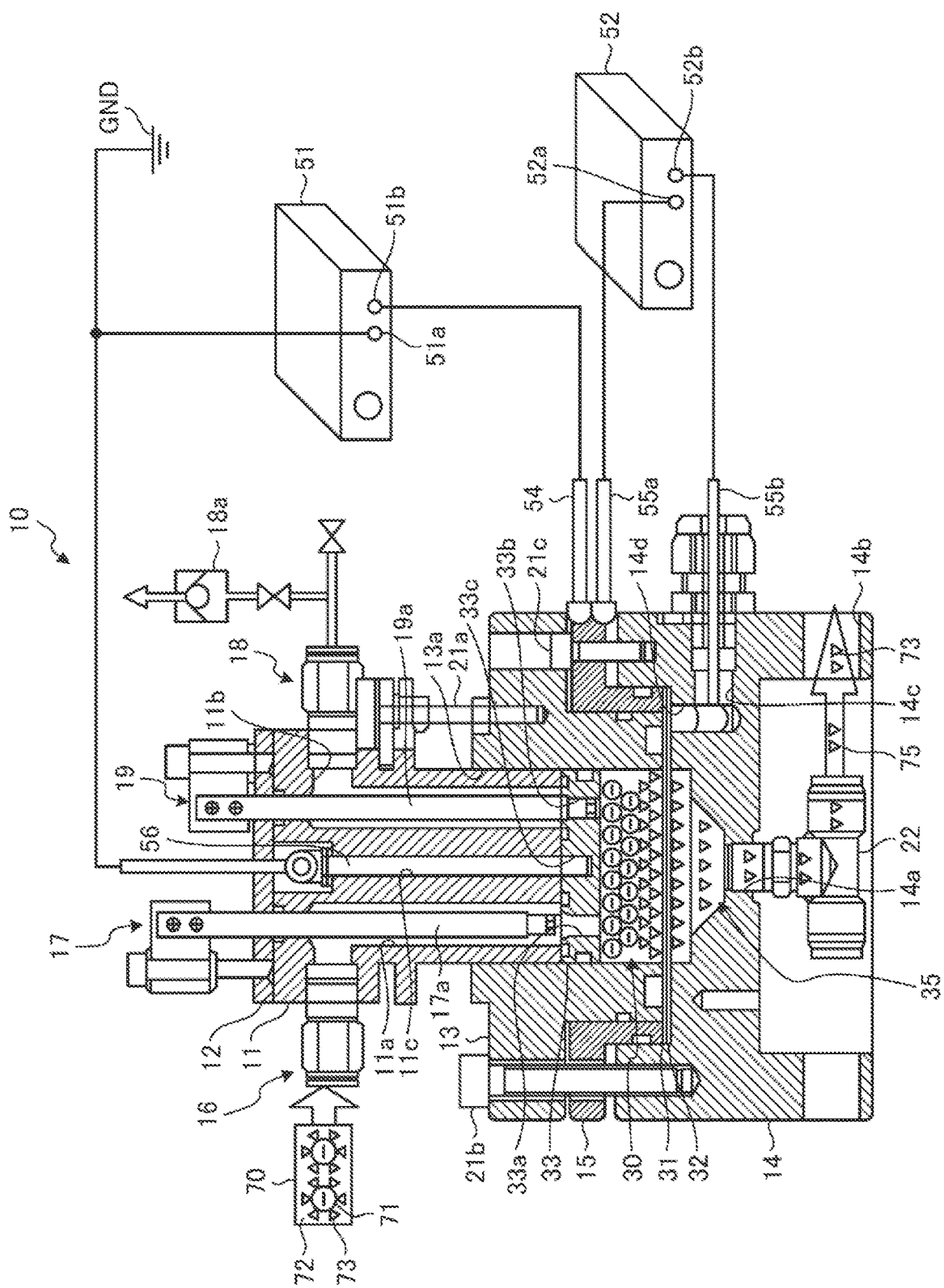
FIG. 1 is a cross-sectional view schematically showing a configuration example of a filtration device according to a first embodiment.

FIG. 1 is a cross-sectional view schematically showing a configuration example of a filtration device according to a first embodiment. The filtration device 10 according to the first embodiment is a device that separates first particles (particles to be separated) 71 from a slurry (raw material) 70 (material to be treated) that includes the first particles 71 dispersed in a polar solvent 72. Specifically, the filtration device 10 can be applied to the life science field, the sewage treatment field, the wastewater treatment field, and the like. In the life science field, the filtration device 10 can be applied to the bio-industry that cultures microorganisms such as cultured cells, microalgae, bacteria, viruses, and the like, to the use of enzymes, proteins, polysaccharides, lipids, and the like produced in vitro and in vivo by cultured microorganisms, to the application fields of bio-drug discovery and the cosmetics industry, or to the beverage industry that handles brewing, fermentation, juice extraction, beverages, and the like. In the fields of sewage treatment and wastewater treatment, the filtration device 10 can be applied to the separation of biomass particles in fine biomass water-based slurries that are difficult to filter. Alternatively, the filtration device 10 is a colloidal particle-based slurry in which surface-charged fine particles are highly dispersed by electrical repulsion, and can be applied to concentration and recovery of colloidal fine particles.

As shown in FIG. 1, the filtration device 10 according to the first embodiment includes an upper casing 11, a lid portion 12, a side casing 13, a lower casing 14 and a conductor 15. The filtration device 10 further includes a first filter chamber 30, a first electrode 31, a second electrode 32, a third electrode 33, and a filter medium 34 (see FIG. 2) in the internal space surrounded by the upper casing 11, the side casing 13, and the lower casing 14. The filtration device 10 further includes a first power supply 51, and a second power supply 52 that are electrically connected to the first electrode 31 and the second electrode 32.

Specifically, the upper casing 11 is a cylindrical member made of an insulating material. The side casing 13 is an annular member made of an insulating material and having a through hole. A portion of a lower end side of the upper casing 11 is inserted into the through hole of the side casing 13. The lower casing 14 is made of an insulating material and supports the side casing 13. The lid portion 12 is provided to cover the upper surface of the upper casing 11.

Outer edges of the first electrode 31, the second electrode 32, and the filter medium 34 (see FIG. 2) are interposed and fixed between the side casing 13 and the lower casing 14. The third electrode 33 is fixed to a lower surface of the upper casing 11 (a surface facing the lower casing 14) with a connection member (not shown) such as a bolt, and is positioned inside the through hole of the side casing 13. The conductor 15 is an annular member provided to surround the side casing 13 and is provided between the side casing 13 and the lower casing 14. A lower end side of the conductor 15 is connected to an outer edge of the first electrode 31. While the upper casing 11 and the conductor 15 are illustrated as annular members, aspects are not limited thereto, and polygonal or other shapes may be applied.

The upper casing 11 and the side casing 13 are fixed by a guide portion 21a. The side casing 13, the lower casing 14 and the conductor 15 are fixed by bolts 21b and 21c. As a result, the casings are fixed in position, and the first filter chamber 30 is formed in a space surrounded by the first electrode 31, the second electrode 32, the filter medium 34, an inner wall of the side casing 13, and the third electrode 33. A sealing member such as an O-ring is provided at each connection portion between the casings and between the electrodes, so that the first filter chamber 30 is provided in a sealed manner. The upper casing 11 is provided such that a distance from the lower casing 14 can be adjusted. As a result, in the filtration device 10, volume of the first filter chamber 30 can be appropriately set according to the type and amount of the slurry (raw material) 70 (hereinafter sometimes referred to as a "material to be treated").

The upper casing 11 is provided with a slurry supply passage 11a, an exhaust passage 11b, and a through hole 11c. One end side of the slurry supply passage 11a is open through a side surface of the upper casing 11 and is connected to a slurry supply unit 16. The other end side of the slurry supply passage 11a is open through the lower surface of the upper casing 11 and is connected to a through hole 33a of the third electrode 33. A slurry supply valve 17 includes a rod-shaped member 17a provided inside the slurry supply passage 11a, and the rod-shaped member 17a is moved vertically in the slurry supply passage 11a, thereby switching the through hole 33a between open and closed states.

As a result, for example, when the through hole 33a is open by the operation of the slurry supply valve 17, the slurry (raw material) 70 is supplied to the first filter chamber 30 via the slurry supply unit 16, the slurry supply passage 11a and the through hole 33a of the third electrode 33. When the through hole 33a is closed by the slurry supply valve 17, the supply of the slurry (raw material) 70 to the first filter chamber 30 is stopped.

One end side of the exhaust passage 11b is open through the side surface of the upper casing 11 and is connected to an air discharge unit 18. The other end side of the exhaust passage 11b is open through the lower surface of the upper casing 11 and is connected to the through hole 33b of the third electrode 33. An air discharge valve 19 includes a rod-shaped member 19a provided inside the exhaust passage 11b, and the rod-shaped member 19a is moved vertically inside the exhaust passage 11b with a tip thereof being inserted into and removed from the through hole 33b, thereby switching the through hole 33b between the open and closed states.

When the slurry (raw material) 70 is supplied to the first filter chamber 30, the air discharge valve 19 opens the through hole 33b. As a result, the air in the first filter chamber 30 is exhausted to the outside through the through hole 33b, the exhaust passage 11b, and the air discharge unit 18. An air discharge valve 18a is connected to the air discharge unit 18. For example, the air discharge valve 18a is a float valve, and is provided such that the air discharge valve 18a is closed when a predetermined amount of air in the first filter chamber 30 is exhausted. After exhaust from the first filter chamber 30 is completed, the air discharge valve 19 closes the through hole 33b. As a result, a predetermined pressure (P) is applied to the slurry (raw material) 70 filled in the first filter chamber 30 by an external pressure pump or the like through the slurry supply unit 16. Here, for example, the predetermined pressure is 0.005 MPa to 0.5 MPa, preferably 0.01 MPa to 0.2 MPa, and more preferably 0.05 MPa to 0.2 MPa.

One end side of the through hole 11c is open through the upper surface of the upper casing 11. The other end side of the through hole 11c is open through the lower surface of the upper casing 11 and is connected to a concave portion 33c of the third electrode 33. A connection conductor 56 is inserted into the through hole 11c, and the connection conductor 56 and the third electrode 33 are connected to each other at the concave portion 33c. As a result, the third electrode 33 is electrically connected to a reference potential GND via the connection conductor 56. The reference potential GND is a ground potential, for example. However, the reference potential GND is not limited thereto, and may be a predetermined fixed potential different from the ground potential.

The first electrode 31 is electrically connected to a second terminal 51b of the first power supply 51 via the conductor 15 and the connection conductor 54. The first electrode 31 is electrically connected to a first terminal 52a of the second power supply 52 via the conductor 15 and the connection conductor 55a.

The lower casing 14 is provided with a concave second filter chamber 35, through holes 14a and 14b, and a connection hole 14c. The second filter chamber 35 is provided at a position overlapping the first filter chamber 30 on the upper surface of the lower casing 14. The through hole 14a connects the second filter chamber 35 and a discharge unit 22. By driving each electrode, the first particles 71 are separated from the slurry (raw material) 70 supplied to the first filter chamber 30, and the polar solvent 72 (filtrate 75) with the separated first particles 71 passes through the first electrode 31, the filter medium 34 (see FIG. 2) and the second electrode 32 and flows into the second filter chamber 35. The filtrate 75 containing the polar solvent 72 removed of the first particles 71 is moved from the discharge unit 22 of the second filter chamber 35 through the through hole 14b and stored in an external storage tank.

One end side of the connection hole 14c is open through the upper surface of the lower casing 14, and an outer edge of the second electrode 32 is provided to cover an opening 14d of the connection hole 14c. The other end side of the connection hole 14c is open through the side surface of the lower casing 14. A connection conductor 55b is inserted into the connection hole 14c, and the connection conductor 55b and the second electrode 32 are connected. As a result, the second electrode 32 is electrically connected to a second terminal 52b of the second power supply 52.

Note that the configuration of the filtration device 10 shown in FIG. 1 is merely an example, and any configuration may be employed as long as the first filter chamber 30 can be formed and interposed between the first electrode 31, the second electrode 32, the filter medium 34 (see FIG. 2), and the third electrode 33. The first electrode 31, the second electrode 32, and the third electrode 33 are made of a titanium alloy or an alumite-treated aluminum alloy, and the like, for example, but not limited thereto.

Figure 2:
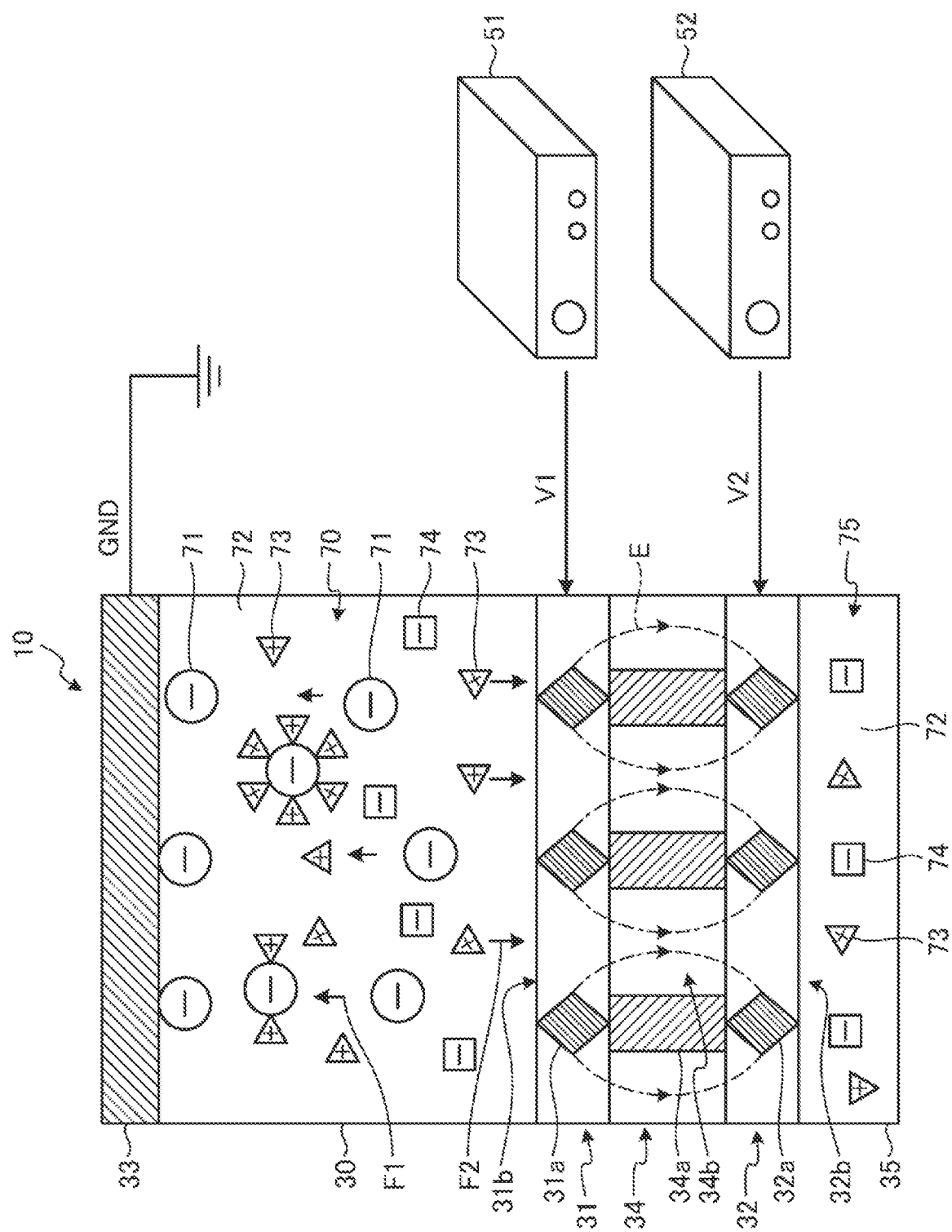
FIG. 2 is an explanatory diagram provided to explain an operation of the filtration device according to the first embodiment.

Next, operation of the filtration device 10 will be described with reference to FIGS. 2 to 4. FIG. 2 is an explanatory diagram provided to explain the operation of the filtration device according to the first embodiment. In FIG. 2, for ease of explanation, the arrangement relationship between the first electrode 31, the second electrode 32, the third electrode 33, the filter medium 34, and the first filter chamber 30 and the second filter chamber 35 is schematically shown.

As shown in FIG. 2, the first electrode 31 and the second electrode 32 are mesh-like electrodes having openings, for example. Specifically, the first electrode 31 includes a plurality of thin conductive wires 31a, and a plurality of first openings 31b are provided between the thin conductive wires 31a. The second electrode 32 includes a plurality of thin conductive wires 32a, and a plurality of second openings 32b are provided between the thin conductive wires 32a. The second electrode 32 is provided to face one surface (lower surface) of the first electrode 31 with the filter medium 34 interposed therebetween. In other words, the filter medium 34 is provided between the first electrode 31 and the second electrode 32. The first electrode 31 and the second electrode 32 are provided in direct contact with the filter medium 34. The plurality of thin conductive wires 31a and the plurality of thin conductive wires 32a may be metal or carbon fiber. The first electrode 31 and the second electrode 32 are not limited to being in direct contact with the filter medium 34, and may be arranged to not contact the filter medium 34.

The filter medium 34 is formed by providing a plurality of apertures 34b in a filtration membrane 34a. For the filter medium 34, for example, a microfiltration membrane (MF membrane), an ultrafiltration membrane (UF membrane), or the like is used. In the first embodiment, the filter medium 34 is made of an insulating material such as a resin material.

Note that in FIG. 2, the first openings 31b of the first electrode 31, the second openings 32b of the second electrode 32, and the apertures 34b of the filter medium 34 are shown to have the same size, but the drawing is a schematic illustration for the purpose of explanation only, and the sizes of the first openings 31b, the second openings 32b, and the apertures 34b may be different from each other.

Figure 3:
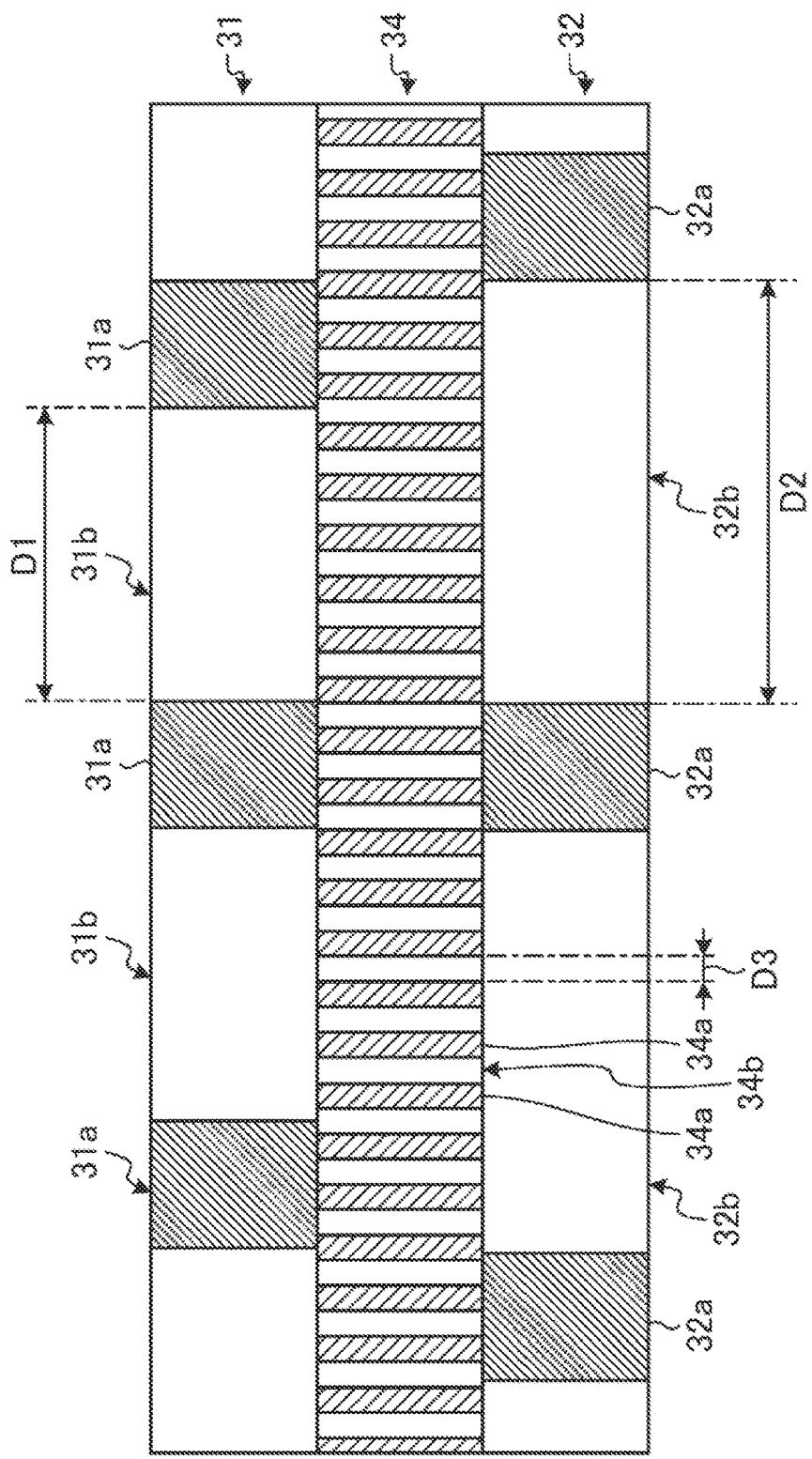
FIG. 3 is a cross-sectional view schematically showing a configuration of a first electrode, a filter medium, and a second electrode.

FIG. 3 is a cross-sectional view schematically showing the configuration of the first electrode, the filter medium, and the second electrode. As shown in FIG. 3, diameter D3 of the apertures 34b provided in the filter medium 34 is smaller than the diameter D1 of the first openings 31b of the first electrode 31 and smaller than the diameter D2 of the second openings 32b of the second electrode 32. In other words, an arrangement pitch of the plurality of thin conductive wires 31a, an arrangement pitch of the plurality of thin conductive wires 32a, and an arrangement pitch of the filtration membranes 34a may be provided differently from each other. For example, the diameter D1 of the first openings 31b of the first electrode 31 is 0.5 μm or more and 500 μm or less, for example, about 70 μm. The diameter D2 of the second openings 32b of the second electrode 32 is 0.5 μm or more and 1000 μm or less, for example, about 100 μm. The diameter D3 of the plurality of apertures 34b provided in the filter medium 34 is approximately 0.1 μm or more and 100 μm or less, more preferably, approximately 1 μm or more and 7 μm or less.

The diameter D1 of the first openings 31b of the first electrode 31 is smaller than the diameter D2 of the second openings 32b of the second electrode 32. However, aspects are not limited thereto, and the diameter D1 of the first openings 31b of the first electrode 31 may be formed to have the same size as the diameter D2 of the second openings 32b of the second electrode 32. With such configuration, the apertures 34b of the filter medium 34 are provided to not overlap with the plurality of thin conductive wires 31a and the plurality of thin conductive wires 32a at least in the regions overlapping with the first openings 31b and the second openings 32b. The distance between the first electrode 31 and the second electrode 32 is defined by the thickness of the filter medium 34.

Returning to FIG. 2, the third electrode 33 is a plate-like member and is provided to face the other surface (upper surface) of the first electrode 31 with the first filter chamber 30 interposed therebetween. Note that in FIG. 2, the through holes 33a and 33b and the concave portion 33c (see FIG. 1) of the third electrode 33 are omitted.

The first filter chamber 30 is provided in contact with the other surface (upper surface) of the first electrode 31. As described above, the first filter chamber 30 is supplied with the slurry (raw material) 70 containing the first particles 71 to be separated and the polar solvent 72. For example, the first particles 71 are biomass particles or colloidal particles, and the particle surfaces thereof are negatively charged. Specifically, the first particles 71 are *chlorella, spirulina* microalgae, colloidal silica. *Escherichia coli*, activated sewage sludge, or the like. The diameter of the first particle 71 varies according to the technical field to be applied and the type of target to be separated, but is 5 nm or more and 2000 μm or less, and for example, approximately 20 nm or more and 500 μm or less.

The polar solvent 72 in which the first particles 71 are dispersed is water, and the water molecules 73 are positively charged. As a result, the slurry (raw material) 70 is in an electrically balanced state as a whole. The polar solvent 72 is not limited to water, and may be alcohol, for example. That is, any solvent may be applied as the polar solvent 72 as long as the solvent is polar.

As shown in FIG. 2, the slurry (raw material) 70 contains second particles 74 such as chromoproteins. The second particles 74 are charged to the same polarity (minus) as the first particles 71 and have a smaller particle size than the first particles 71. The second particles 74 are, for example, 10 nm or more and 300 nm or less, and for example, about 30 nm. Note that there may be no second particles 74 in the slurry 70.

The first power supply 51 supplies the first electrode 31 with a first potential V1 having the same polarity as the polarity of the first particles 71. The first potential V1 is −60V, for example. The second power supply 52 supplies the second electrode 32 with a second potential V2 having the same polarity as that of the first particles 71 and a greater absolute value than the absolute value of the first potential V1. The second potential V2 is −70V, for example. The third electrode 33 is connected to the reference potential GND. The reference potential GND is the ground potential as described above, which is ideally 0 V. Note that the reference potential GND supplied to the third electrode 33 is not limited to 0 V, and may be a predetermined fixed potential. The absolute values of the first potential V1 and the second potential V2 can be set within a range of 1 mV or more and 1000 V or less.

Figure 4:
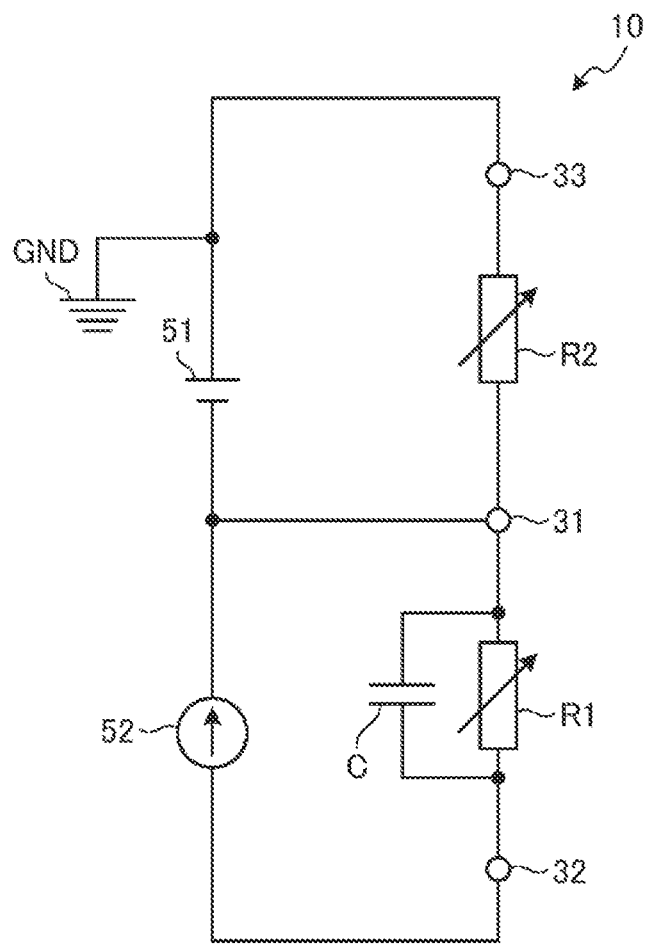
FIG. 4 is an electrical equivalent circuit diagram showing the filtration device according to the first embodiment.

FIG. 4 is an electrical equivalent circuit diagram showing the filtration device according to the first embodiment. As shown in FIG. 4, the first power supply 51 is a constant voltage source and the second power supply 52 is a constant current source. A resistance component R1 and a capacitance component C are connected in parallel between the first electrode 31 and the second electrode 32. The resistance component R1 and the capacitance component C are equivalently represented by the filter medium 34 provided with a large number of apertures 34b. A resistance component R2 is connected between the first electrode 31 and the third electrode 33. The resistance component R2 is a resistance component equivalently represented by the slurry (raw material) 70 in the first filter chamber 30.

The second power supply 52 may be a constant voltage power supply or a constant current power supply. In the first embodiment, the second power supply 52 is a constant current source, so the second potential V2 changes according to the filtering state of the filtration device 10, that is, according to the variation of the resistance component R1 of the filter medium 34 and the resistance component R2 of the first filter chamber 30. However, the second potential V2 has the same polarity as the polarity of the first particles 71 and maintains a value greater than the absolute value of the first potential V1.

Returning to FIG. 2, when the slurry (raw material) 70 is supplied to the first filter chamber 30, a repulsive force is generated between the negatively charged first particles 71 and the first electrode 31 based on Coulomb's law.

In the present example, Coulomb's law is expressed by the following Equation (1).

$$F = k \times (q1 \times q2/s^2) \qquad (1)$$

k is a constant and is expressed by $k = 4\pi\varepsilon$. q1 and q2 are the charges and s is the distance between the charges. That is, as the distance s decreases, the Coulomb force F acting on the first particles 71 increases. Specifically, a stronger repulsive force is generated in the negatively charged first particles 71 positioned closer to the first electrode 31. The repulsive force F1 generated in the negatively charged first particles 71 acts in the direction indicated by the arrow, that is, the direction away from the first electrode 31 and close to the third electrode 33. The negatively charged first particles 71 are moved toward the third electrode 33 by electrophoresis.

As a result, the filtration device 10 can prevent the first particles 71 from depositing and forming a cake layer on the surface of the first electrode 31 and the surface of the filter medium 34. That is, it is possible to prevent an increase in the filtration resistance of the aperture 34b of the filter medium 34.

The positively charged water molecules 73 generate an attractive force with the first electrode 31. An attractive force F2 acting on the positively charged water molecules 73 acts in the direction indicated by the arrow, that is, in a direction from the third electrode 33 toward the first electrode 31. The positively charged water molecules 73 move to the first electrode 31 side. Here, by the potential difference between the first electrode 31 and the second electrode 32, a barrier electric field (electric field E of electric field barrier) (one-dot chain line in FIG. 2) directed from the first electrode 31 to the second electrode 32 is formed to penetrate the filter medium 34 in the thickness direction.

The water molecules 73 that moved to the first electrode 31 side are subjected to force by the electric field, pulled toward the second electrode 32 side, and passed through the filter medium 34. As the water molecules 73 move, the surrounding water molecules 73 are also dragged toward the second electrode 32 side, forming an electroosmotic flow. As a result, the polar solvent 72 (the filtrate 75) containing the positively charged water molecules 73 flows into the second filter chamber 35. As described above, the first particles 71 are separated from the first electrode 31 by electrophoresis, and the polar solvent 72 (the filtrate 75) removed of the first particles 71 is discharged, and accordingly, it is possible to increase the concentration of the first particles 71 in the slurry (raw material) 70 in the first filter chamber 30.

Thus, the filtration device 10 can separate the first particles 71 of the slurry (raw material) 70 by a combination of the electrophoresis in which the first particles 71 is moved by the Coulomb force F (the repulsive force generated between the first particles 71 and the first electrode 31) between the first electrode 31 and the third electrode 33 and the electroosmosis in which the water molecules 73 are moved by the electric field between the first electrode 31 and the second electrode 32 and passed through the filter medium 34. The first electrode 31 serves both as an electrophoretic electrode and an electroosmotic electrode. As a result, compared to the method for simply applying pressure to the slurry (raw material) 70 to separate the first particles 71 having a particle size greater than the apertures 34b of the filter medium 34, it is possible to prevent the formation of a cake layer on the surface of the first electrode 31 and the surface of the filter medium 34 and improve the filtration rate several times to ten times or more.

As a result, according to the electrofiltration separation technique, compared to the method for simply applying pressure to the slurry (raw material) 70, the degree of concentration of the positively charged first particles 71 in the slurry (raw material) 70 in the first filter chamber 30 can be increased. Since the formation of a cake layer on the surface of the first electrode 31 and the surface of the filter medium 34 is prevented, the frequency of cleaning and replacement of the filter medium 34 can be reduced, and the slurry (raw material) 70 can be filtered efficiently. Alternatively, compared to simply applying pressure to the slurry (raw material) 70 for filtration, it is possible to reduce the volume of the first filter chamber 30 and the area of the filter medium 34, and still achieve the filtration rate equivalent to that obtained by simply applying pressure to the slurry (raw material) 70. That is, the filtration device 10 can achieve size reduction.

The concentrated slurry in which the concentration of the first particles 71 is increased in the first filter chamber 30 is separately discharged from the first filter chamber 30 as appropriate.

By controlling the electric field formed between the first electrode 31 and the second electrode 32, the particle level (particle diameter) passing through the filter medium 34 can also be controlled. For example, by applying a first potential $V1=-60$ V to the first electrode 31 and applying a second potential $V2=-70$ V to the second electrode 32, a barrier electric field E (see FIG. 2) is formed between the first electrode 31 and the second electrode 32, and the second particles 74 having a particle size smaller than the apertures 34b of the filter medium 34 can be blocked from passing through the filter medium 34.

That is, even when the filter medium 34 equivalent to a microfiltration membrane (MF membrane), by controlling the electric field between the electrodes with the first power supply 51, the second power supply 52, and the reference potential GND, it is possible to change the particle diameter to be separated to an ultrafiltration membrane (UF membrane) or nanofiltration membrane (NF membrane) equivalent. The ultrafiltration membrane (UF membrane) is a filtration membrane having a diameter of opening of approximately 10 nm or more and 100 nm or less. The nanofiltration membrane (NF membrane) is a filtration membrane having the diameter of opening of approximately 1 nm or more and 10 nm or less.

The configuration of the filtration device 10 described above is merely an example, and can be changed as appropriate. For example, the negative filter plate formed by stacking the first electrode 31, the filter medium 34, and the second electrode 32, and the third electrode 33 are arranged to face each other in a parallel plate shape. Aspects are not limited thereto, and the negative filter plate formed by stacking the first electrode 31, the filter medium 34 and the second electrode 32, and the third electrode 33 may each have a curved surface. The shape and arrangement of the negative filter plate and the third electrode 33 can be appropriately changed according to the shape and structure of the filtration device 10. The concentration of the slurry (raw material) 70, which is the material to be treated supplied to the first filter chamber 30, is not particularly limited, and can be changed according to the field to which the filtration device 10 is applied.

In the first embodiment, the internal pressure of the first filter chamber 30 is pressurized and is higher than the internal pressure of the second filter chamber 35. As another aspect, by reducing the internal pressure of the second filter chamber 35 to a negative pressure such as by vacuuming, the internal pressure of the first filter chamber 30 may be made relatively higher than the internal pressure of the second filter chamber 35.

The first potential V1 and the second potential V2 are preferably changed as appropriate according to the type of the first particles 71 to be separated and the required filtration characteristics.

Figure 5:
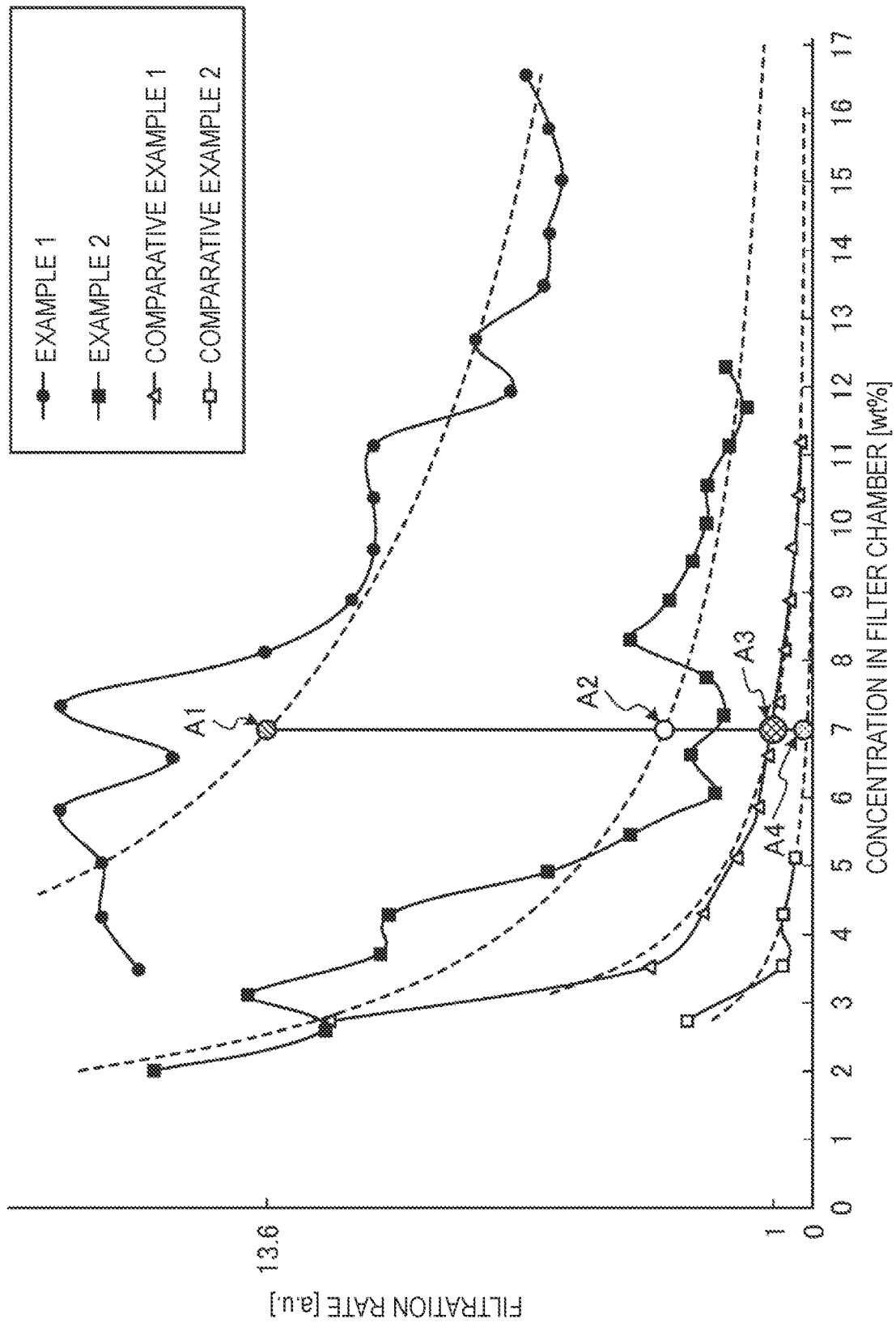
FIG. 5 is a graph showing a relationship between a concentration in filter chamber and a filtration rate in a solid-liquid separation of *chlorella*.

FIG. 5 is a graph showing the relationship between the concentration in the filter chamber and the filtration rate in the solid-liquid separation of *chlorella*. In FIG. 5, black circle symbols represent a first example, black square symbols represent a second example, white triangle symbols represent a first comparative example, and white square symbols represent a second comparative example.

In Graph 1 shown in FIG. 5, the horizontal axis represents the concentration in the filter chamber (wt %), and the vertical axis represents the filtration rate (au.). The filtration rate is the amount (weight) of the polar solvent 72 (the filtrate 75) that can pass through the filter medium 34 per unit of time, and in FIG. 5, the values normalized by the filtration rate A3 of the first comparative example are shown. The concentration in the filter chamber indicates the mass percent concentration of the first particles 71 in the *chlorella* culture solution, which is the slurry (raw material) 70 in the first filter chamber 30.

In Graph 1 shown in FIG. 5, the first particles 71 to be separated are *chlorella*, are negatively charged and have a particle diameter of approximately 2 μm or more and 10 μm or less, for example. As described above, the first and second examples show a case in which the first potential V1=−60 V is applied to the first electrode 31, the second potential V2=−70 V is applied to the second electrode 32, and the third electrode 33 is the reference potential GND.

In the first example, a pressure of 0.1 MPa is applied to the slurry (raw material) 70 in the first filter chamber 30. In the second example, a pressure of 0.02 MPa is applied to the slurry (raw material) 70 in the first filter chamber 30. That is, in the second example, filtration of the slurry (raw material) 70 is performed with a lower pressure than in the first example.

In the first comparative example, without supplying the first potential V1 and the second potential V2 to the first electrode 31 and the second electrode 32, respectively, the filtration of the slurry (raw material) 70 is performed only by pressurization of 0.1 MPa. In the second comparative example, the first potential V1=−60 V is applied to the first electrode 31 and the second potential V2 is not applied to the second electrode 32.

In the second comparative example, a pressure of 0.1 MPa is applied. That is, in the second comparative example, electrophoresis between the first electrode 31 and the third electrode 33 is performed, and electroosmosis between the first electrode 31 and the second electrode 32 is not performed.

As shown in FIG. 5, in both the first and second examples and the first and second comparative examples, the filtration rate tends to decrease as the concentration in the filter chamber increases. For example, when the slurry (raw material) 70 is concentrated to a concentration of 7 wt % in the filter chamber, the filtration rate A1 in the first example is shown to be 13.6 times the filtration rate A3 in the first comparative example. Likewise, the filtration rate A2 in the second example is shown to be 3.9 times the filtration rate A3 in the first comparative example.

Meanwhile, the filtration rate A4 in the second comparative example is 0.16 times less than the filtration rate A3 in the first comparative example. That is, as in the second comparative example, when only the electrophoresis is performed by supplying the first potential V1 to the first electrode 31 and electroosmosis between the first electrode 31 and the second electrode 32 is not performed, good filtering is not shown.

As shown in FIG. 5, in the first and second examples, compared with the first and second comparative examples, the concentration in the filter chamber can be increased. In the first comparative example, the concentration in the filter chamber is about 11 wt % at maximum, whereas in the first example, it is shown that the concentration in the filter chamber can be concentrated to 16 wt % or more. As described above, in the first and second examples in which the first particles 71 are separated by the combination of electrophoresis and electroosmosis, compared to the first and second comparative examples, it is shown that the filtration rate can be improved and the maximum concentration in the filter chamber can be improved.

Figure 6:
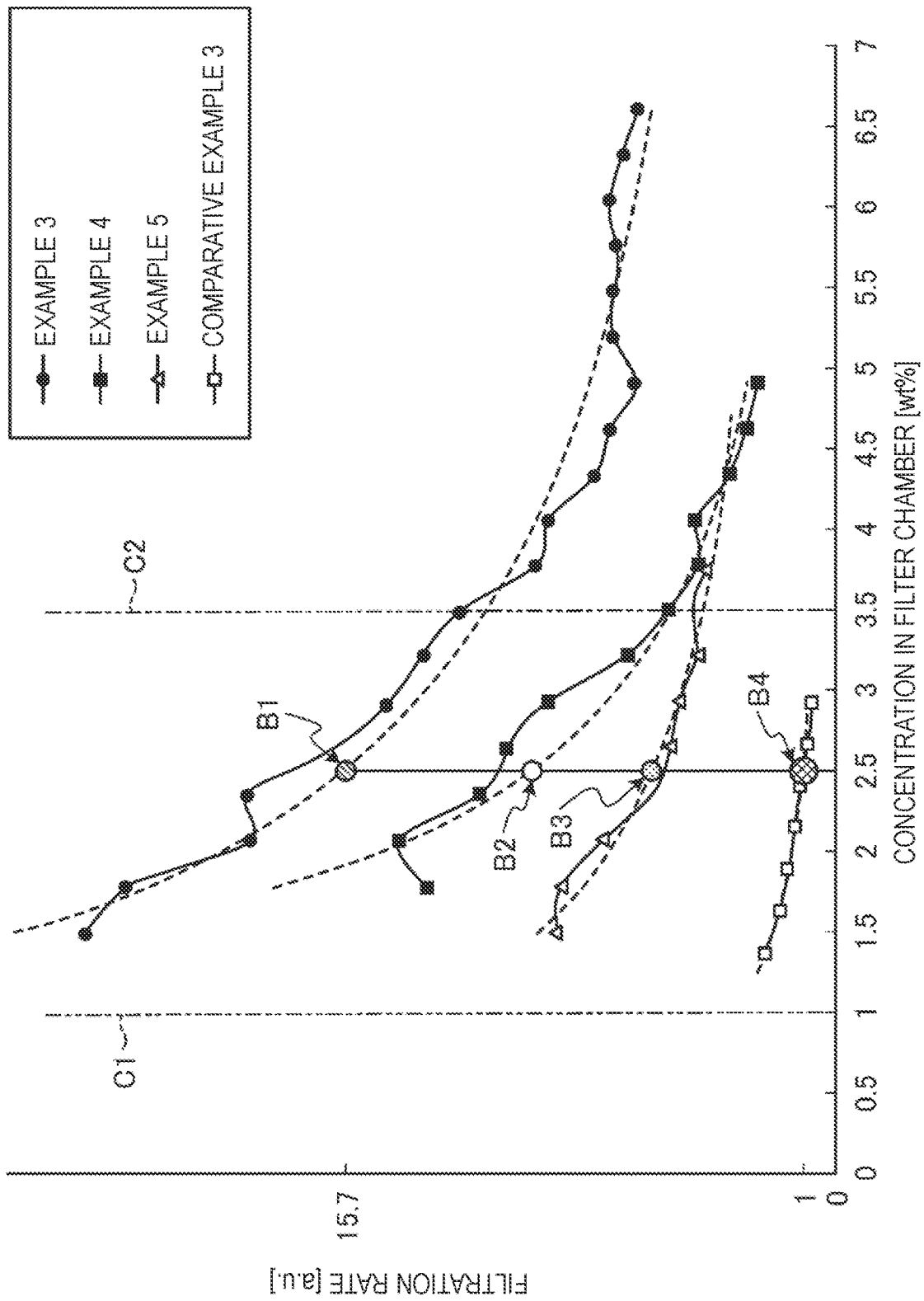
FIG. 6 is a graph showing the relationship between a concentration in filter chamber and a filtration rate in a solid-liquid separation of activated sewage sludge.

FIG. 6 is a graph showing the relationship between the concentration in the filter chamber and the filtration rate in the solid-liquid separation of activated sewage sludge. In Graph 2 shown in FIG. 6, the negatively charged first particles 71 to be separated are fine biomass particles contained in the activated sewage sludge. The vertical axis of Graph 2 shown in FIG. 6 represents the filtration rate normalized by the filtration rate B4 of the third comparative example. In FIG. 6, black circle symbols represent a third example, black square symbols represent a fourth example, white triangle symbols represent a fifth example, and white square symbols represent a third comparative example.

In the third example, a first potential V1=−60 V is applied to the first electrode 31, and a constant current of 0.3 A flows through the first electrode 31 and the second electrode 32.

In the fourth example, a first potential V1=−60 V is applied to the first electrode 31, and a constant current of 0.225 A flows through the first electrode 31 and the second electrode 32.

In the fifth example, a first potential V1=−60 V is applied to the first electrode 31, and a constant current of 0.15 A flows through the first electrode 31 and the second electrode 32. That is, the absolute value of the second potential V2 applied to the second electrode 32 decreases in order of the third, fourth and fifth examples.

In the third comparative example, without supplying the first potential V1 and the second potential V2 to the first electrode 31 and the second electrode 32, the filtration of the slurry (raw material) 70 is performed only by pressurization of 0.1 MPa. In Graph 2 of FIG. 6, double-dot chain line C1 indicates 1 wt %, which is the maximum concentration by the filtering with the membrane separation activated sludge method for comparison. Two-dot chain line C2 indicates 3.5 wt %, which is the maximum concentration of filtering by the mechanical concentration method using a centrifugal separator or the like for comparison.

For example, when concentrating the activated sludge, which is the slurry (raw material) 70, until the concentration of the first particles (fine biomass particles) 71 in the filter chamber reaches 2.5 wt %, the filtration rate B1 in the third example is shown to be 15.7 times the filtration rate B4 in the third comparative example. Likewise, the filtration rate B2 in the fourth example is shown to be 9.6 times the filtration rate B4 in the third comparative example. The filtration rate B3 in the fifth example is shown to be 5.9 times the filtration rate B4 in the third comparative example.

As shown in FIG. 6, in all of the third to fifth examples, the activated sludge, which is the slurry (raw material) 70, can be concentrated to a concentration greatly exceeding the maximum concentration of 1 wt % by the filtering with the membrane separation activated sludge method and the maximum concentration of 3.5 wt % by the filtering with the mechanical concentration method. In the third example, it is shown that it is possible to concentrate to a concentration of 6.5 wt % or more in the filter chamber, and in the fourth and fifth examples, it is shown that it is possible to concentrate to a concentration of about 5 wt % in the filter chamber.

As described above, the filtration device 10 of the first embodiment includes the first electrode 31 provided with the plurality of first openings 31*b*, the second electrode 32 provided with the plurality of second openings 32*b* and provided to face the one surface of the first electrode 31, the filter medium 34 provided with the plurality of apertures 34b and provided between the first electrode 31 and the second electrode 32, the first filter chamber 30 provided in contact with the other surface of the first electrode 31 and supplied with the slurry (raw material) 70 (material to be treated) containing the first particles 71 to be separated and the polar solvent 72, the third electrode 33 facing the first electrode 31 across the first filter chamber 30, the first power supply 51 that supplies the first potential V1 having the same polarity as the polarity of the first particles 71 to the first electrode 31, and the second power supply 52 that supplies the second potential V2 having the same polarity as the polarity of the first particles 71 to the second electrode 32. The third electrode 33 is connected to the reference potential GND.

Accordingly, in the filtration device 10, the first particles 71 can be moved satisfactorily by the electrophoretic flow in the direction away from the first electrode 31 by the repulsive force (Coulomb force F) generated between the first electrode 31 and the first particles 71. By the electrophoresis, the formation of a cake layer on the surface of the first electrode 31 and the surface of the filter medium 34 can be prevented. It is possible to separate the first particles 71 by electroosmosis in which the water molecules 73 are moved by an electric field between the first electrode 31 and the second electrode 32 to pass through the filter medium 34, and increase the degree of concentration of the first particles 71 of the slurry (raw material) 70 in the first filter chamber 30. As a result, compared to the method for simply applying pressure to the slurry (raw material) 70 to separate the first particles 71 having a particle size greater than the apertures 34b of the filter medium 34, the filtration rate can be improved several times to ten times or more. In addition, since the third electrode 33 is connected to the reference potential GND, the size of the filtration device 10 can be reduced compared to the case in which the first electrode 31, the second electrode 32, and the third electrode 33 are each provided with the power supplies.

In the filtration device 10, the absolute value of the second potential V2 is greater than the absolute value of the first potential V1, and the potential difference between the first potential V1 and the reference potential GND is greater than the potential difference between the first potential V1 and the second potential V2.

Accordingly, even when the distance between the first electrode 31 and the third electrode 33 facing each other with the filter medium 34 interposed therebetween is greater than the distance between the first electrode 31 and the second electrode 32, by electrophoresis, the first particles 71 can be moved satisfactorily in a direction away from the first electrode 31.

In the filtration device 10, the second electrode 32, the filter medium 34, the first electrode 31, the first filter chamber 30, and the third electrode 33 are stacked in this order in the direction perpendicular to the surface of the first electrode 31, and the distance between the first electrode 31 and the second electrode 32 is shorter than the distance between the first electrode 31 and the third electrode 33.

Accordingly, it is possible to increase the strength of the electric field formed between the first electrode 31 and the second electrode 32, and by electroosmosis, the water molecules 73 can be moved and passed satisfactorily through the filter medium 34 between the first electrode 31 and the second electrode 32.

In the filtration device 10, the first power supply 51 is a constant voltage source, and the second power supply 52 is a constant current source.

Accordingly, the Coulomb force F generated between the first electrode 31 and the first particles 71 can be defined by the first potential V1 supplied by the first power supply 51. The intensity of the electric field formed between the first electrode 31 and the second electrode 32 can be defined by the first potential V1 supplied by the first power supply 51 and the current supplied by the second power supply 52, to allow satisfactory electroosmosis.

In the filtration device 10, the size (diameter D3) of the aperture 34b is smaller than the diameter D1 of the first opening 31b and the diameter D2 of the second opening 32b.

Accordingly, the aperture 34b of the filter medium 34 is provided to not overlap with the thin conductive wires 31a and 32a of the first electrode 31 and the second electrode 32 at least in the regions overlapping with the first opening 31b and the second opening 32b. As a result, the water molecules 73 can pass through the apertures 34b of the filter medium 34 satisfactorily by electroosmosis.

Second Embodiment

Figure 7:
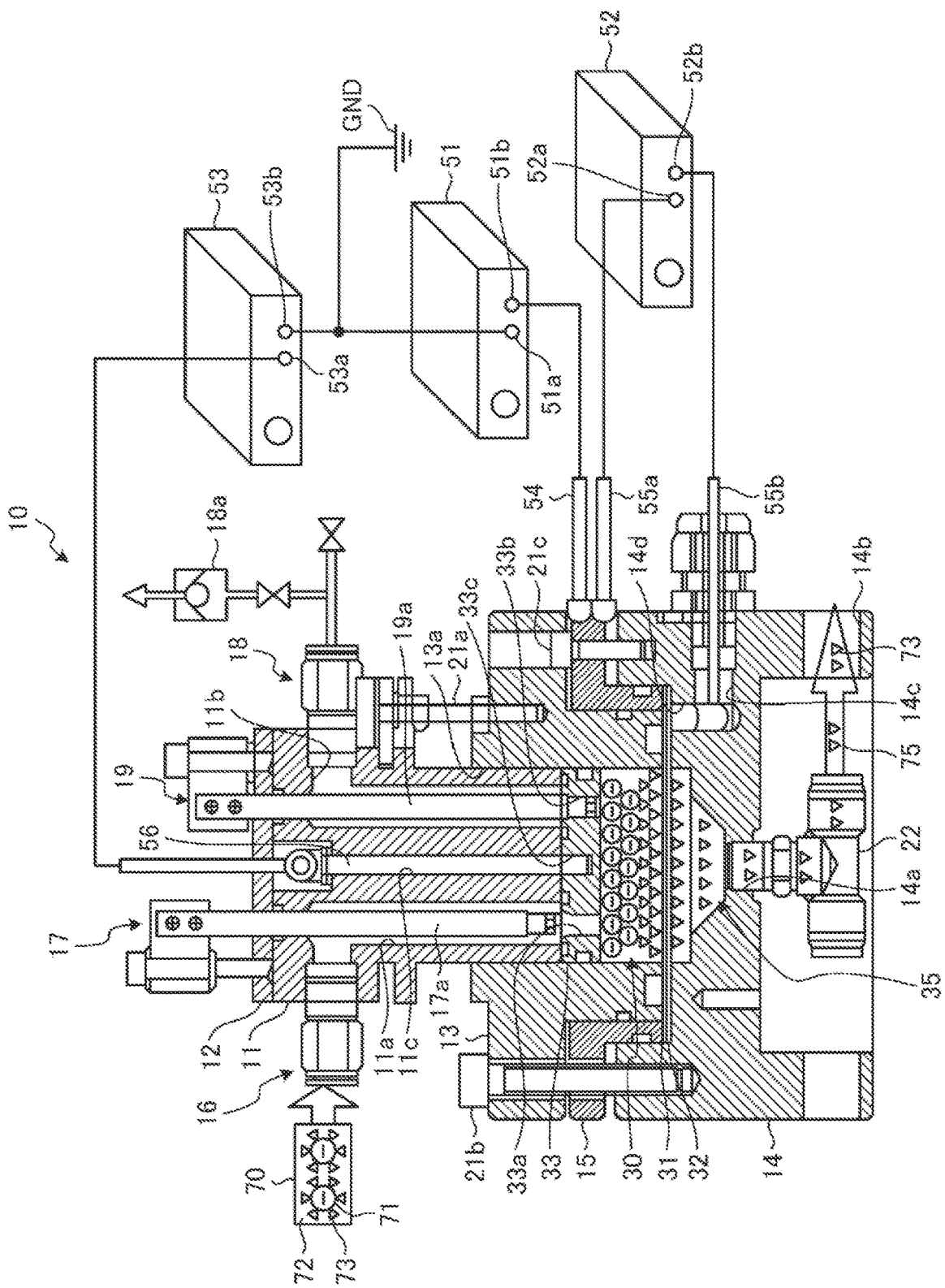
FIG. 7 is a cross-sectional view schematically showing a configuration example of a filtration device according to a second embodiment.
Figure 8:
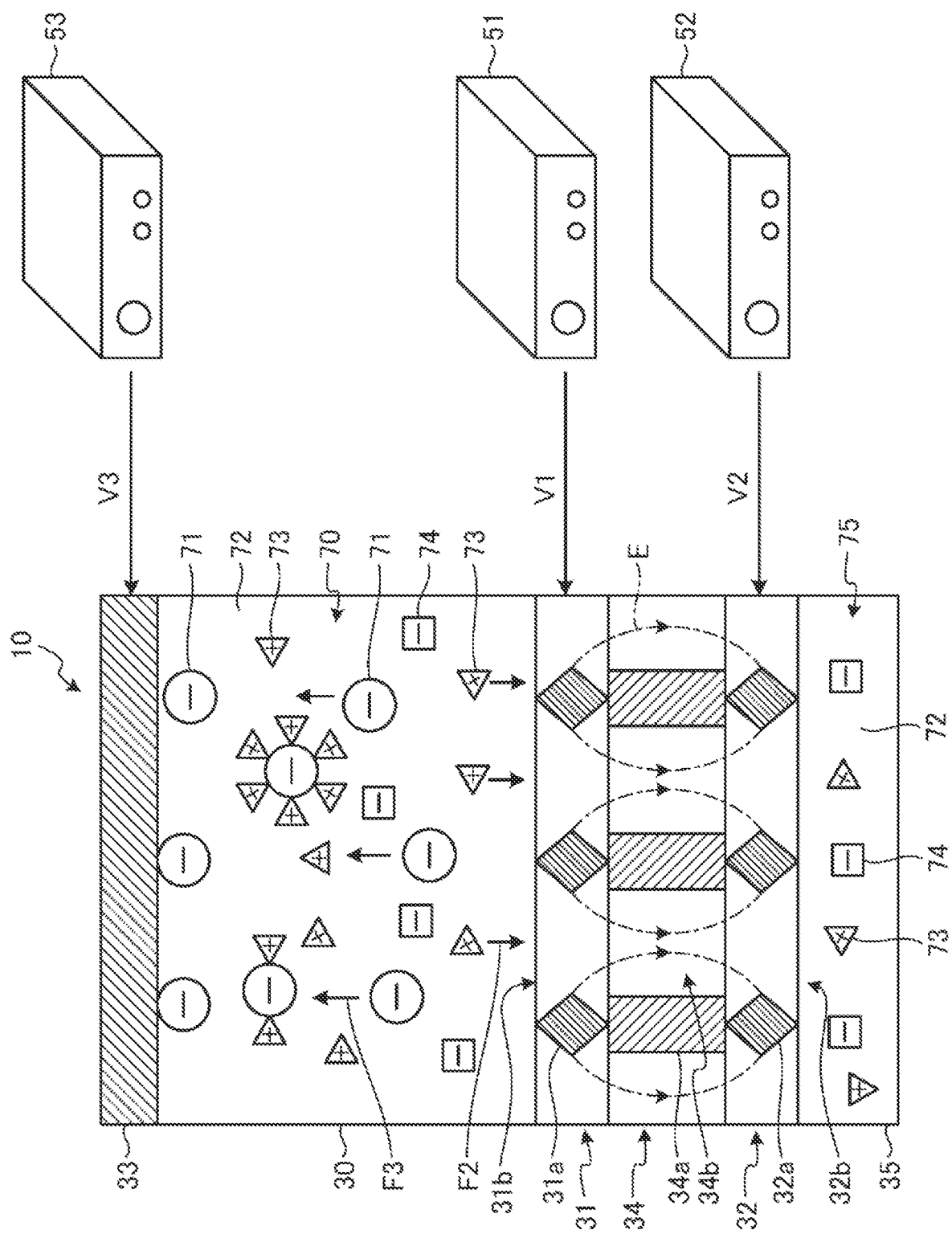
FIG. 8 is an explanatory diagram provided to explain an operation of the filtration device according to the second embodiment.

FIG. 7 is a cross-sectional view schematically showing a configuration example of a filtration device according to a second embodiment. FIG. 8 is an explanatory diagram provided to explain the operation of the filtration device according to the second embodiment. Note that the same components as those described in the embodiment described above are designated by the same reference numerals, and duplicate description will be omitted.

As shown in FIG. 7, the filtration device 10 according to the second embodiment includes the upper casing 11, the lid portion 12, the side casing 13, the lower casing 14 and the conductor 15. The filtration device 10 further includes a first filter chamber 30, a first electrode 31, a second electrode 32, a third electrode 33, and a filter medium 34 (see FIG. 8) in the internal space surrounded by the upper casing 11, the side casing 13, and the lower casing 14. The filtration device 10 further includes the first power supply 51, the second power supply 52, and a third power supply 53, electrically connected to the first electrode 31, the second electrode 32 and the third electrode 33.

One end side of the through hole 11c is open through the upper surface of the upper casing 11. The other end side of the through hole 11c is open through the lower surface of the upper casing 11 and is connected to a concave portion 33c of the third electrode 33. The connection conductor 56 is inserted into the through hole 11c, and the connection conductor 56 and the third electrode 33 are connected to each other at the concave portion 33c. As a result, the third electrode 33 is electrically connected to a first terminal 53a of the third power supply 53 via the connection conductor 56.

The first electrode 31 is electrically connected to a second terminal 51b of the first power supply 51 via the conductor 15 and the connection conductor 54. The first electrode 31 is electrically connected to the first terminal 52a of the second power supply 52 via the conductor 15 and the connection conductor 55a. The second terminal 53b of the third power supply 53 and the first terminal 51a of the first power supply 51 are connected to the reference potential GND. The reference potential GND is a ground potential, for example. However, the reference potential GND is not limited thereto, and may be a predetermined fixed potential.

Figure 9:
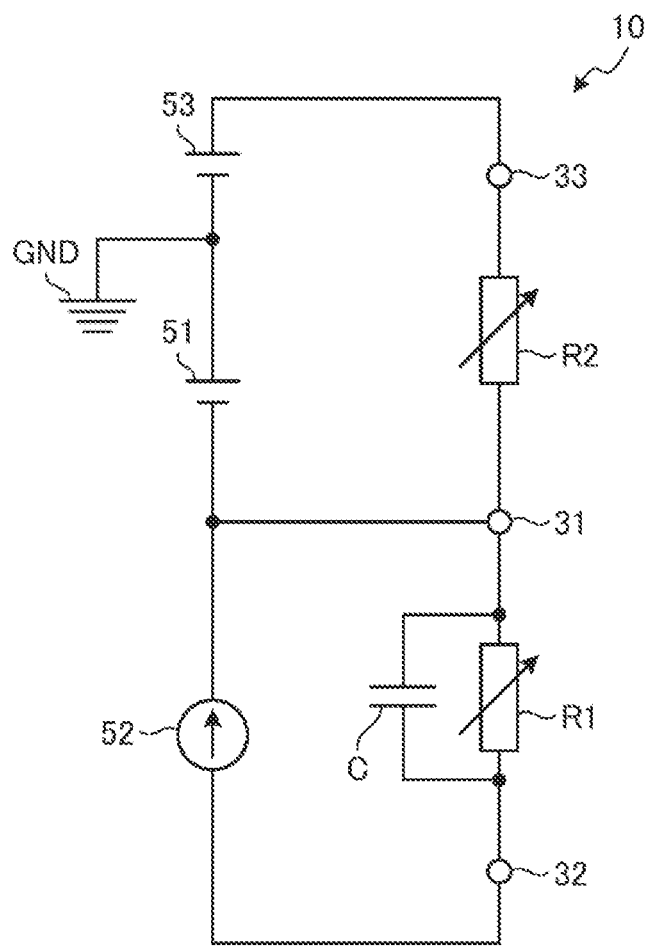
FIG. 9 is an electrical equivalent circuit diagram showing the filtration device according to the second embodiment.

FIG. 9 is an electrical equivalent circuit diagram showing the filtration device according to the second embodiment. As shown in FIG. 9, the first power supply 51 and the third power supply 53 are constant voltage sources, and the second power supply 52 is a constant current source. The resistance component R1 and the capacitance component C are connected in parallel between the first electrode 31 and the second electrode 32. The resistance component R1 and the capacitance component C are equivalently represented by the filter medium 34 provided with a large number of apertures 34b. The resistance component R2 is connected between the first electrode 31 and the third electrode 33. The resistance component R2 is a resistance component equivalently represented by the slurry (raw material) 70 in the first filter chamber 30.

The second power supply 52 may be a constant voltage power supply or a constant current power supply. In the second embodiment, the second power supply 52 is a constant current source, so the second potential V2 changes according to the filtering state of the filtration device 10, that is, according to the variation of the resistance component R1 of the filter medium 34 and the resistance component R2 of the first filter chamber 30. However, the second potential V2 has the same polarity as the polarity of the first particles 71 and maintains a value greater than the absolute value of the first potential V1.

Returning to FIG. 8, when the slurry (raw material) 70 is supplied to the first filter chamber 30, a repulsive force is generated between the negatively charged first particles 71 and the first electrode 31 based on Coulomb's law expressed by the Equation (1) described above. An attractive force is generated between the negatively charged first particles 71 and the third electrode 33.

Specifically, a stronger repulsive force (f1) is generated on the first particles 71 positioned closer to the first electrode 31, and a stronger attractive force (f2) is generated on the first particles 71 positioned closer to the third electrode 33. The vector sum F3 of the repulsive force (f1) and the attractive force (f2) generated in the negatively charged first particles 71 acts in the direction indicated by the arrow, that is, in the direction away from the first electrode 31 and close to the third electrode 33. The negatively charged first particles 71 are moved toward the third electrode 33 by electrophoresis.

As a result, the filtration device 10 can prevent the first particles 71 from depositing and forming a cake layer on the surface of the first electrode 31 and the surface of the filter medium 34. That is, it is possible to prevent an increase in the filtration resistance of the aperture 34b of the filter medium 34.

The positively charged water molecules 73 generate an attractive force with the first electrode 31. The attractive force F2 acting on the positively charged water molecules 73 acts in the direction indicated by the arrow, that is, in the direction from the third electrode 33 toward the first electrode 31. The positively charged water molecules 73 move to the first electrode 31 side. Here, by the potential difference between the first electrode 31 and the second electrode 32, an electric field directed from the first electrode 31 to the second electrode 32 is formed to penetrate the filter medium 34 in the thickness direction.

The water molecules 73 that moved to the first electrode 31 side are subjected to force by the electric field, pulled toward the second electrode 32 side, and passed through the filter medium 34. As the positively charged water molecules 73 move, uncharged water molecules are also dragged toward the second electrode 32, forming an electroosmotic flow. As a result, the polar solvent 72 (the filtrate 75) containing the positively charged water molecules 73 flows into the second filter chamber 35. As described above, by electrophoresis, the first particles 71 are separated from the first electrode 31 and moved toward the third electrode 33, and the polar solvent 72 (the filtrate 75) removed of the first particles 71 is discharged to the second filter chamber 35 side, and accordingly, it is possible to increase the concentration of the first particles 71 in the slurry (raw material) 70 in the first filter chamber 30.

Thus, the filtration device 10 can separate the first particles 71 by a combination of the electrophoresis in which the first particles 71 is moved by the Coulomb force F (the repulsive force generated between the first particles 71 and the first electrode 31) between the first electrode 31 and the third electrode 33 and the electroosmosis in which the water molecules 73 are moved by the electric field between the first electrode 31 and the second electrode 32 and passed through the filter medium 34. The first electrode 31 serves both as an electrophoretic electrode and an electroosmotic electrode. As a result, compared to the method for simply applying pressure to the slurry (raw material) 70 to separate the first particles 71 having a particle size greater than the apertures 34b of the filter medium 34, it is possible to prevent the formation of a cake layer on the surface of the first electrode 31 and the surface of the filter medium 34 and improve the filtration rate several times to ten times or more.

As a result, compared to the method for simply applying pressure to the slurry (raw material) 70, it is possible to increase the degree of concentration of the first particles 71 of the slurry (raw material) 70 in the first filter chamber 30. Since the formation of a cake layer of the first particles on the surface of the first electrode 31 and the surface of the filter medium 34 is prevented, the frequency of cleaning and replacement of the filter medium 34 can be reduced, and the slurry (raw material) 70 can be filtered efficiently. Alternatively, compared to simply applying pressure to the slurry (raw material) 70 for filtration, it is possible to reduce the volume of the first filter chamber 30 and the area of the filter medium 34, and still achieve the filtration rate equivalent to that obtained by simply applying pressure to the slurry (raw material) 70. That is, the filtration device 10 can achieve size reduction.

By controlling the electric field E formed between the first electrode 31 and the second electrode 32, the particle level (particle diameter) passing through the filter medium 34 can also be controlled. For example, by applying a first potential V1=−30 V to the first electrode 31 and applying a second potential V2=−40 V to the second electrode 32, a barrier electric field is formed between the first electrode 31 and the second electrode 32, and the second particles 74 having a particle size (5 nm or more and 2000 µm or less) smaller than the aperture 34b (0.1 µm or more and 100 µm or less) of the filter medium 34 can be blocked from passing through the filter medium 34.

That is, even when the filter medium 34 equivalent to a microfiltration membrane (MF membrane) is used, by controlling the electric field between the electrodes with the first power supply 51, the second power supply 52, and the third power supply 53, it is possible to change the particle diameter to be separated to an ultrafiltration membrane (UF membrane) or a nanofiltration membrane (NF membrane) equivalent. The ultrafiltration membrane (UF membrane) is a filtration membrane having a diameter of opening of approximately 10 nm or more and 100 nm or less. The nanofiltration membrane (NF membrane) is a filtration membrane having the diameter of opening of approximately 1 nm or more and 10 nm or less.

The configuration of the filtration device 10 described above is merely an example, and can be changed as appropriate. For example, the negative filter plate formed by stacking the first electrode 31, the filter medium 34, and the second electrode 32, and the third electrode 33 are arranged to face each other in a parallel plate shape. Aspects are not limited thereto, and the negative filter plate formed by stacking the first electrode 31, the filter medium 34 and the second electrode 32, and the third electrode 33 may each have a curved surface. The shape and arrangement of the negative filter plate and the third electrode 33 can be appropriately changed according to the shape and structure of the filtration device 10. The concentration of the slurry (raw material) 70, which is the material to be treated supplied to the first filter chamber 30, is not particularly limited, and can be changed according to the field to which the filtration device 10 is applied.

In the second embodiment, the internal pressure of the first filter chamber 30 is pressurized and is higher than the internal pressure of the second filter chamber 35. As another aspect, by reducing the internal pressure of the second filter chamber 35 to a negative pressure such as by vacuuming, the internal pressure of the first filter chamber 30 may be made relatively higher than the internal pressure of the second filter chamber 35.

The first potential V1, the second potential V2, and the third potential V3 are preferably changed as appropriate according to the type of the first particles 71 to be separated and the required filtration characteristics.

As described above, the filtration device 10 of the second embodiment includes the first electrode 31 provided with the plurality of first openings 31b, the second electrode 32 provided with the plurality of second openings 32b and provided to face the one surface of the first electrode 31, the filter medium 34 provided with the plurality of apertures 34b and provided between the first electrode 31 and the second electrode 32, the first filter chamber 30 provided in contact with the other surface of the first electrode 31 and supplied with the slurry (raw material) 70 (material to be treated) containing the first particles 71 to be separated and the polar solvent 72, the third electrode 33 facing the first electrode 31 across the first filter chamber 30, the first power supply 51 that supplies the first potential V1 having the same polarity as the polarity of the first particles 71 to the first electrode 31, the second power supply 52 that supplies the second potential V2 having the same polarity as the polarity of the first particles 71 to the second electrode 32, and the third power supply 53 that supplies the third potential V3 having a polarity different from that of the first particles 71 to the third electrode 33.

Accordingly, in the filtration device 10, the first particles 71 are moved in the direction from the first electrode 31 toward the third electrode 33 by the Coulomb force F (repulsive force generated between the first particles 71 and the first electrode 31) generated in the first particles 71 between the first electrode 31 and the third electrode 33. By the electrophoresis, the formation of a cake layer on the surface of the first electrode 31 and the surface of the filter medium 34 can be prevented. It is possible to separate the first particles 71 by electroosmosis in which the water molecules 73 are moved by an electric field between the first electrode 31 and the second electrode 32 to pass through the filter medium 34, and increase the degree of concentration of the first particles 71 of the slurry (raw material) 70 in the first filter chamber 30. As a result, compared to the method for simply applying pressure to the slurry (raw material) 70 to separate the first particles 71 having a particle size greater than the apertures 34b of the filter medium 34, the filtration rate can be improved several times to ten times or more.

In the filtration device 10, the absolute value of the second potential V2 is greater than the absolute value of the first potential V1, and the potential difference between the first potential V1 and the third potential V3 is greater than the potential difference between the first potential V1 and the second potential V2.

Accordingly, even when the distance between the first electrode 31 and the third electrode 33 facing each other with the filter medium 34 interposed therebetween is greater than the distance between the first electrode 31 and the second electrode 32, by electrophoresis, the first particles 71 can be moved satisfactorily to the third electrode 33 side.

In the filtration device 10, the second electrode 32, the filter medium 34, the first electrode 31, the first filter chamber 30, and the third electrode 33 are stacked in this order in the direction perpendicular to the surface of the first electrode 31, and the distance between the first electrode 31 and the second electrode 32 is shorter than the distance between the first electrode 31 and the third electrode 33.

Accordingly, it is possible to increase the strength of the electric field formed between the first electrode 31 and the second electrode 32, and by electroosmosis, the water molecules 73 can be moved and passed satisfactorily through the filter medium 34 between the first electrode 31 and the second electrode 32.

In the filtration device 10, the first power supply 51 and the third power supply 53 are constant voltage sources, and the second power supply 52 is a constant current source.

Accordingly, a Coulomb force F generated in the first particles 71 between the first electrode 31 and the third electrode 33 can be defined by the first potential V1 supplied by the first power supply 51 and the third potential V3 supplied by the third power supply 53. The intensity of the electric field formed between the first electrode 31 and the second electrode 32 can be defined by the first potential V1 supplied by the first power supply 51 and the current supplied by the second power supply 52, to allow satisfactory electroosmosis.

In the filtration device 10, the size (diameter D3) of the aperture 34b is smaller than the diameter D1 of the first opening 31b and the diameter D2 of the second opening 32b.

Accordingly, the aperture 34b of the filter medium 34 is provided to not overlap with the thin conductive wires 31a and 32a of the first electrode 31 and the second electrode 32 at least in the regions overlapping with the first opening 31b and the second opening 32b. As a result, the water molecules 73 can pass through the apertures 34b of the filter medium 34 satisfactorily by electroosmosis.

As described above, in the filtration device 10 of the second embodiment, the negatively charged first particles 71 are separated from the first electrode 31 by a range of several nm or more and several μm or less from the first electrode 31 due to the combined effect of electrophoresis and the electric field barrier E. By discharging the polar solvent 72 (the filtrate 75) removed of the first particles 71, the concentration of the first particles 71 in the slurry (raw material) 70 in the first filter chamber 30 increases, and the slurry of the first filter chamber 30 is concentrated.

Therefore, the concentrated slurry in the first filter chamber 30 which includes the negatively charged first particles 71 concentrated therein can be discharged from a concentrated liquid outlet (not shown) provided in the first filter chamber 30.

In the filtration device 10 of the second embodiment, a stronger repulsive force is generated in the first particles 71 positioned close to the first electrode 31 than in the filtration device 10 of the first embodiment. As a result, a stronger attractive force is generated on the first particles 71 positioned close to the third electrode 33 than in the filtration device 10 of the first embodiment. When comparing the force relationship with the repulsive force F1 generated in the first particle in the filtration device 10 of the first embodiment, the vector sum F3 of the repulsive force (see F1 in FIG. 2) and the attractive force (f2) generated in the negatively charged first particles 71 has a relationship of F1<F3, and the vector sum F3 of the generated repulsive force and attractive force in the negatively charged first particles 71, the force that moves toward the third electrode 33 by electrophoresis is greater.

As described above, compared to the filtration device 10 of the first embodiment, the filtration device 10 of the second embodiment further includes the third electrode 33, and by applying a predetermined potential to the third electrode 33, the effect of separation from the first electrode 31 by the range of several nm to several μm is increased by the vector sum F3 of the repulsive force and the attractive force acting between the third electrode 33 and the first electrode 31. As a result, the time when the filtration resistance of the filter medium 34 increases is delayed. Therefore, the state with the small filtration resistance of the filter medium 34 lasts for a long period of time, and the filtration rate is further improved.

Third Embodiment

Figure 10:
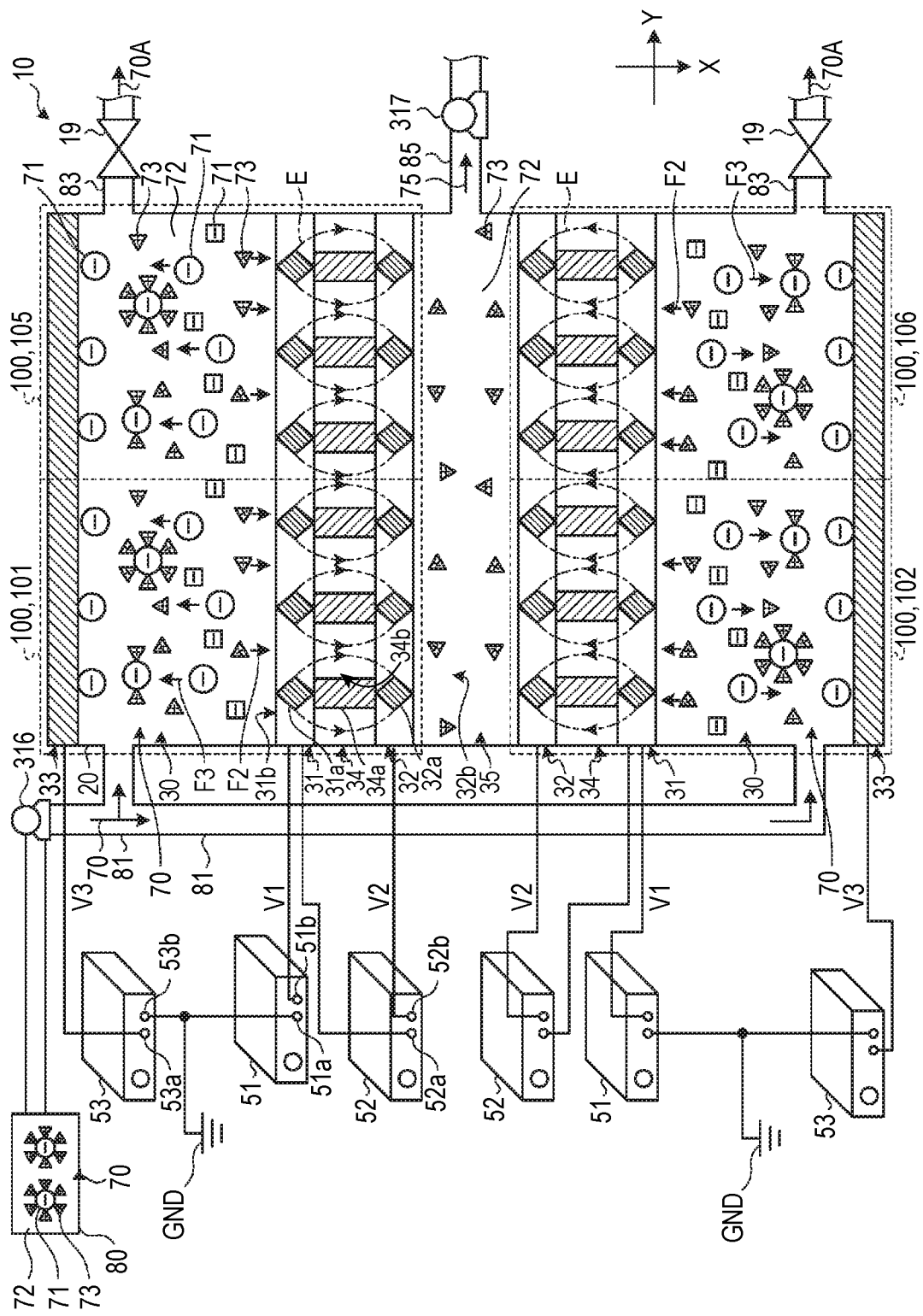
FIG. 10 is a schematic diagram of a filtration device according to a third embodiment.

FIG. 10 is a schematic diagram of a filtration device according to a third embodiment. Note that the same components as those described in the embodiment described above are designated by the same reference numerals, and duplicate description will be omitted. The filtration device 10 according to the third embodiment is a device that separates the first particles 71 from the slurry (raw material) 70 (material to be treated) that includes the first particles 71 dispersed in the polar solvent 72.

As shown in FIG. 10, the filtration device 10 according to the third embodiment includes a casing 20, four filtration units 100 arranged inside the casing 20, the second filter chamber 35, two first power supplies 51, two second power supplies 52 and two third power supplies 53. The four filtration units 100 include a filtration unit 101, a filtration unit 102, a filtration unit 105 and a filtration unit 106. The filtration unit 101 and the filtration unit 102 are arranged side by side in one direction X. The filtration unit 105 and the filtration unit 106 are arranged side by side in one direction X. The filtration unit 101 and the filtration unit 105 are arranged side by side in another direction Y orthogonal to one direction X. The filtration unit 102 and the filtration unit 106 are arranged side by side in another direction Y. Each filtration unit 100 includes the first filter chamber 30, the first electrode 31, the second electrode 32, the third electrode 33 and the filter medium 34.

The first filter chamber 30 is a space surrounded by the inner wall of the casing 20, the first electrode 31 and the third electrode 33. The first electrode 31 and the second electrode 32 are mesh-like electrodes. Specifically, the first electrode 31 includes a plurality of thin conductive wires 31a, and a plurality of first openings 31b are provided between the thin conductive wires 31a. The second electrode 32 includes a plurality of thin conductive wires 32a, and a plurality of second openings 32b are provided between the thin conductive wires 32a. The second electrode 32 is provided to face one surface (lower surface) of the first electrode 31 with the filter medium 34 interposed therebetween. In other words, the filter medium 34 is provided between the first electrode 31 and the second electrode 32. The first electrode 31 and the second electrode 32 are provided in direct contact with the filter medium 34. The plurality of thin conductive wires 31a and the plurality of thin conductive wires 32a are not particularly limited as long as the wires are made of a conductive material, and may be metal or carbon fiber, for example. The first electrode 31 and the second electrode 32 are not limited to being in direct contact with the filter medium 34, and may be arranged to not contact the filter medium 34.

As shown in FIG. 10, the third electrode 33 is a plate-like member and is provided to face the other surface (upper surface) of the first electrode 31 with the first filter chamber 30 interposed therebetween. The first electrode 31, the second electrode 32, the third electrode 33, and the filter medium 34 included in one filtration unit 100 are shared with the filtration unit 100 adjacent thereto in another direction Y. In other words, one first electrode 31, one second electrode 32, one third electrode 33 and one filter medium 34 are shared by the filtration units 100 adjacent to each other in another direction Y (a set of the filtration unit 101 and the filtration unit 105, and a set of the filtration unit 102 and the filtration unit 106).

In the filtration unit 101 and the filtration unit 105, a plurality of electrodes are arranged in order of the third electrode 33, the first electrode 31, and the second electrode 32 in one direction X (from top toward bottom in FIG. 10). In the filtration unit 102 and the filtration unit 106, a plurality of electrodes are arranged in order of the second electrode 32, the first electrode 31, and the third electrode 33 in one direction X (from top toward bottom in FIG. 10).

In FIG. 10, the first openings 31b of the first electrode 31, the second openings 32b of the second electrode 32, and the apertures 34b of the filter medium 34 are shown to have the same size, but the drawing is a schematic illustration for the purpose of explanation only, and the sizes of the first openings 31b, the second openings 32b, and the apertures 34b may be different from each other.

Note that the configuration of the filtration unit 100 shown in FIG. 10 is merely an example, and any configuration may be employed as long as the first filter chamber 30 can be formed and interposed between the first electrode 31, the second electrode 32, the filter medium 34, and the third electrode 33.

As shown in FIG. 10, the first electrode 31 is electrically connected to the second terminal 5l b of the first power supply 51. The first electrode 31 is electrically connected to the first terminal 52a of the second power supply 52. The second electrode 32 is electrically connected to the second terminal 52b of the second power supply 52. The third electrode 33 is electrically connected to the first terminal 53a of the third power supply 53. The second terminal 53b of the third power supply 53 and the first terminal 51a of the first power supply 51 are connected to the reference potential GND. The reference potential GND is a ground potential, for example. However, the reference potential GND is not limited thereto, and may be a predetermined fixed potential.

FIG. 9 is an electrical equivalent circuit diagram showing a filtration unit according to the third embodiment. As shown in FIG. 9, the first power supply 51 supplies the first electrode 31 with a first potential V1 having the same polarity as the polarity of the first particles 71. The first potential V1 is −30 V, for example. The second power supply 52 supplies the second electrode 32 with a second potential V2 having the same polarity as that of the first particles 71 and a greater absolute value than the absolute value of the first potential V1. The second potential V2 is −40 V, for example. The third power supply 53 supplies the third electrode 33 with a third potential V3 having a polarity different from that of the first particles 71. The third potential V3 is +30 V, for example. The absolute values of the first potential V1, the second potential V2, and the third potential V3 can be set within a range of 1 mV or more and 1000) V or less.

As shown in FIG. 9, the first power supply 51 and the third power supply 53 are constant voltage sources, and the second power supply 52 is a constant current source. The resistance component R1 and the capacitance component C are connected in parallel between the first electrode 31 and the second electrode 32. The resistance component R1 and the capacitance component C are equivalently represented by the filter medium 34 provided with a large number of apertures 34b. The resistance component R2 is connected between the first electrode 31 and the third electrode 33. The resistance component R2 is a resistance component equivalently represented by the slurry (raw material) 70 in the first filter chamber 30.

The second power supply 52 may be a constant voltage power supply or a constant current power supply. In the present embodiment, the second power supply 52 is a constant current source, so the second potential V2 changes according to the filtering state of the filtration device 10, that is, according to the variation of the resistance component R1 of the filter medium 34 and the resistance component R2 of the first filter chamber 30. However, the second potential V2 has the same polarity as the polarity of the first particles 71 and maintains a value greater than the absolute value of the first potential V1.

A slurry supply unit 81, a first discharge unit 83 and a second discharge unit 85 are connected to the casing 20. The slurry supply unit 81 is a pipe that is connected to a tank 80 storing the slurry (raw material) 70 via a pressurizing device 316. The slurry supply unit 81 is connected to the first filter chamber 30. The pressurizing device 316 is a pressurizing pump, for example. The slurry supply unit 81 supplies the slurry (raw material) 70 containing the first particles 71 to be separated and the polar solvent 72 to the first filter chamber 30 by the pressurizing device 316. The first discharge unit 83 is a pipe for discharging a part of the slurry (raw material) 70 from the first filter chamber 30. The first discharge unit 83 is connected to the first filter chamber 30. The first discharge unit 83 is provided at a position different from the slurry supply unit 81. The first discharge unit 83 includes a valve 19. When the valve 19 is open, the first discharge unit 83 discharges a part of a concentrated slurry 70A of the slurry (raw material) 70 introduced into the first filter chamber 30. The second discharge unit 85 is a pipe for discharging the filtrate 75 in the second filter chamber 35 from the second filter chamber 35. The second discharge unit 85 is connected to a depressurizing device 317. The depressurizing device 317 is a vacuum pump, for example. The filtrate 75 in the second filter chamber 35 is discharged outside by the differential pressure generated by the depressurizing device 317. The second filter chamber 35 is a space surrounded by the inner wall of the casing 20 and the two second electrodes 32. The second filter chamber 35 is arranged between two filtration units 100 arranged in the one direction X.

In the first filter chamber 30, by driving the electrodes, the vector sum F3 of the repulsive force and the attractive force acts on the first particles 71 of the slurry (raw material) 70, thus generating a concentration gradient in the state of dispersion of the first particles 71. The slurry (raw material) 70 with the separated first particles 71 passes through the first electrode 31, the filter medium 34 and the second electrode 32 in order, and flows into the second filter chamber 35. The filtrate 75 discharged to the second filter chamber 35 is stored in an external storage tank via the second discharge unit 85.

In the third embodiment, the first particles 71 to be separated in the slurry are biomass particles or colloidal particles, for example, and the particle surfaces are negatively charged. Specifically, the first particles 71 are *chlorella, spirulina* microalgae, colloidal silica, *Escherichia coli*, activated sewage sludge, or the like. The diameter of the first particle 71 varies according to the technical field to which it is applied and the type of target to be separated, but is approximately 5 nm or more and 2000 µm or less, for example, approximately 20 nm or more and 500 µm or less.

The polar solvent 72 in which the first particles 71 are dispersed is water in the present embodiment, and the water molecules 73 are positively charged. As a result, the slurry (raw material) 70 is in an electrically balanced state as a whole. The polar solvent 72 is not limited to water and may be alcohol or the like. That is, any solvent may be applied as the polar solvent 72 as long as the solvent is polar.

The slurry (raw material) 70 further contains the second particles 74 such as chromoprotein. The second particles 74 are charged to the same polarity (minus) as the first particles 71 and have a smaller particle size than the first particles 71. The second particles 74 are 10 nm or more and 300 nm or less, for example, about 30 nm. Note that there may be no second particles 74 in the slurry.

When the slurry (raw material) 70 is supplied to the first filter chamber 30, a repulsive force is generated between the negatively charged first particles 71 and the first electrode 31 based on Coulomb's law expressed by the Equation (1) described above. An attractive force is generated between the negatively charged first particles 71 and the third electrode 33.

Specifically, a stronger repulsive force is generated on the first particles 71 positioned closer to the first electrode 31, while a stronger attractive force is generated on the first particles 71 positioned closer to the third electrode 33. The vector sum F3 of the repulsive force and the attractive force generated in the first particles 71 acts in the direction indicated by the arrow, that is, in the direction away from the first electrode 31 and close to the third electrode 33. The negatively charged first particles 71 are moved toward the third electrode 33 by electrophoresis.

As a result, the filtration device 10 can prevent the first particles 71 from depositing and forming a cake layer on the surface of the first electrode 31 and the surface of the filter medium 34. That is, it is possible to prevent an increase in the filtration resistance of the aperture 34b of the filter medium 34.

The positively charged water molecules 73 generate an attractive force with the first electrode 31. The attractive force F2 acting on the positively charged water molecules 73 acts in the direction indicated by the arrow, that is, in the direction from the third electrode 33 toward the first electrode 31. The positively charged water molecules 73 move to the first electrode 31 side. Here, by the potential difference between the first electrode 31 and the second electrode 32, an electric field E directed from the first electrode 31 to the second electrode 32 is formed to penetrate the filter medium 34 in the thickness direction.

The positively charged water molecules 73 that moved to the first electrode 31 side are subjected to force by the electric field, pulled toward the second electrode 32 side by the attractive force F2 acting on the water molecules 73, and passed through the filter medium 34. As the positively charged water molecules 73 move, uncharged water molecules are also dragged toward the second electrode 32, forming an electroosmotic flow. As a result, the polar solvent 72 containing the positively charged water molecules 73 flows into the second filter chamber 35. As described above, by electrophoresis, the first particles 71 are separated from the first electrode 31 and moved toward the third electrode 33, and the filtrate 75 with the separated first particles 71 is discharged to the second filter chamber 35 side, and accordingly, it is possible to increase the concentration of the first particles 71 in the slurry (raw material) 70 in the first filter chamber 30.

Thus, the filtration device 10 can separate the first particles 71 by a combination of the electrophoresis in which the first particles 71 is moved by the Coulomb force F (the repulsive force generated between the first particles 71 and the first electrode 31) between the first electrode 31 and the third electrode 33 and the electroosmosis in which the water molecules 73 are moved by the electric field between the first electrode 31 and the second electrode 32 and passed through the filter medium 34. The first electrode 31 serves both as an electrophoretic electrode and an electroosmotic electrode. As a result, compared to the method for simply applying pressure to the slurry (raw material) 70 to separate the first particles 71 having a particle size greater than the apertures 34b of the filter medium 34, it is possible to prevent the formation of a cake layer on the surface of the first electrode 31 and the surface of the filter medium 34 and improve the filtration rate several times to ten times or more.

As a result, compared to the method for simply applying pressure to the slurry (raw material) 70, it is possible to increase the degree of concentration of the first particles 71 of the slurry (raw material) 70 in the first filter chamber 30. The frequency of cleaning and replacement of the filter medium 34 can be reduced, and the slurry (raw material) 70 can be filtered efficiently. Alternatively, compared to simply applying pressure to the slurry (raw material) 70 for filtration, it is possible to reduce the volume of the first filter chamber 30 and the area of the filter medium 34, and still achieve the filtration rate equivalent to that of the related filter. That is, the filtration device 10 can achieve size reduction.

By controlling the electric field formed between the first electrode 31 and the second electrode 32, the particle level (particle diameter) passing through the filter medium 34 can also be controlled. For example, by applying a first potential V1=−30 V to the first electrode 31 and applying a second potential V2=−40 V to the second electrode 32, a barrier electric field is formed between the first electrode 31 and the second electrode 32, and the second particles 74 having a particle size smaller than the aperture 34b of the filter medium 34 can be blocked from passing through the filter medium 34.

That is, even when the filter medium 34 equivalent to a microfiltration membrane (MF membrane) is used, by controlling the electric field between the electrodes with the first power supply 51, the second power supply 52, and the third power supply 53, it is possible to change the particle diameter to be separated to an ultrafiltration membrane (UF membrane) or nanofiltration membrane (NF membrane) equivalent. The ultrafiltration membrane (UF membrane) is a filtration membrane having a diameter of opening of approximately 10 nm or more and 100 nm or less. The nanofiltration membrane (NF membrane) is a filtration membrane having the diameter of opening of approximately 1 nm or more and 10 nm or less.

The configuration of the filtration device 10 described above is merely an example, and can be changed as appropriate. For example, the negative filter plate formed by stacking the first electrode 31, the filter medium 34, and the second electrode 32, and the third electrode 33 are arranged to face each other in a parallel plate shape. Aspects are not limited thereto, and the negative filter plate formed by stacking the first electrode 31, the filter medium 34 and the second electrode 32, and the third electrode 33 may each have a curved surface. The shape and arrangement of the negative filter plate and the third electrode 33 can be appropriately changed according to the shape and structure of the filtration device 10. The concentration of the slurry (raw material) 70, which is the material to be treated supplied to the first filter chamber 30, is not particularly limited, and can be changed according to the field to which the filtration device 10 is applied.

In the third embodiment, the internal pressure of the first filter chamber 30 is pressurized and is higher than the internal pressure of the second filter chamber 35. As another aspect, by reducing the internal pressure of the second filter chamber 35 to a negative pressure such as by vacuuming, the internal pressure of the first filter chamber 30 may be made relatively higher than the internal pressure of the second filter chamber 35.

A plurality of filtration units 100 of the third embodiment may be arranged side by side in a direction orthogonal to both one direction X and another direction Y (a depth direction of the paper surface in FIG. 10). That is, the plurality of filtration units 100 may be arranged three-dimensionally.

Each filtration unit 100 may be partitioned by partition walls between the units, or by virtual partition walls. If the partition walls are used for partitioning, the slurry inside may be moved by a member for communicating each unit (for example, an opening. a connecting passage, and the like).

The filtration device 10 may not necessarily include two first power supplies 51, two second power supplies 52 and two third power supplies 53, respectively. Among the first, second and third power supplies 51, 52 and 53, the number of power supplies that are constant voltage power supplies may be one. For example, when the first power supply 51 and the third power supply 53 are constant voltage power supplies, the number of first power supplies 51 may be one and the number of third power supplies 53 may be one. Here, the first power supply 51 is connected to a plurality of first electrodes 31 and the third power supply 53 is connected to a plurality of third electrodes 33.

The first potential V1, the second potential V2, and the third potential V3 are preferably changed as appropriate according to the type of the first particles 71 to be separated and the required filtration characteristics.

The filtration device 10 may not necessarily include the third power supply 53. Here, the third electrode 33 is connected to the reference potential GND, for example. If the third electrode 33 is connected to the reference potential GND, the size of the filtration device 10 can be reduced compared to the case in which the first electrode 31, the second electrode 32, and the third electrode 33 are each provided with the power supplies.

The filtration device 10 may not necessarily include both the pressurizing device 316 and the depressurizing device 317. The filtration device 10 may include only one of the pressurizing device 316 and the depressurizing device 317.

As described above, the filtration device 10 of the present embodiment includes a plurality of filtration units 100. The filtration unit 100 includes the first electrode 31, the second electrode 32, the filter medium 34, the first filter chamber 30 and the third electrode 33. The first electrode 31 is provided with a plurality of first openings 31b. The second electrode 32 is provided with a plurality of second openings 32b and is provided to face one surface of the first electrode 31. The filter medium 34 is provided with a plurality of apertures 34b and is provided between the first electrode 31 and the second electrode 32. The first filter chamber 30 is provided in contact with the other surface of the first electrode 31. The third electrode 33 is provided in the first filter chamber 30 and faces the first electrode 31. Two filtration units 100 are arranged side by side in one direction X. The filtration device 10 includes the second filter chamber 35 provided between the two second electrodes 32.

Accordingly, in each of the two filtration units 100, the first particles 71 are moved in the direction from the first electrode 31 toward the third electrode 33 by the Coulomb force F (repulsive force generated between the first particles 71 and the first electrode 31) generated in the first particles 71 between the first electrode 31 and the third electrode 33. By the electrophoresis, the formation of a cake layer on the surface of the first electrode 31 and the surface of the filter medium 34 can be prevented. It is possible to separate the first particles 71 by electroosmosis in which the water molecules 73 are moved by an electric field between the first electrode 31 and the second electrode 32 to pass through the filter medium 34, and increase the degree of concentration of the first particles 71 of the slurry (raw material) 70 in the first filter chamber 30. As a result, compared to the method for simply applying pressure to the slurry (raw material) 70 to separate the first particles 71 having a particle size greater than the apertures 34b of the filter medium 34, the filtration rate can be improved several times to ten times or more. By arranging the plurality of filtration units 100 as described above, the filtration device 10 can easily adjust the amount of the slurry (raw material) 70 in the first filter chamber 30.

In the filtration device 10, in one filtration unit 100 (the filtration unit 101), a plurality of electrodes in one direction X are arranged in order of the third electrode 33, the first electrode 31 and the second electrode 32. In the other filtration unit (filtration unit 102), a plurality of electrodes in one direction X are arranged in order of the second electrode 32, the first electrode 31, and the third electrode 33.

Accordingly, one filtration unit 100 (the filtration unit 101) and the other filtration unit 100 (the filtration unit 102) can share one second filter chamber 35. Therefore, compared to an example in which one second filter chamber 35 is provided in one filtration unit 100, the size of the filtration device 10 can be reduced.

In the filtration device 10, the first filter chamber 30 is connected to a slurry supply unit 81 for supplying the material to be treated (the slurry (raw material) 70) and to a first discharge unit 83 provided at a position different from the slurry supply unit 81 and for discharging a part of the material to be treated (a part of the slurry (raw material) 70 or the concentrated slurry 70A).

Accordingly, the filtration device 10 can easily adjust the amount of the material to be treated (the slurry (raw material) 70) in the first filter chamber 30.

In the filtration device 10, two filtration units 100 (the filtration unit 101 and the filtration unit 105) are arranged side by side in another direction Y orthogonal to one direction X.

Accordingly, the filtration device 10 can increase the amount of the slurry (raw material) 70 that can be filtered per unit time. Replacement of the filtration unit 100 is easier than the case of having one enlarged filtration unit 100.

In the filtration device 10, the second filter chamber 35 is connected to the second discharge unit 85 for discharging the filtrate 75 in the second filter chamber 35.

Accordingly, the filtration device 10 can easily convey the filtrate 75 to a storage tank outside the second filter chamber 35 or the like.

In the filtration device 10, in one filtration unit 100, the absolute value of the second potential V2 of the second electrode 32 is greater than the absolute value of the first potential V1 of the first electrode 31. A potential difference between the first potential V1 and the third potential V3 of the third electrode 33 is greater than a potential difference between the first potential V1 and the second potential V2.

Accordingly, even when the distance between the first electrode 31 and the third electrode 33 facing each other with the first filter chamber 30 interposed therebetween is greater than the distance between the first electrode 31 and the second electrode 32, by electrophoresis, the first particles 71 can be moved satisfactorily to the third electrode 33 side.

The filtration device 10 may include the first power supply 51 that is a constant voltage power supply, and one first power supply 51 may supply the first potential V1 to the plurality of first electrodes 31. When the second power supply 52 of the filtration device 10 is a constant voltage power supply, the second potential V2 may be supplied to a plurality of second electrodes 32 from one second power supply 52. The filtration device 10 may include the third power supply 53 that is a constant voltage power supply, and one third power supply 53 may supply the third potential V3 to the plurality of third electrodes 33.

Accordingly, the filtration device 10 can simplify the power supply device and reduce the manufacturing cost.

Modification of Third Embodiment

Figure 11:
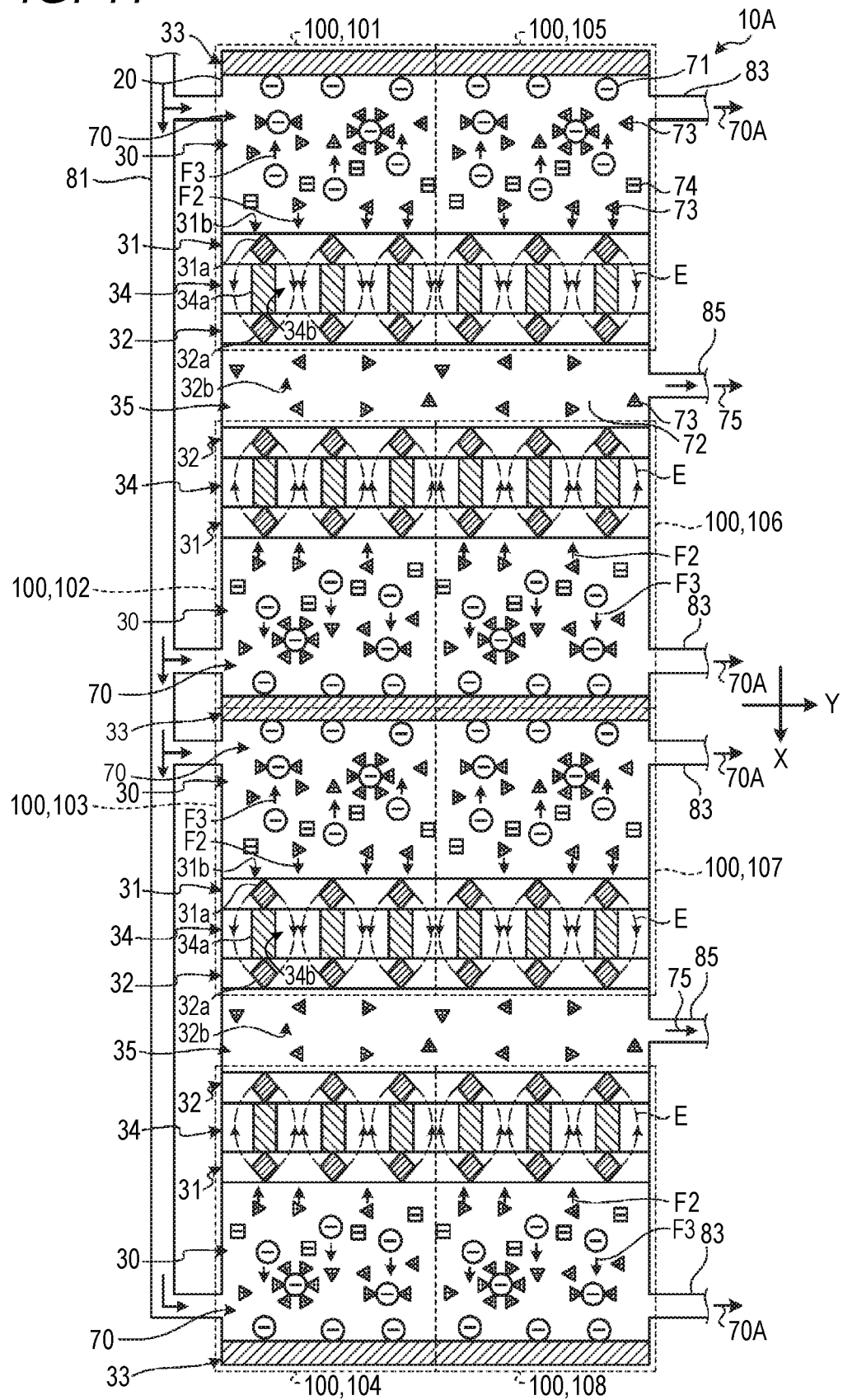
FIG. 11 is a schematic diagram of a filtration device according to a modification of the third embodiment.

FIG. 11 is a schematic diagram of a filtration device according to a modification of the third embodiment. Note that the same components as those described in the embodiment described above are designated by the same reference numerals, and duplicate description will be omitted.

As shown in FIG. 11, the filtration device 10A according to the modification includes eight filtration units 100 and two second filter chambers 35. Since the configuration is the same as shown in FIG. 10, the illustration is omitted, but the filtration device 10A according to the modification includes four first power supplies 51, four second power supplies 52 and four third power supplies 53.

The eight filtration units 100 include the filtration unit 101, the filtration unit 102, the filtration unit 103, the filtration unit 104, the filtration unit 105, the filtration unit 106, a filtration unit 107, and a filtration unit 108.

The filtration unit 101, the filtration unit 102, the filtration unit 103, and the filtration unit 104 are arranged side by side in one direction X. The filtration unit 105 and the filtration unit 106, and the filtration unit 107 and the filtration unit 108 are arranged side by side in one direction X. The filtration unit 103 and the filtration unit 107 are arranged side by side in another direction Y. The filtration unit 104 and the filtration unit 108 are arranged side by side in another direction Y.

The first electrode 31, the second electrode 32, the third electrode 33, and the filter medium 34 included in one filtration unit 100 are shared with the filtration unit 100 adjacent thereto in another direction Y. In other words, one first electrode 31, one second electrode 32, one third electrode 33 and one filter medium 34 are shared by the filtration units 100 adjacent to each other in another direction Y (a set of the filtration unit 103 and the filtration unit 107, and a set of the filtration unit 104 and the filtration unit 108).

In the filtration unit 103 and the filtration unit 107, a plurality of electrodes are arranged in order of the third electrode 33, the first electrode 31, and the second electrode 32 in one direction X (from top toward bottom in FIG. 11). In the filtration unit 104 and the filtration unit 108, a plurality of electrodes are arranged in order of the second electrode 32, the first electrode 31, and the third electrode 33 in one direction X (from top toward bottom in FIG. 11).

The third electrode 33 included in the filtration unit 102 is shared with the filtration unit 103 adjacent thereto in one direction X. The third electrode 33 included in the filtration unit 106 is shared with the filtration unit 107 adjacent thereto in one direction X. In other words, two first filter chambers 30 arranged side by side in one direction X is partitioned by the third electrode 33 shared by the filtration units 100 adjacent to each other in one direction X (the set of filtration unit 102 and filtration unit 103, and the set of filtration unit 106 and filtration unit 107). As shown in FIG. 11, in the filtration unit of the present embodiment, the device configuration can be made compact by sharing the third electrode 33.

Note that the four filtration units 100 may not be necessarily arranged side by side in one direction X in the filtration device 10A. The number of filtration units 100 arranged in one direction X may be three, five or more. The third electrode 33 arranged between the two first filter chambers 30 arranged side by side in the one direction X may not be necessarily shared by the two filtration units 100. That is, two third electrodes 33 insulated from each other may be arranged between the two first filter chambers 30 arranged side by side in one direction X.

The plurality of filtration units 100 may be arranged side by side in a direction (a depth direction of the paper surface in FIG. 11) orthogonal to both one direction X and another direction Y. That is, the plurality of filtration units 100 may be arranged three-dimensionally.

The filtration device 10A does not necessarily include four first power supplies 51, four second power supplies 52, and four third power supplies 53, respectively. Among the first, second and third power supplies 51, 52 and 53, the number of power supplies that are constant voltage power supplies may be one. For example, when the first power supply 51 and the third power supply 53 are constant voltage power supplies, the number of first power supplies 51 may be one and the number of third power supplies 53 may be one. Here, the first power supply 51 is connected to a plurality of first electrodes 31 and the third power supply 53 is connected to a plurality of third electrodes 33.

As described above, in the filtration device 10A of the modification, three or more filtration units 100 are arranged side by side. The two first filter chambers 30 arranged side by side is partitioned by the third electrode 33 shared by the adjacent filtration units 100.

Accordingly, the wall separating the two first filter chambers 30 arranged side by side becomes thinner. The required number of third power supplies can be reduced. Therefore, compared with the example in which the third electrode 33 is not shared, the filtration device 10A can achieve size reduction.

Fourth Embodiment

Figure 12A:
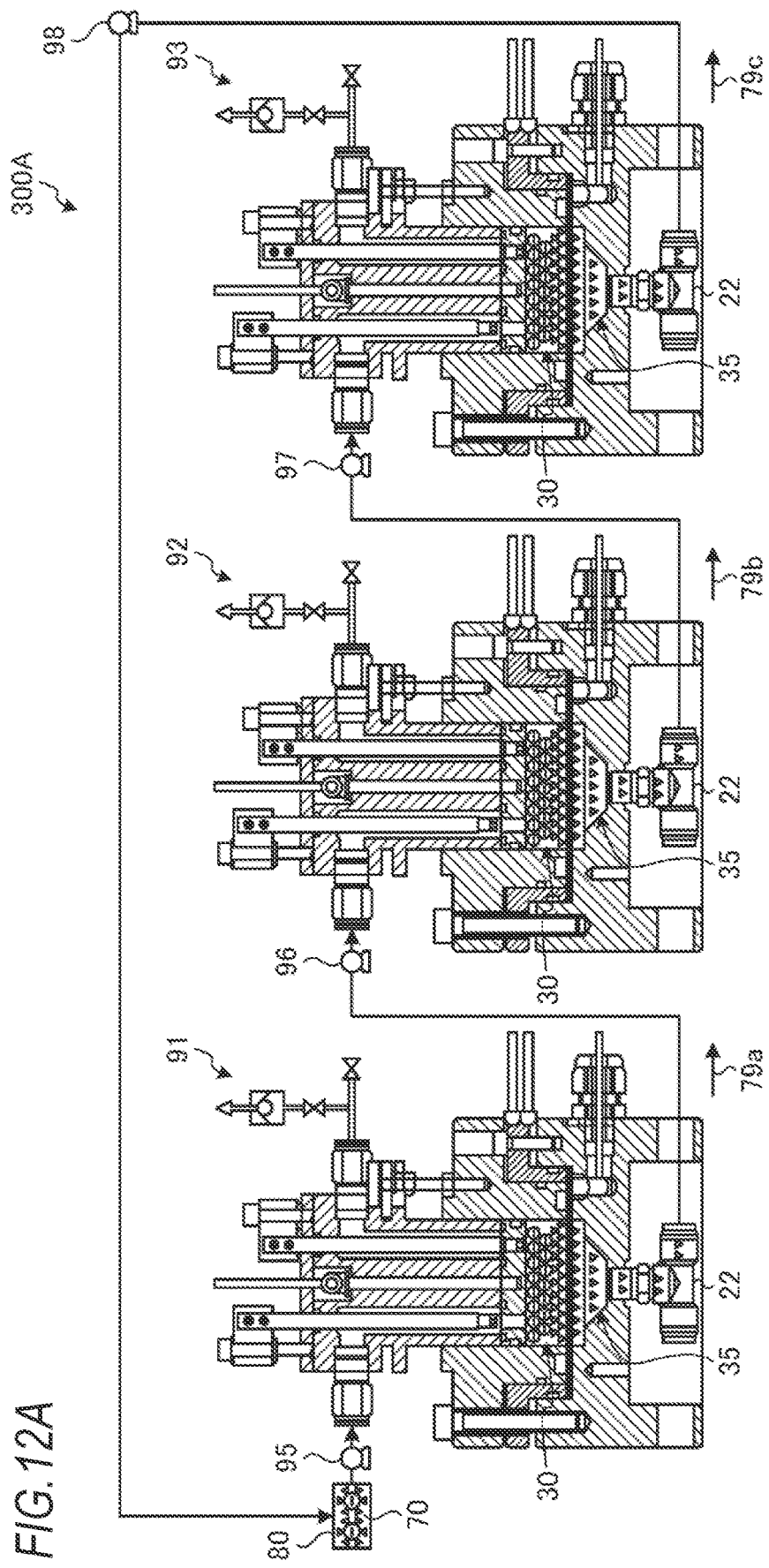
FIG. 12A is a cross-sectional view schematically showing a configuration example of a filtration system according to a fourth embodiment.
Figure 12B:
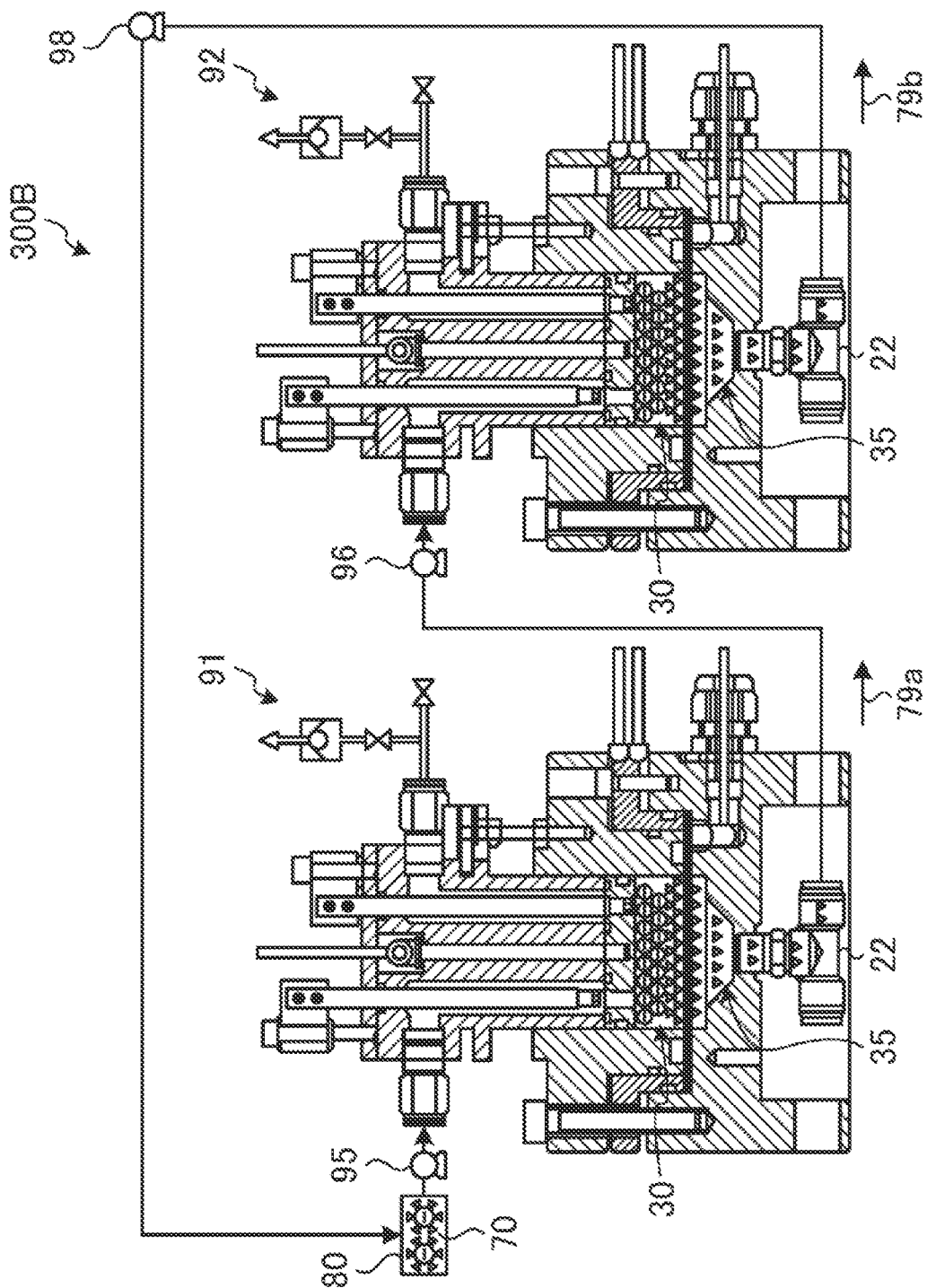
FIG. 12B is a cross-sectional view schematically showing a configuration example of the filtration system according to the fourth embodiment.
Figure 13:
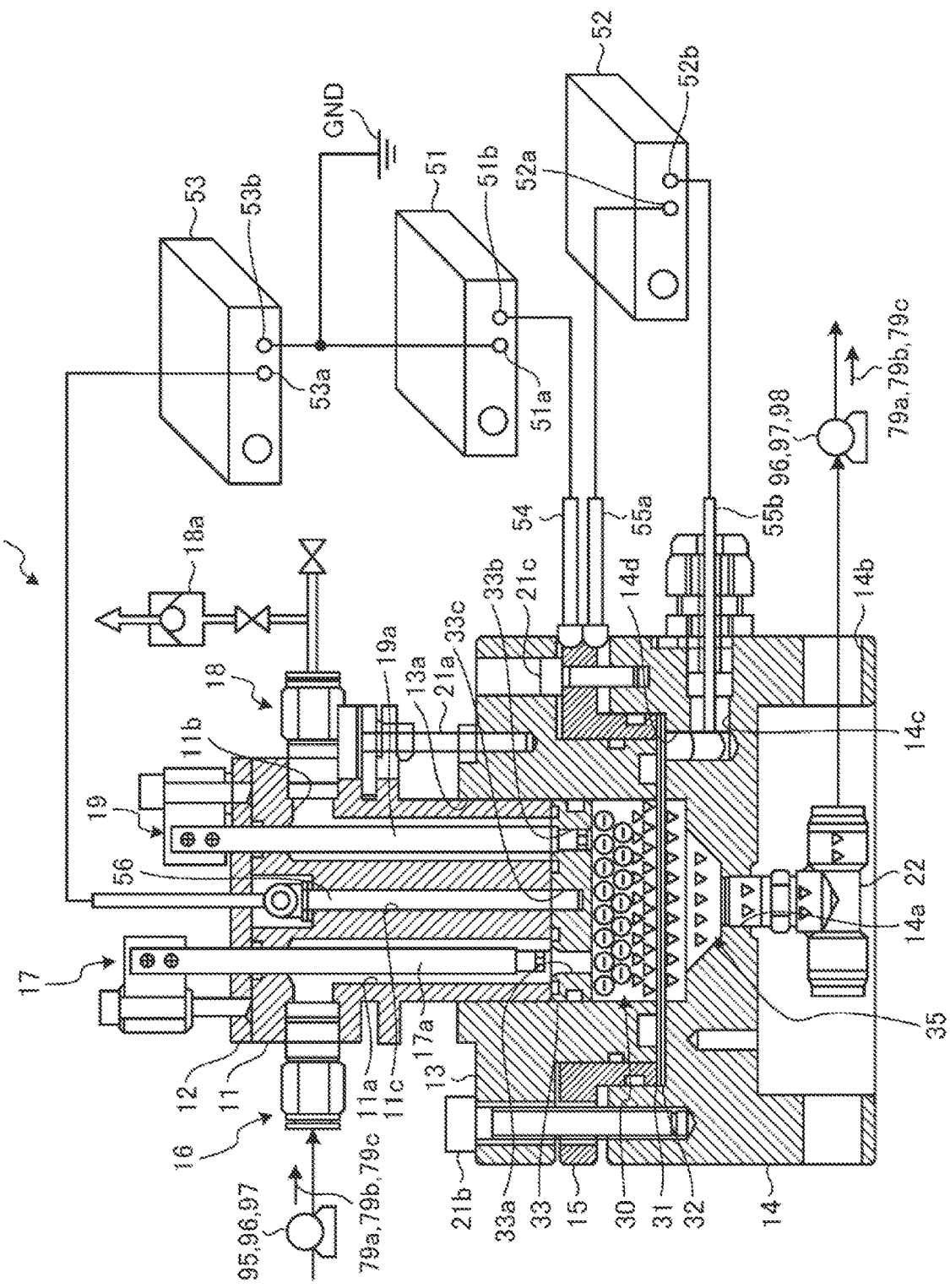
FIG. 13 is a cross-sectional view schematically showing a configuration example of a first filtration device, a second filtration device, and a third filtration device according to the fourth embodiment.
Figure 14:
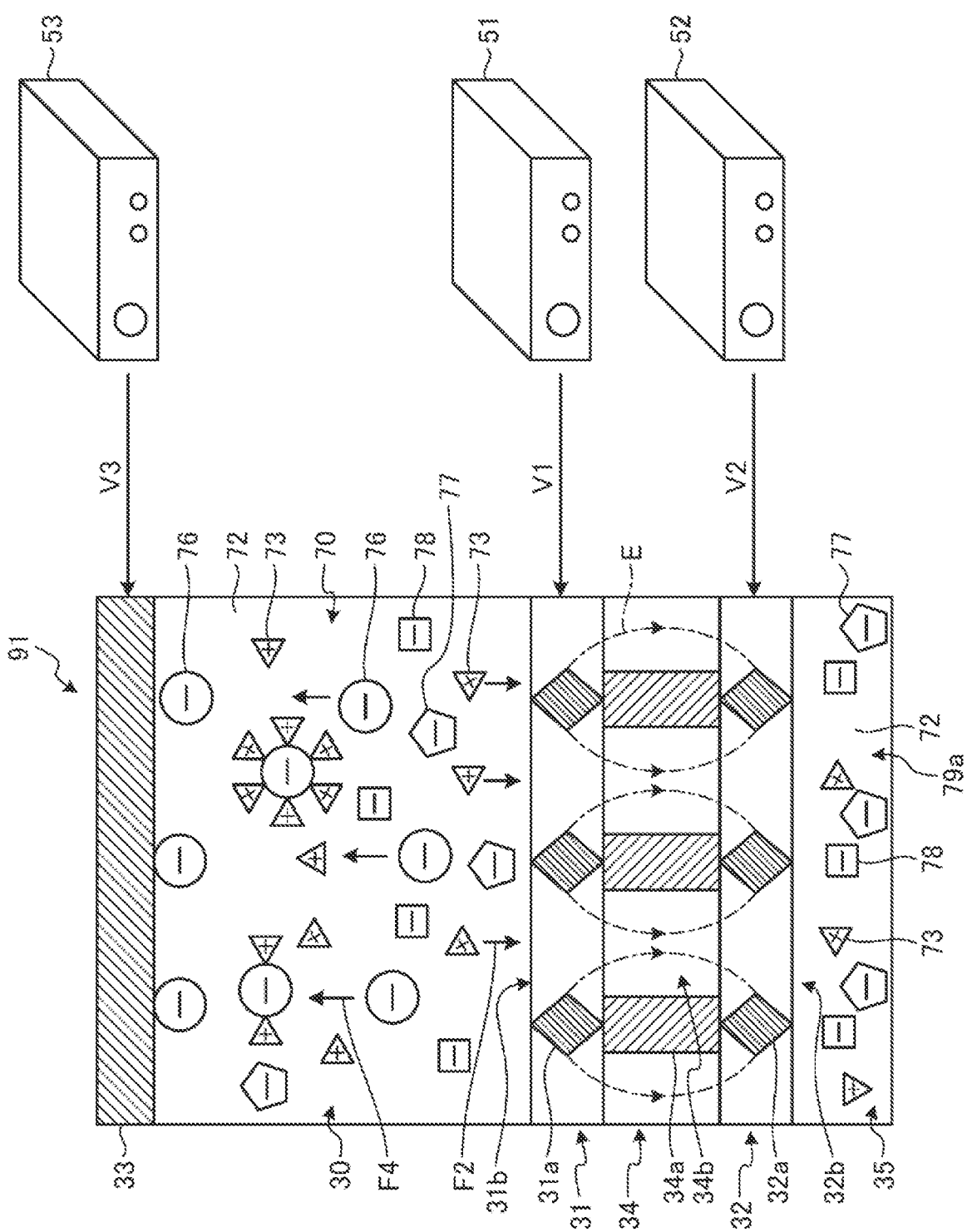
FIG. 14 is a schematic diagram of the first filtration device according to the fourth embodiment.
Figure 15:
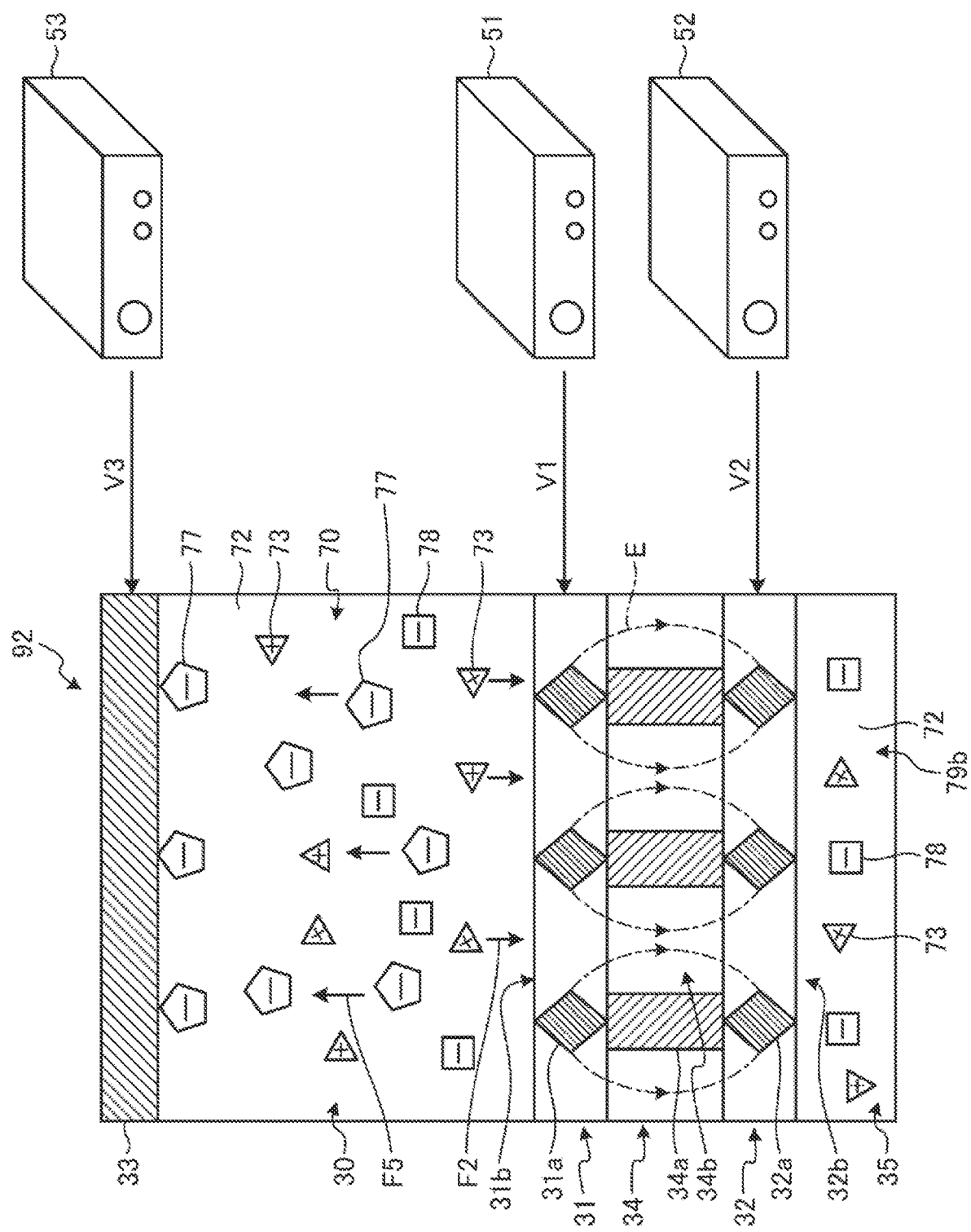
FIG. 15 is a schematic diagram of the second filtration device according to the fourth embodiment.
Figure 16:
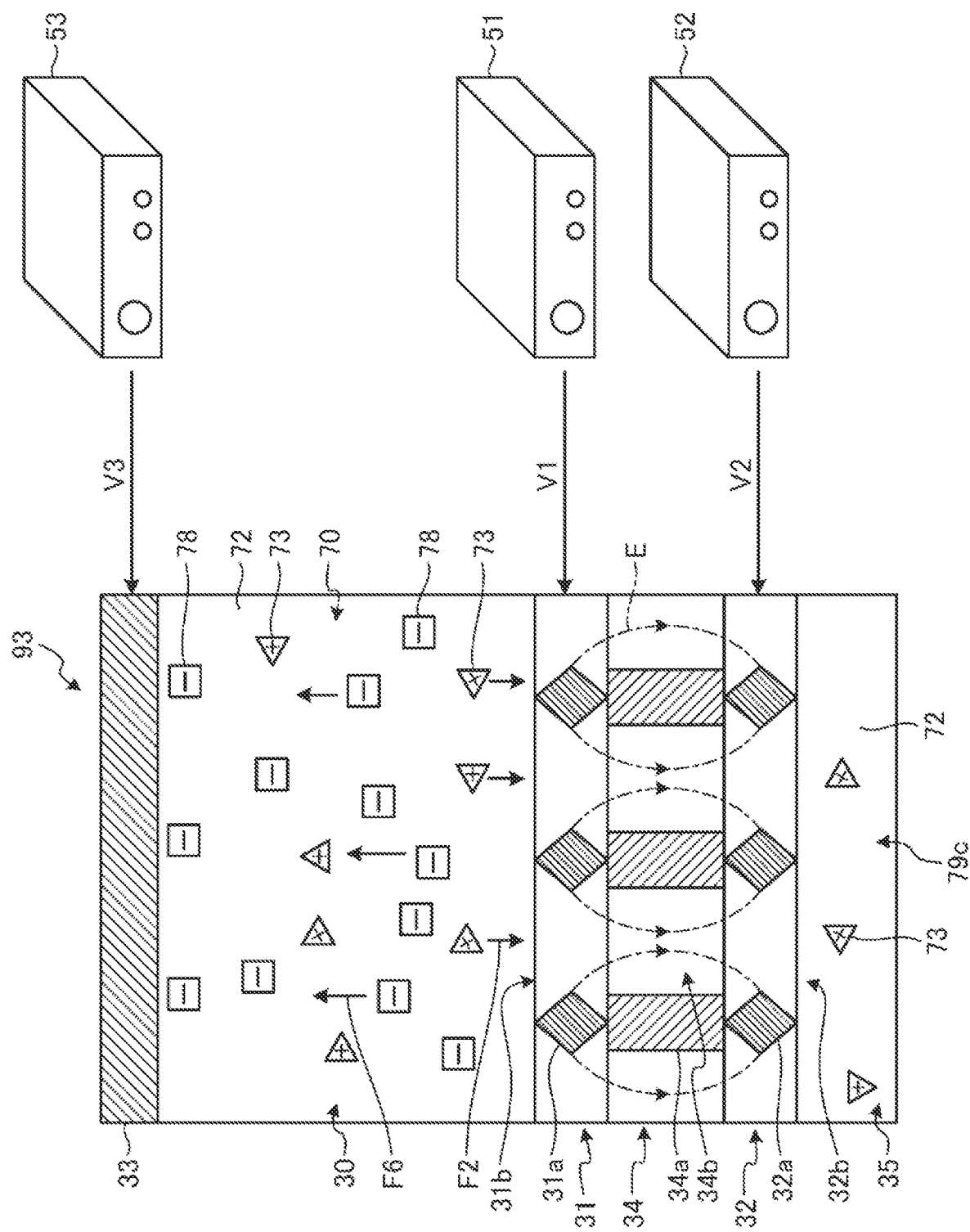
FIG. 16 is a schematic diagram of the third filtration device according to the fourth embodiment.

FIGS. 12A and 12B are cross-sectional views schematically showing a configuration example of a filtration system according to the fourth embodiment. FIG. 13 is a cross-sectional view schematically showing a configuration example of a filtration device according to the fourth embodiment. FIG. 14 is a schematic diagram of a first filtration device according to the fourth embodiment. FIG. 15 is a schematic diagram of a second filtration device according to the fourth embodiment. FIG. 16 is a schematic diagram of a third filtration device according to the fourth embodiment. Note that the same components as those described in the embodiment described above are designated by the same reference numerals, and duplicate description will be omitted.

As shown in FIGS. 12A, 14, 15 and 16, a filtration system 300A is a device that separates three types of targets to be separated from the slurry (raw material) 70 (material to be treated) including third particles 76 dispersed in the polar solvent 72.

As shown in FIGS. 12B, 14 and 15, a filtration system 300B is a device that separates two types of targets to be separated from the slurry (raw material) 70 (material to be treated) including the third particles 76 dispersed in the polar solvent 72.

As shown in FIGS. 12A, 14, 15 and 16, the filtration system 300A according to the fourth embodiment is a device for separating the third particles 76, fourth particles 77 and fifth particles 78 from the slurry (raw material) 70 including the third particles 76, the fourth particles 77 and the fifth particles 78 dispersed in the polar solvent 72. As shown in FIG. 12A, the filtration system 300A according to the fourth embodiment includes a first filtration device 91, a second filtration device 92, a third filtration device 93, a first pressurizing device 95, a second pressurizing device 96, a third pressurizing device 97, and a fourth pressurizing device 98.

As shown in FIG. 13, the first filtration device 91, the second filtration device 92 and the third filtration device 93 according to the fourth embodiment are connected to each other in series. Each of the first filtration device 91, the second filtration device 92, and the third filtration device 93 includes the upper casing 11, the lid portion 12, the side casing 13, the lower casing 14, and the conductor 15. Each of the first filtration device 91, the second filtration device 92, and the third filtration device 93 further includes the first filter chamber 30, the first electrode 31, the second electrode 32, the third electrode 33, and the filter medium 34 (see FIGS. 14 to 16) in the internal space surrounded by the upper casing 11, the side casing 13, and the lower casing 14. Each of the first filtration device 91, the second filtration device 92 and the third filtration device 93 further includes the first power supply 51, the second power supply 52 and the third power supply 53 electrically connected to the first electrode 31, the second electrode 32 and the third electrode 33.

Specifically, the upper casing 11 is a cylindrical member made of an insulating material. The side casing 13 is an annular member made of an insulating material and having a through hole 13a. A portion of a lower end side of the upper casing 11 is inserted into the through hole 13a of the side casing 13. The lower casing 14 is made of an insulating material and supports the side casing 13. The lid portion 12 is provided to cover the upper surface of the upper casing 11.

The outer edges of the first electrode 31, the second electrode 32, and the filter medium 34 (see FIGS. 14 to 16) are interposed and fixed between the side casing 13 and the lower casing 14. The third electrode 33 is fixed to the lower surface of the upper casing 11 (the surface facing the lower casing 14) with a connection member (not shown) such as a bolt, and is positioned inside the through hole 13a of the side casing 13. The conductor 15 is an annular member provided to surround the side casing 13 and is provided between the side casing 13 and the lower casing 14. A lower end side of the conductor 15 is connected to an outer edge of the first electrode 31.

The upper casing 11 and the side casing 13 are fixed by a guide portion 21a. The side casing 13, the lower casing 14 and the conductor 15 are fixed by bolts 21b and 21c. As a result, the casings are fixed in position, and the first filter chamber 30 is formed in a space surrounded by the first electrode 31, the second electrode 32, the filter medium 34, an inner wall of the side casing 13, and the third electrode 33. A sealing member such as an O-ring is provided at each connection portion between the casings and between the electrodes, so that the first filter chamber 30 is provided in a sealed manner. The upper casing 11 is provided such that a distance from the lower casing 14 can be adjusted. As a result, the first filtration device 91, the second filtration device 92 and the third filtration device 93 can appropriately set the volume of the first filter chamber 30 according to the type and amount of the slurry (raw material) 70.

The upper casing 11 is provided with a slurry supply passage 11a, an exhaust passage 11b, and a through hole 11c. One end side of the slurry supply passage 11a is open through a side surface of the upper casing 11 and is connected to a slurry supply unit 16. The other end side of the slurry supply passage 11a is open through the lower surface of the upper casing 11 and is connected to a through hole 33a of the third electrode 33. The slurry supply valve 17 includes a rod-shaped member provided inside the slurry supply passage 11a, and the rod-shaped member is moved vertically in the slurry supply passage 11a, thereby switching the through hole 33a between open and closed states.

As a result, for example, when the through hole 33a is open by the operation of the slurry supply valve 17, the slurry (raw material) 70 is supplied to the first filter chamber 30 of the first filtration device 91 via the slurry supply unit 16, the slurry supply passage 11a and the through hole 33a of the third electrode 33. When the through hole 33a is closed by the slurry supply valve 17, the supply of the slurry (raw material) 70 to the first filter chamber 30 of the first filtration device 91 is stopped.

One end side of the exhaust passage 11b is open through the side surface of the upper casing 11 and is connected to an air discharge unit 18. The other end side of the exhaust passage 11b is open through the lower surface of the upper casing 11 and is connected to the through hole 33b of the third electrode 33. The air discharge valve 19 includes a rod-shaped member provided inside the exhaust passage 11b, and the rod-shaped member is moved vertically inside the exhaust passage 11b, thereby switching the through hole 33b between open and closed states.

In the first filtration device 91, when the slurry (raw material) 70 is supplied to the first filter chamber 30 from the tank 80, the air discharge valve 19 opens the through hole 33b. As a result, the air in the first filter chamber 30 is exhausted to the outside through the through hole 33b, the exhaust passage 11b, and the air discharge unit 18. An air discharge valve 18a is connected to the air discharge unit 18. For example, the air discharge valve 18a is a float valve, and is provided such that the air discharge valve 18a is closed when a predetermined amount of air in the first filter chamber 30 is exhausted. After exhaust from the first filter chamber 30 is completed, the air discharge valve 19 closes the through hole 33b. As a result, a predetermined pressure is applied to the slurry (raw material) 70 filled in the first filter chamber 30 by the first pressurizing device 95 through the slurry supply unit 16.

One end side of the through hole 11c is open through the upper surface of the upper casing 11. The other end side of the through hole 11c is open through the lower surface of the upper casing 11 and is connected to a concave portion 33c of the third electrode 33. The connection conductor 56 is inserted into the through hole 11c, and the connection conductor 56 and the third electrode 33 are connected to each other at the concave portion 33c. As a result, the third electrode 33 is electrically connected to a first terminal 53a of the third power supply 53 via the connection conductor 56.

The first electrode 31 is electrically connected to a second terminal 51b of the first power supply 51 via the conductor 15 and the connection conductor 54. The first electrode 31 is electrically connected to a first terminal 52a of the second power supply 52 via the conductor 15 and the connection conductor 55a. The second terminal 53b of the third power supply 53 and the first terminal 51a of the first power supply 51 are connected to the reference potential GND. The reference potential GND is a ground potential, for example. However, the reference potential GND is not limited thereto, and may be a predetermined fixed potential.

The lower casing 14 is provided with a concave second filter chamber 35, through holes 14a and 14b, and a connection hole 14c. The second filter chamber 35 is provided at a position overlapping the first filter chamber 30 on the upper surface of the lower casing 14. The through hole 14a connects the second filter chamber 35 and a discharge unit 22.

As shown in FIG. 14, in the first filtration device 91, by driving each electrode, the vector sum F4 of the repulsive force and the attractive force acts on the negatively charged third particles 76 of the slurry (raw material) 70, thus generating a concentration gradient in the state of dispersion of the third particles 76. The slurry (raw material) 70 with the separated negatively charged third particles 76 are passed through the first electrode 31, the filter medium 34 and the second electrode 32, and flows into the second filter chamber 35 as a first intermediate treated material 79a. As shown in FIG. 12A, the first intermediate treated material 79a containing the fourth particles 77 and the fifth particles 78 in the second filter chamber 35 of the first filtration device 91 is guided to the discharge unit 22. The discharge unit 22 of the first filtration device 91 is connected to the first filter chamber 30 of the second filtration device 92 arranged in series on the downstream side of the first filtration device 91 via the second pressurizing device 96. The first intermediate treated material 79a containing the fourth particles 77 and the fifth particles 78 is supplied to the first filter chamber 30 of the second filtration device 92.

As shown in FIG. 15, in the second filtration device 92, by driving the respective electrodes, the vector sum F5 of the repulsive force and the attractive force acts on the negatively charged fourth particles 77 of the first intermediate treated material 79a, thus generating a concentration gradient in the state of dispersion of the fifth particles 78. The first intermediate treated material 79a containing the fifth particles 78 and the separated fourth particles 77 are passed through the first electrode 31, the filter medium 34 and the second electrode 32 in turn and flows into the second filter chamber 35. As shown in FIG. 12A, a second intermediate treated material 79b containing the fifth particles 78 in the second filter chamber 35 of the second filtration device 92 is guided to the discharge unit 22. The discharge unit 22 of the second filtration device 92 is connected to the first filter chamber 30 of the third filtration device 93 via the third pressurizing device 97. The second intermediate treated material 79b containing the fifth particles 78 is supplied to the first filter chamber 30 of the third filtration device 93 arranged in series on the downstream side of the second filtration device 92.

As shown in FIG. 16, in the third filtration device 93, by driving each electrode, the vector sum F6 of the repulsive force and the attractive force acts on the negatively charged fifth particles 78 of the second intermediate treated material 79b, thus generating a concentration gradient in the state of dispersion of the negatively charged fifth particles 78. The second intermediate treated material 79b with the separated negatively charged fifth particles 78 are passed through the first electrode 31, the filter medium 34 and the second electrode 32 in turn and flows into the second filter chamber 35. As shown in FIG. 12A, a third intermediate treated material 79c (filtrate) in the second filter chamber 35 of the third filtration device 93 is guided to the discharge unit 22. The discharge unit 22 of the third filtration device 93 is connected to the tank 80 via the fourth pressurizing device 98. The third intermediate treated material 79c is supplied to the tank 80. The third intermediate treated material 79c, that is, the filtrate is a clear polar solvent 72 including the water molecules 73.

As described above, the first pressurizing device 95 pressurizes the slurry (raw material) 70 containing the target to be separated, which is stored in the tank 80, and supplies the slurry to the first filter chamber 30 of the first filtration device 91. The second pressurizing device 96 pressurizes the first intermediate treated material 79a discharged from the second filter chamber 35 of the first filtration device 91 and supplies the same to the first filter chamber 30 of the second filtration device 92. The third pressurizing device 97 pressurizes the second intermediate treated material 79b discharged from the second filter chamber 35 of the second filtration device 92 and supplies the same to the first filter chamber 30 of the third filtration device 93. The fourth pressurizing device 98 pressurizes the third intermediate treated material 79c (filtrate) discharged from the second filter chamber 35 of the third filtration device 93 and returns the same to the tank 80. The first pressurizing device 95, the second pressurizing device 96, the third pressurizing device 97 and the fourth pressurizing device 98 are pressure pumps, for example. Conveying the liquid using the fourth pressurizing device 98 and piping are also referred to as a fluid conveyor. The fourth pressurizing device 98 circulates the particles in the system using the clear polar solvent 72, which is the filtrate discharged from the second filter chamber 35 of the third filtration device 93, as a carrier fluid. In the filtration system 300A, diafiltration (a method for recovering a target to be separated in the slurry (raw material) 70 by filtering while adding the same amount of solvent as the amount of filtrate to the slurry (raw material) 70) may be used.

One end side of the connection hole 14c is open through the upper surface of the lower casing 14, and the outer edge of the second electrode 32 is provided to cover the connection hole 14c. The other end side of the connection hole 14c is open through the side surface of the lower casing 14. A connection conductor 55b is inserted into the connection hole 14c, and the connection conductor 55b and the second electrode 32 are connected. As a result, the second electrode 32 is electrically connected to a second terminal 52b of the second power supply 52.

Each configuration of the first filtration device 91, the second filtration device 92, and the third filtration device 93 shown in FIG. 13 is merely an example, and any configuration may be employed as long as the first filter chamber 30 can be formed and interposed between the first electrode 31, the second electrode 32, the filter medium 34, and the third electrode 33.

Next, operations of the first filtration device 91, the second filtration device 92 and the third filtration device 93 will be described with reference to FIGS. 14 to 16. In FIGS. 14 to 16, for ease of explanation, the arrangement relationship between the first electrode 31, the second electrode 32, the third electrode 33, the filter medium 34, and the first filter chamber 30 and the second filter chamber 35 is schematically shown.

As shown in FIGS. 14 to 16, the first electrode 31 and the second electrode 32 are mesh-like electrodes. Specifically, the first electrode 31 includes a plurality of thin conductive wires 31a, and a plurality of first openings 31b are provided between the thin conductive wires 31a. The second electrode 32 includes a plurality of thin conductive wires 32a, and a plurality of second openings 32b are provided between the thin conductive wires 32a. The second electrode 32 is provided to face one surface (lower surface) of the first electrode 31 with the filter medium 34 interposed therebetween. In other words, the filter medium 34 is provided between the first electrode 31 and the second electrode 32. The first electrode 31 and the second electrode 32 are provided in direct contact with the filter medium 34. The plurality of thin conductive wires 31a and the plurality of thin conductive wires 32a are not particularly limited as long as the wires are made of a conductive material, and may be metal or carbon fiber, for example. The first electrode 31 and the second electrode 32 are not limited to being in direct contact with the filter medium 34, and may be arranged to not contact the filter medium 34.

The filter medium 34 includes the filtration membrane 34a and the apertures 34b. The plurality of apertures 34b are provided in the filtration membrane 34a. An electric field acts on the filtration membrane 34a. For the filter medium 34, a microfiltration membrane (MF membrane), an ultrafiltration membrane (UF membrane), or the like is used, for example. In the thirty fourth embodiment, the filter medium 34 is made of an insulating material such as a resin material. Note that while the first openings 31b of the first electrode 31, the second openings 32b of the second electrode 32, and the apertures 34b of the filter medium 34 are shown to have the same size in FIGS. 14 to 16, the drawing is a schematic illustration for the purpose of explanation only, and the sizes of the first openings 31b, the second openings 32b, and the apertures 34b may be different from each other.

The first filter chamber 30 is provided in contact with the other surface (upper surface) of the first electrode 31. As described above, the slurry (raw material) 70 containing the target to be separated, that is, the third particles 76, the fourth particles 77 and the fifth particles 78, and the polar solvent 72 is supplied to the first filter chamber 30. For example, the third particles 76 are biomass particles or colloidal particles, and the particle surfaces thereof are negatively charged. Specifically, in the fourth embodiment, the third particles 76 are *chlorella*, microalgae *spirulina*, colloidal silica, *Escherichia coli*, activated sewage sludge, and the like, for example. The diameter of the third particle 76 varies according to the technical field to which it is applied and the type of target to be separated, but is approximately 100 nm or more and 2000 μm or less, for example, approximately 200 nm or more and 100 μm or less, for example. For example, the fourth particles 77 are high-molecular weight polysaccharide, and the particle surfaces thereof are negatively charged. The diameter of the fourth particles 77 is less than the diameter of the third particles 76. The diameter of the fourth particle 77 varies according to the technical field to which it is applied and the type of target to be separated, but is 30 nm or more and 500 nm or less, for example, about 100 nm, for example. For example, the fifth particles 78 are low-molecular weight polysaccharide, and the particle surfaces are negatively charged. The diameter of the fifth particles 78 is less than the diameter of the fourth particles 77. The diameter of the fifth particle 78 varies according to the technical field to be applied and the type of target to be separated, but is 5 nm or more and 100 nm or less, for example, about 20 nm, for example.

For the target to be separated present in the slurry 70 used in the present embodiment, microalgae is used, in which the negatively charged third particles 76 produce polysaccharides extracellularly during cultivation, but the present embodiment is not limited thereto. The operation of the electrofiltration using the polysaccharides produced by the third particles 76 during cultivation, that is, using the fourth particles 77 obtained by negatively charging high-molecular weight polysaccharide and the fifth particles 78 obtained by negatively charging low-molecular weight polysaccharide, will be described below.

The polar solvent 72 in which the third particles 76, the fourth particles 77, and the fifth particles 78 are dispersed is water, and the water molecules 73 are positively charged. As a result, the slurry (raw material) 70 is in an electrically balanced state as a whole. The polar solvent 72 is not limited to water and may be alcohol or the like.

The first power supply 51 supplies the first electrode 31 with a first potential V1 having the same polarity as the third particles 76, the fourth particles 77 and the fifth particles 78. The first potential V1 in the first filtration device 91 is −20 V, for example. The first potential V1 in the second filtration device 92 is −40 V, for example. The first potential V1 in the third filtration device 93 is −60 V, for example.

The second power supply 52 supplies the second electrode 32 with the second potential V2 having the same polarity as the polarities of the third particles 76, the fourth particles 77, and the fifth particles 78 and having a greater absolute value than the absolute value of the first potential V1. The second potential V2 in the first filtration device 91 is −30 V, for example. The second potential V2 in the second filtration device 92 is −50 V, for example. The second potential V2 in the third filtration device 93 is −70 V, for example.

The third power supply 53 supplies the third electrode 33 with the third potential V3 having a polarity different from that of the third particles 76. The third potential V3 in the first filtration device 91, the second filtration device 92 and the third filtration device 93 is +30 V, for example. The absolute values of the first potential V1, the second potential V2, and the third potential V3 can be set within a range of 1 mV or more and 1000 V or less.

In the first filtration device 91, a first potential difference (50 V) between the first potential V1 (−20 V) of the first electrode 31 and the third potential V3 (+30 V) of the third electrode 33 is greater than a second potential difference (10 V) between the first potential V1 (−20 V) and the second potential V2 (−30 V) of the second electrode 32.

In the second filtration device 92, a first potential difference (70 V) between the first potential V1 (−40 V) of the first electrode 31 and the third potential V3 (+30 V) of the third electrode 33 is greater than the second potential difference (10 V) between the first potential V1 (−40 V) and the second potential V2 (−50 V) of the second electrode 32.

In the third filtration device 93, a first potential difference (90 V) between the first potential V1 (−60 V) of the first electrode 31 and the third potential V3 (+30 V) of the third electrode 33 is greater than the second potential difference (10 V) between the first potential V1 (−60 V) and the second potential V2 (−70 V) of the second electrode 32.

The first potential difference (70 V) in the second filtration device 92 is greater than the first potential difference (50V) in the first filtration device 91. The first potential difference (90 V) in the third filtration device 93 is greater than the first potential difference (50 V) in the first filtration device 91 and the first potential difference (70 V) in the second filtration device 92.

FIG. 9 is an electrical equivalent circuit diagram showing the first filtration device, the second filtration device, and the third filtration device according to the fourth embodiment. As shown in FIG. 9, the first power supply 51 and the third power supply 53 are constant voltage sources, and the second power supply 52 is a constant current source. The resistance component R1 and the capacitance component C are connected in parallel between the first electrode 31 and the second electrode 32. The resistance component R1 and the capacitance component C are equivalently represented by the filter medium 34 provided with a large number of apertures 34b. The resistance component R2 is connected between the first electrode 31 and the third electrode 33. The resistance component R2 is a resistance component equivalently represented by the slurry (raw material) 70 in the first filter chamber 30, the first intermediate treated material 79a, or the second intermediate treated material 79b.

The second power supply 52 may be a constant voltage power supply or a constant current power supply. In the present embodiment, the second power supply 52 is a constant current source, so the second potential V2 changes according to the filtering state of the first filtration device 91, the second filtration device 92, and the third filtration device 93, that is, according to the variation of the resistance component R1 of the filter medium 34 and the resistance component R2 of the first filter chamber 30. However, the second potential V2 has the same polarity as the polarities of the third particles 76, the fourth particles 77, and the fifth particles 78, and maintains a value greater than the absolute value of the first potential V1.

As shown in FIG. 14, in the first filtration device 91, when the slurry (raw material) 70 including the three types of particles to be separated (the third particles 76, the fourth particles 77, and the fifth particles 78) and the polar solvent 72 is supplied to the first filter chamber 30, a repulsive force (f1) is generated between the negatively charged third particles 76 and the first electrode 31 based on Coulomb's law expressed by the Equation (1) described above. An attractive force (f2) is generated between the negatively charged third particles 76 and the third electrode 33.

Specifically, in the first filtration device 91, a stronger repulsive force (f1) is generated on the negatively charged third particles 76 positioned closer to the first electrode 31, and a stronger attractive force (f2) is generated on the third particles 76 positioned closer to the third electrode 33. The vector sum F4 of the repulsive force (f1) and the attractive force (f2) generated in the third particles 76 acts in the direction indicated by the arrow, that is, in the direction away from the first electrode 31 and close to the third electrode 33. The negatively charged third particles 76 are moved toward the third electrode 33 by electrophoresis.

As a result, the first filtration device 91 can prevent the third particles 76 from depositing and forming a cake layer on the surface of the first electrode 31 and the surface of the filter medium 34. That is, it is possible to prevent an increase in the filtration resistance of the aperture 34b of the filter medium 34.

The positively charged water molecules 73 generate an attractive force with the first electrode 31. The attractive force F2 acting on the positively charged water molecules 73 acts in the direction indicated by the arrow, that is, in the direction from the third electrode 33 toward the first electrode 31. The positively charged water molecules 73 move to the first electrode 31 side. Here, by the potential difference between the first electrode 31 and the second electrode 32, an electric field E directed from the first electrode 31 to the second electrode 32 is formed to penetrate the filter medium 34 in the thickness direction.

The water molecules 73 that moved to the first electrode 31 side are subjected to force by the electric field, pulled toward the second electrode 32 side, and passed through the filter medium 34. As the positively charged water molecules 73 move, uncharged water molecules are also dragged toward the second electrode 32, forming an electroosmotic flow. As a result, the polar solvent 72 containing the positively charged water molecules 73 flows into the second filter chamber 35. As described above, by electrophoresis, the third particles 76 are separated from the first electrode 31 and moved toward the third electrode 33, and the polar solvent 72 removed of the third particles 76 is discharged, and accordingly, it is possible to increase the concentration of the third particles 76 in the slurry (raw material) 70 in the first filter chamber 30 of the first filtration device 91. The first intermediate treated material 79a containing the fourth particles 77 and the fifth particles 78 is discharged as filtrate into the second filter chamber 35 of the first filtration device 91.

By controlling the electric field formed between the first electrode 31 and the second electrode 32, the particle level (particle diameter) passing through the filter medium 34 can also be controlled. For example, in the first filtration device 91, by applying a first potential V1=−20 V to the first electrode 31 and applying a second potential V2=−30 V to the second electrode 32, a barrier electric field E is formed between the first electrode 31 and the second electrode 32. As a result, the first filtration device 91 blocks the third particles 76 from passing through the filter medium 34 and allows the fourth particles 77 and the fifth particles 78 to pass through the filter medium 34. Therefore, the concentration of the third particles 76 in the slurry (raw material) 70 in the first filter chamber 30 can be increased.

That is, even when the filter medium 34 equivalent to a microfiltration membrane (MF membrane) is used, by controlling the electric field between the electrodes with the first power supply 51, the second power supply 52, and the third power supply 53, it is possible to change the particle diameter to be separated to an ultrafiltration membrane (UF membrane) or nanofiltration membrane (NF membrane) equivalent. The ultrafiltration membrane (UF membrane) is a filtration membrane having a diameter of opening of approximately 10 nm or more and 100 nm or less. The nanofiltration membrane (NF membrane) is a filtration membrane having the diameter of opening of approximately 1 nm or more and 10 nm or less.

As shown in FIG. 15, in the second filtration device 92, the first intermediate treated material 79a containing the fourth particles 77 and the fifth particles 78 from the second filter chamber 35 of the first filtration device 91 is introduced into the first filter chamber 30. As shown in FIG. 15, in the second filtration device 92, a stronger repulsive force (f1) is generated on the negatively charged fourth particles 77 positioned closer to the first electrode 31, and a stronger attractive force (f2) is generated on the fourth particles 77 positioned closer to the third electrode 33. The vector sum F5 of the repulsive force (f1) and the attractive force (f2) generated in the fourth particles 77 acts in the direction indicated by the arrow, that is, in the direction away from the first electrode 31 and close to the third electrode 33. The negatively charged fourth particles 77 are moved toward the third electrode 33 by electrophoresis.

As a result, the second filtration device 92 can prevent the fourth particles 77 from depositing and forming a cake layer on the surface of the first electrode 31 and the surface of the filter medium 34. That is, it is possible to prevent an increase in the filtration resistance of the aperture 34b of the filter medium 34.

For example, in the second filtration device 92, by applying a first potential V1=−40 V to the first electrode 31 and applying a second potential V2=−50 V to the second electrode 32, a barrier electric field E is formed between the first electrode 31 and the second electrode 32. As a result, the second filtration device 92 blocks the negatively charged fourth particles 77 from passing through the filter medium 34, and allows the fifth particles 78 smaller than the diameter of the fourth particles 77 to pass through the filter medium 34. Therefore, in the second filtration device 92, the concentration of the fourth particles 77 in the first intermediate treated material 79a in the first filter chamber 30 can be increased. The second intermediate treated material 79b containing the fifth particles 78 is discharged as filtrate into the second filter chamber 35 of the second filtration device 92.

As shown in FIG. 16, in the third filtration device 93, the second intermediate treated material 79b containing the fifth particles 78 from the second filter chamber 35 of the second filtration device 92 is introduced into the first filter chamber 30. As shown in FIG. 16, a stronger repulsive force (f1) is generated on the negatively charged fifth particles 78 positioned closer to the first electrode 31, and a stronger attractive force (f2) is generated on the fifth particles 78 positioned closer to the third electrode 33. The vector sum F6 of the repulsive force (f1) and the attractive force (f2) generated in the fifth particles 78 acts in the direction indicated by the arrow, that is, in the direction away from the first electrode 31 and close to the third electrode 33. The negatively charged fifth particles 78 are moved toward the third electrode 33 by electrophoresis.

As a result, the third filtration device 93 can prevent the fifth particles 78 from depositing and forming a cake layer on the surface of the first electrode 31 and the surface of the filter medium 34. That is, it is possible to prevent an increase in the filtration resistance of the aperture 34b of the filter medium 34. The third intermediate treated material 79c is discharged as clear filtrate into the second filter chamber 35 of the third filtration device 93.

For example, in the third filtration device 93, by applying a first potential V1=−60 V to the first electrode 31 and applying a second potential V2=−70 V to the second electrode 32, a barrier electric field E is formed between the first electrode 31 and the second electrode 32. As a result, the third filtration device 93 blocks the fifth particles 78 from passing through the filter medium 34. Therefore, the concentration of the fifth particles 78 in the second intermediate treated material 79b in the first filter chamber 30 can be increased.

Thus, the first filtration device 91, the second filtration device 92 and the third filtration device 93 can separate the third particles 76, the fourth particles 77 and the fifth particles 78, respectively by a combination of the electrophoresis in which the third particles 76, the fourth particles 77, and the fifth particles 78 are moved by the Coulomb force F (the repulsive force generated between the third particles 76 and the first electrode 31) between the first electrode 31 and the third electrode 33 and the electroosmosis in which the water molecules 73 are moved by the electric field between the first electrode 31 and the second electrode 32 and passed through the filter medium 34. The first electrode 31 serves both as an electrophoretic electrode and an electroosmotic electrode. As a result, compared to the method of simply applying pressure to the slurry (raw material) 70, the first intermediate treated material 79a, and the second intermediate treated material 79b to separate the third particles 76, the fourth particles 77 and the fifth particles 78 having a particle size greater than the apertures 34b of the filter medium 34, it is possible to prevent the formation of a cake layer on the surface of the first electrode 31 and the surface of the filter medium 34, and also improve the filtration rate several times to ten times or more.

As a result, compared to the method of simply applying pressure to the slurry (raw material) 70, the first intermediate treated material 79a, and the second intermediate treated material 79b, it is possible to increase the degree of concentration of the third particles 76, the fourth particles 77 and the fifth particles 78 in each first filter chamber 30. The frequency of cleaning and replacement of the filter medium 34 can be reduced, and the slurry (raw material) 70, the first intermediate treated material 79a, or the second intermediate treated material 79b can be filtered efficiently. Alternatively, compared to simply applying pressure to the slurry (raw material) 70, the first intermediate treated material 79a, or the second intermediate treated material 79b for filtration, it is possible to reduce the volume of the first filter chamber 30 and the area of the filter medium 34, and still achieve the filtration rate equivalent to that of the related filter. That is, the first filtration device 91, the second filtration device 92, and the third filtration device 93 can achieve size reduction.

The configurations of the first filtration device 91, the second filtration device 92, and the third filtration device 93 described above are merely examples, and can be changed as appropriate. For example, the negative filter plate formed by stacking the first electrode 31, the filter medium 34, and the second electrode 32, and the third electrode 33 are arranged to face each other in a parallel plate shape. Aspects are not limited thereto, and the negative filter plate formed by stacking the first electrode 31, the filter medium 34 and the second electrode 32, and the third electrode 33 may each have a curved surface. The shape and arrangement of the negative filter plate and the third electrode 33 can be appropriately changed according to the shape and structure of the first filtration device 91, the second filtration device 92 and the third filtration device 93. The concentrations of the slurry (raw material) 70, the first intermediate treated material 79a, and the second intermediate treated material 79b supplied to the first filter chamber 30 are not particularly limited, and the first filtration device 91, the second filtration device 92 and the third filtration device 93 can be changed according to the field to be applied.

In the fourth embodiment, the internal pressure of the first filter chamber 30 is pressurized and is higher than the internal pressure of the second filter chamber 35. As another aspect, by reducing the internal pressure of the second filter chamber 35 to a negative pressure such as by vacuuming, the internal pressure of the first filter chamber 30 may be made relatively higher than the internal pressure of the second filter chamber 35.

The first potential V1, the second potential V2, and the third potential V3 are preferably changed as appropriate according to the type of the target to be separated, that is, the third particles 76, the fourth particles 77 and the fifth particles 78, and the required filtration characteristics.

The first filtration device 91, the second filtration device 92 and the third filtration device 93 may not include the third power supply 53. Here, the third electrode 33 is connected to the reference potential GND, for example. If the third electrode 33 is connected to the reference potential GND, the size of the first filtration device 91, the second filtration device 92, and the third filtration device 93 can be reduced compared to the case in which the first electrode 31, the second electrode 32, and the third electrode 33 are each provided with power supplies.

The first intermediate treated material 79a, the second intermediate treated material 79b, and the third intermediate treated material (filtrate) 79c discharged from the first filtration device 91, the second filtration device 92, and the third filtration device 93 are not necessarily conveyed by the pressurizing device, and may be conveyed manually by an operator, for example. That is, the method of filtration using the filtration system 300A includes supplying the first intermediate treated material 79a in the second filter chamber 35 of the first filtration device 91 to the first filter chamber 30 of the second filtration device 92, supplying the second intermediate treated material 79b in the second filter chamber 35 of the second filtration device 92 to the first filter chamber 30 of the third filtration device 93, and returning the third intermediate treated material (filtrate) 79c in the second filter chamber 35 of the third filtration device 93 to the tank 80.

Here, for the filtration system 300A of FIG. 12A, an embodiment will be described in which the first filtration device 91, the second filtration device 92, and the third filtration device 93 are arranged in series. The filtration system of the present embodiment is not limited thereto, and a plurality of filtration devices may be arranged in series. When the filtration system of the present embodiment further includes a plurality of filtration devices arranged in series, it is possible to separate the slurry (raw material) 70 containing four or more components having different particle diameters in the slurry as the targets to be separated.

When the slurry contains two components having different particle sizes, it is preferable that the filtration system 300B includes the first filtration device 91 and the second filtration device 92, as shown in FIG. 12B.

As described above, as shown in FIGS. 12A and 12B, the filtration systems 300A and 300B of the fourth embodiment include at least the first filtration device 91 and the second filtration device 92. Each of the first filtration device 91 and the second filtration device 92 includes the first electrode 31 provided with the plurality of first openings 31b, the second electrode 32 provided with the plurality of second openings 32b and provided to face the one surface of the first electrode 31, the filter medium 34 provided with the plurality of apertures 34b and provided between the first electrode 31 and the second electrode 32, the first filter chamber 30 provided in contact with the other surface of the first electrode 31, the third electrode 33 provided in the first filter chamber 30 and facing the first electrode 31, and the second filter chamber 35 provided in contact with the other surface of the second electrode 32. The intermediate treated material (the first intermediate treated material 79a) in the second filter chamber 35 of the first filtration device 91 is supplied to the first filter chamber 30 of the second filtration device 92.

Accordingly, in the first filtration device 91 and the second filtration device 92, the particles are moved in the direction from the first electrode 31 toward the third electrode 33 by the Coulomb force F (repulsive force generated between the third particles 76 and the first electrode 31) generated in the particles between the first electrode 31 and the third electrode 33. By the electrophoresis, the formation of a cake layer on the surface of the first electrode 31 and the surface of the filter medium 34 can be prevented. It is possible to separate the particles by the electroosmosis in which the water molecules 73 are moved by an electric field between the first electrode 31 and the second electrode 32 and passed through the filter medium 34, and increase the degree of concentration of the particles of the slurry (raw material) 70 in the first filter chamber 30. As a result, compared to the method for simply applying pressure to the slurry (raw material) 70 to separate the particles having a particle size greater than the apertures 34b of the filter medium 34, the filtration rate can be improved several times to ten times or more.

In the filtration system 300B, the absolute value of the second potential V2 of the second electrode 32 is greater than the absolute value of the first potential V1 of the first electrode 31. A first potential difference between the first potential V1 and the third potential V3 of the third electrode 33 is greater than a second potential difference between the first potential V1 and the second potential V2. The first potential difference in the second filtration device 92 is greater than the first potential difference in the first filtration device 91.

Accordingly, even when the distance between the first electrode 31 and the third electrode 33 facing each other with the filter medium 34 interposed therebetween is greater than the distance between the first electrode 31 and the second electrode 32, by electrophoresis, the third particles 76 can be moved satisfactorily to the third electrode 33 side. Different particles are separated in each of the first filtration device 91 and the second filtration device 92. The filtration system 300B can separately separate the third particles 76 and the fourth particles 77 from the slurry (raw material) 70 containing two types of particles.

As shown in FIG. 12B, the filtration system 300B further includes the second pressurizing device 96 for supplying the intermediate treated material (the first intermediate treated material 79a) in the second filter chamber 35 of the first filtration device 91 to the first filter chamber 30 of the second filtration device 92.

Accordingly, it is possible to increase the pressure of the first filter chamber 30 in the second filtration device 92. Therefore, the filtration system 300B can further improve the filtration rate of the second filtration device 92.

As shown in FIG. 12A, the filtration system 300A further includes the third filtration device 93. The third filtration device 93 includes the first electrode 31 provided with the plurality of first openings 31b, the second electrode 32 provided with the plurality of second openings 32b and provided to face one surface of the first electrode 31, The filter medium 34 provided with the plurality of apertures 34b and provided between the first electrode 31 and the second electrode 32, the first filter chamber 30 provided in contact with the other surface of the first electrode 31, the third electrode 33 provided in the first filter chamber 30 and facing the first electrode 31, and the second filter chamber 35 provided in contact with the other surface of the second electrode 32. In the third filtration device 93, the first potential difference between the first potential V1 of the first electrode 31 and a third potential V3 of the third electrode 33 is greater than the second potential difference between the first potential V1 and the second potential V2 of the second electrode 32. The intermediate treated material (second intermediate treated material 79b) in the second filter chamber 35 in the second filtration device 92 is supplied to the first filter chamber 30 in the third filtration device 93. The first potential difference in the third filtration device 93 is greater than the first potential difference in the second filtration device 92.

Accordingly, different particles are separated in each of the first filtration device 91, the second filtration device 92 and the third filtration device 93. The filtration system 300A can separate the third particles 76, the fourth particles 77 and the fifth particles 78 from the slurry (raw material) 70 containing three types of particles.

First Modification of Fourth Embodiment

Figure 17:
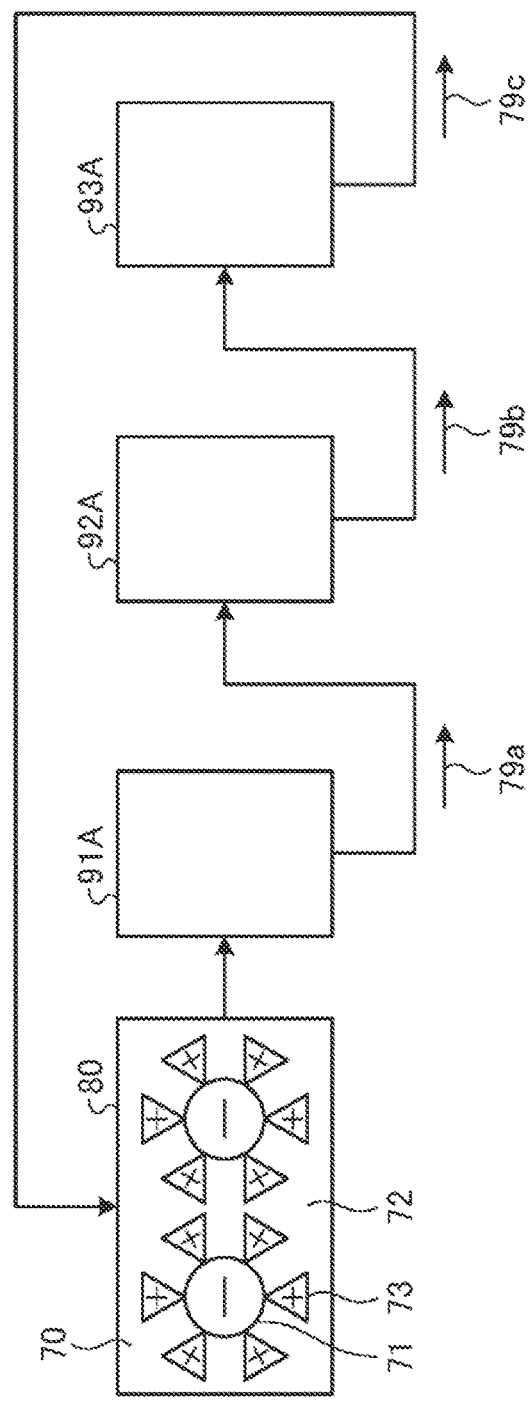
FIG. 17 is a schematic diagram schematically showing a configuration example of a filtration system according to a first modification of the fourth embodiment.
Figure 18:
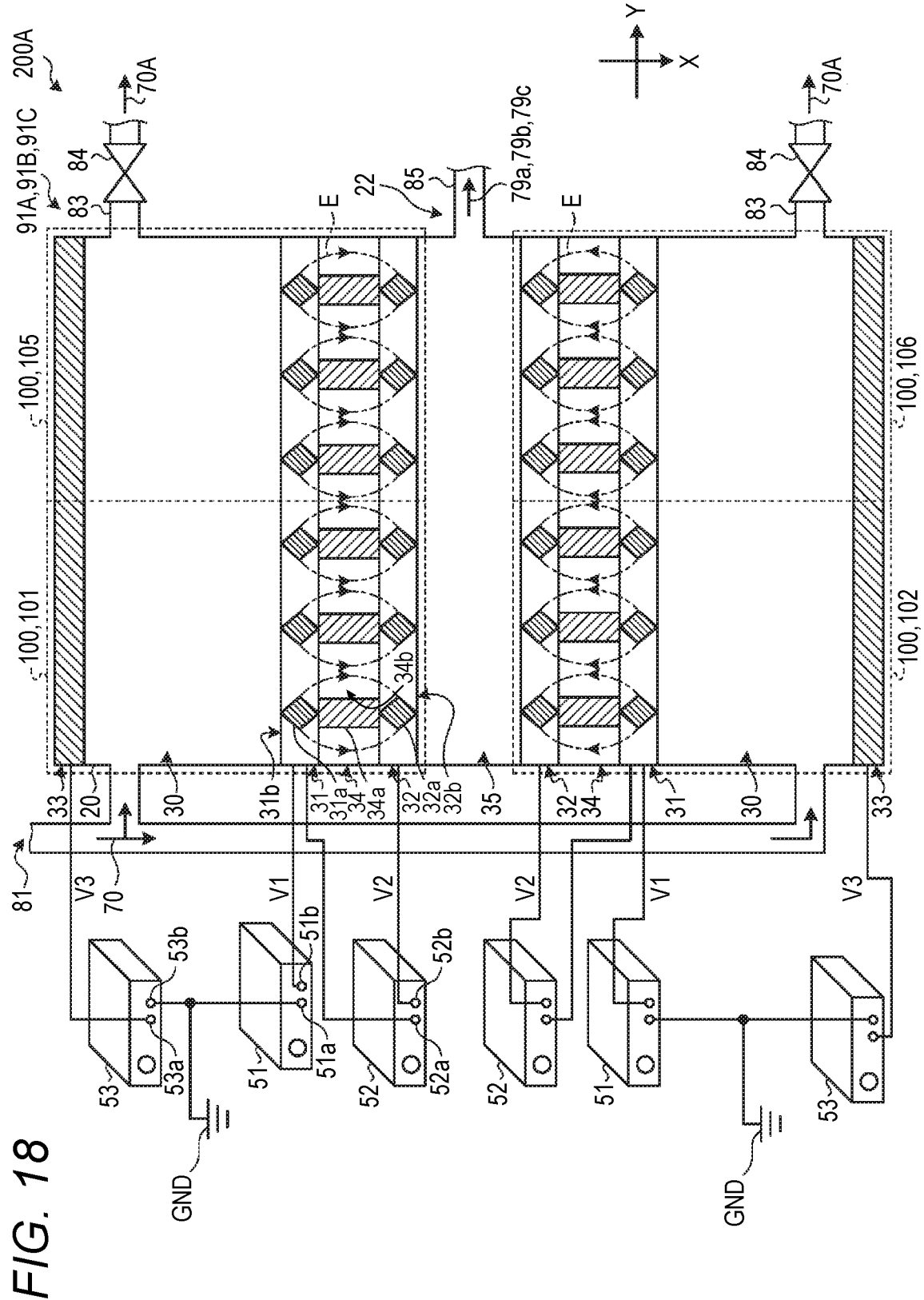
FIG. 18 is a cross-sectional view schematically showing a configuration example of the filtration system according to the first modification of the fourth embodiment.

FIG. 17 is a schematic diagram schematically showing a configuration example of a filtration system according to a first modification of the fourth embodiment. FIG. 18 is a cross-sectional view schematically showing a configuration example of the filtration system according to the first modification of the fourth embodiment. Note that the same components as those described in the embodiment described above are designated by the same reference numerals, and duplicate description will be omitted.

As shown in FIG. 17, a filtration system 200A according to the first modification of the fourth embodiment includes a first filtration device 91A, a second filtration device 92A, and a third filtration device 93A that are connected to each other in series. As shown in FIG. 18, each of the first filtration device 91A, the second filtration device 92A, and the third filtration device 93A includes a casing 20, four filtration units 100 arranged inside the casing 20, the second filter chamber 35, two first power supplies 51, two second power supplies 52, and two third power supplies 53. The four filtration units 100 include the filtration unit 101, the filtration unit 102, the filtration unit 105 and the filtration unit 106. The filtration unit 101 and the filtration unit 102 are arranged side by side in one direction X. The filtration unit 105 and the filtration unit 106 are arranged side by side in one direction X. The filtration unit 101 and the filtration unit 105 are arranged side by side in another direction Y orthogonal to one direction X. The filtration unit 102 and the filtration unit 106 are arranged side by side in another direction Y. Each filtration unit 100 includes the first filter chamber 30, the first electrode 31, the second electrode 32, the third electrode 33 and the filter medium 34.

The first electrode 31, the second electrode 32, the third electrode 33, and the filter medium 34 included in one filtration unit 100 are shared with the filtration unit 100 adjacent thereto in another direction Y. In other words, one first electrode 31, one second electrode 32, one third electrode 33 and one filter medium 34 are shared by the filtration units 100 adjacent to each other in another direction Y (a set of the filtration unit 101 and the filtration unit 105, and a set of the filtration unit 102 and the filtration unit 106).

In the filtration unit 101 and the filtration unit 105, a plurality of electrodes are arranged in order of the third electrode 33, the first electrode 31, and the second electrode 32 in one direction X (from top toward bottom in FIG. 18). In the filtration unit 102 and the filtration unit 106, a plurality of electrodes are arranged in order of the second electrode 32, the first electrode 31, and the third electrode 33 in one direction X (from top toward bottom in FIG. 18).

The slurry supply unit 81, the first discharge unit 83 and the second discharge unit 85 are connected to the casing 20. The slurry supply unit 81 is a pipe for supplying the slurry (raw material) 70, the first intermediate treated material 79a or the second intermediate treated material 79b to the first filter chamber 30. The first discharge unit 83 is a pipe for discharging a part of the concentrated slurry 70A from the first filter chamber 30. The first discharge unit 83 is provided at a position different from the slurry supply unit 81. The first discharge unit 83 includes the valve 84. When the valve 84 is open, the first discharge unit 83 discharges a part of the concentrated slurry 70A in the first filter chamber 30. The concentrated slurry 70A is the concentrated slurry (raw material) 70 from which the target to be separated is removed. The second discharge unit 85 is a pipe for discharging the first intermediate treated material 79a, the second intermediate treated material 79b, or the third intermediate treated material 79c in the second filter chamber 35 from the second filter chamber 35. The second filter chamber 35 is surrounded by the inner wall of the casing 20 and the two second electrodes 32. The second filter chamber 35 is arranged between two filtration units 100 arranged in the one direction X.

In the first filtration device 91A, by driving the electrodes, the vector sum F4 of the generated repulsive force and attractive force acts on the third particles 76 (see FIG. 14) of the slurry (raw material) 70, thus generating a concentration gradient in the state of dispersion of the third particles 76. The slurry (raw material) 70 with the separated third particles 76 are passed through the first electrode 31, the filter medium 34 and the second electrode 32 in order, and flows into the second filter chamber 35 as the first intermediate treated material 79a. The first intermediate treated material 79a in the second filter chamber 35 of the first filtration device 91A is supplied to the second filtration device 92A through the second discharge unit 85.

In the second filtration device 92A, by driving the electrodes, the vector sum F5 of the generated repulsive force and attractive force acts on the fourth particles 77 (see FIG. 15) of the first intermediate treated material 79a, thus generating a concentration gradient in the state of dispersion of the fourth particles 77. The first intermediate treated material 79a with the separated fourth particles 77 are passed through the first electrode 31, the filter medium 34 and the second electrode 32 in order, and flows into the second filter chamber 35 as the second intermediate treated material 79b. The second intermediate treated material 79b in the second filter chamber 35 of the second filtration device 92A is supplied to the third filtration device 93A through the second discharge unit 85.

In the third filtration device 93A, by driving the electrodes, the vector sum F6 of the generated repulsive force and attractive force acts on the fifth particles 78 (see FIG. 16) of the second intermediate treated material 79b, thus generating a concentration gradient in the state of dispersion of the fifth particles 78. The second intermediate treated material 79b with the separated fifth particles 78 are passed through the first electrode 31, the filter medium 34, and the second electrode 32 in order, and flows into the second filter chamber 35 as the third intermediate treated material (filtrate) 79c. The third intermediate treated material (filtrate) 79c in the second filter chamber 35 of the third filtration device 93A is returned to the tank 80 where the slurry (raw material) 70 is stored, through the second discharge unit 85 (see FIG. 17). The third intermediate treated material (filtrate) 79c is the polar solvent 72 of the clear filtrate.

In the filtration system 200A, the plurality of filtration units 100 may be arranged side by side in a direction (a depth direction of the paper surface in FIG. 18) orthogonal to both one direction X and another direction Y. That is, the plurality of filtration units 100 may be arranged three-dimensionally.

Each of the first filtration device 91A, the second filtration device 92A, and the third filtration device 93A may not necessarily include two first power supplies 51, two second power supplies 52, and two third power supplies 53, respectively. Among the first, second and third power supplies 51, 52 and 53, the number of power supplies that are constant voltage power supplies may be one. For example, when the first power supply 51 and the third power supply 53 are constant voltage power supplies, the number of first power supplies 51 may be one and the number of third power supplies 53 may be one. Here, the first power supply 51 is connected to a plurality of first electrodes 31 and the third power supply 53 is connected to a plurality of third electrodes 33.

Second Modification of Fourth Embodiment

Figure 19:
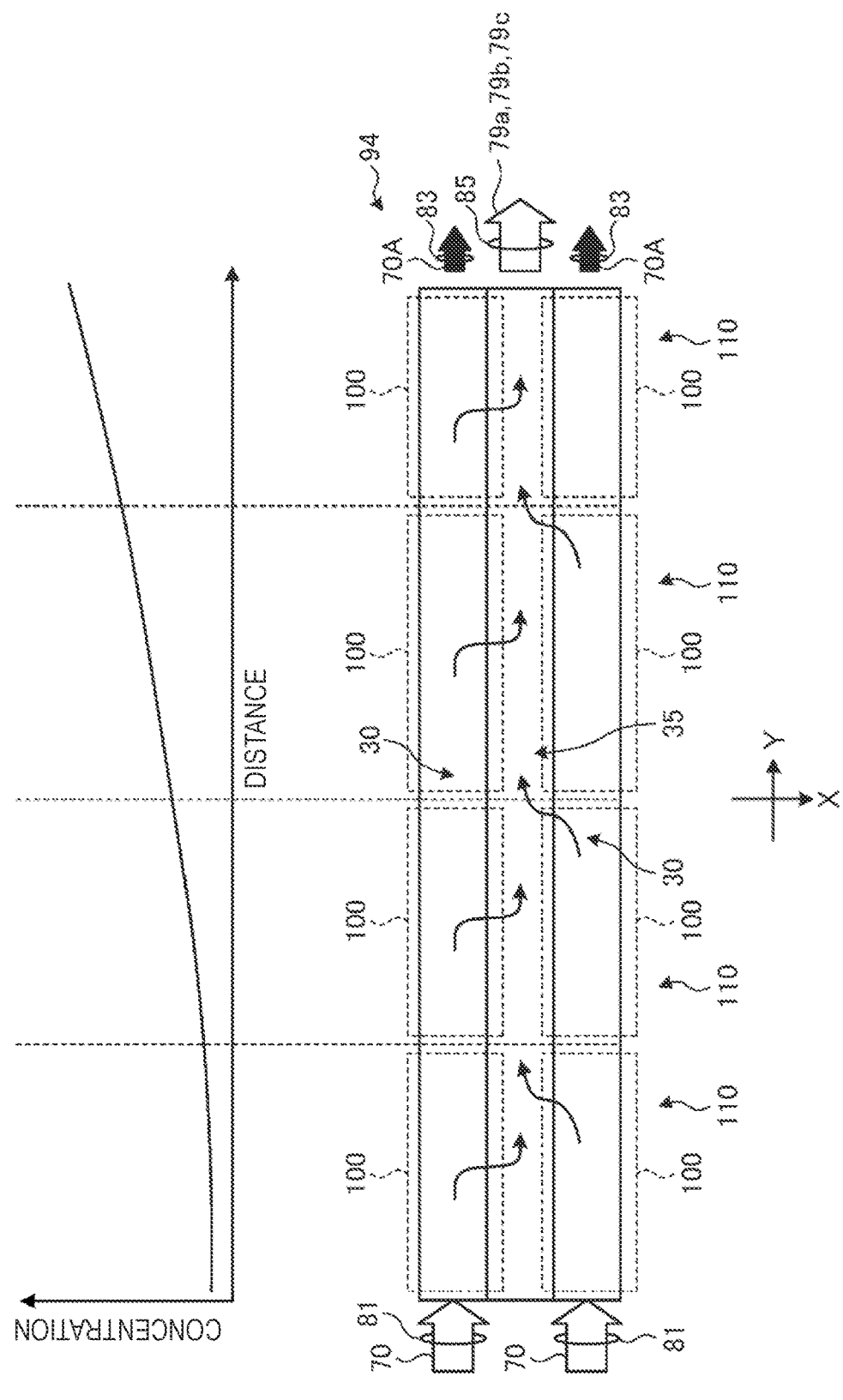
FIG. 19 is a cross-sectional view schematically showing a configuration example of a filtration system according to a second modification of the fourth embodiment.

FIG. 19 is a cross-sectional view schematically showing a configuration example of a filtration device according to a second modification of the fourth embodiment. As described above, the four filtration units 100 shown in FIG. 18 include the filtration unit 101, the filtration unit 102, the filtration unit 105, and the filtration unit 106. A filtration unit shown in FIG. 18 which includes the filtration unit 101, the filtration unit 102 and the second filter chamber 35 corresponds to the filtration unit 110 shown in FIG. 19. Likewise, a filtration unit shown in FIG. 18 which includes the filtration unit 105, the filtration unit 106 and the second filter chamber 35 corresponds to the filtration unit 110 shown in FIG. 19. In FIG. 18, two filtration units 110 shown in FIG. 19 are arranged in series in the direction Y. In the filtration device 94 shown in FIG. 19, four filtration units 110 are arranged in series in the direction Y.

FIG. 19 also shows a graph schematically showing the relationship of the concentration of the negatively charged particles in the first filter chamber 30 according to the Y direction distance of the filtration device 94. In the filtration device 94, the slurry 70 from the slurry supply unit 81 is introduced into the first filter chamber 30. The concentration of the negatively charged particles in the first filter chamber 30 increases as the slurry is moved from the slurry supply unit 81 toward the first discharge unit 83 that discharges the concentrated slurry 70A.

In the filtration device 94, a partition may be provided at the boundary between the first filter chambers 30 of the adjacent filtration units 110 to limit the flow rate moving between the filtration units 110.

Third Modification of Fourth Embodiment

Figure 20:
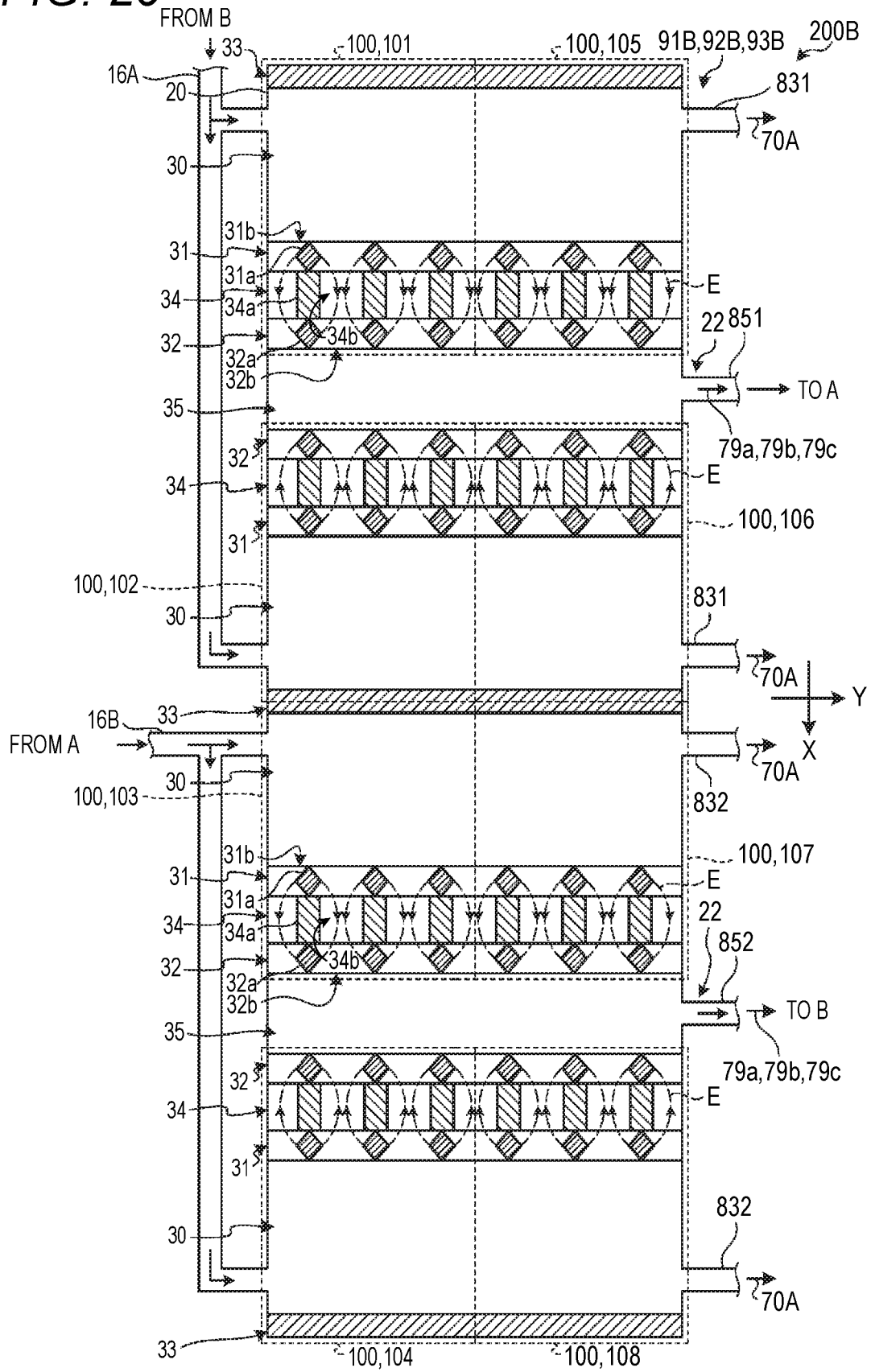
FIG. 20 is a schematic diagram of a first filtration device, a second filtration device, and a third filtration device according to a third modification of the fourth embodiment.

FIG. 20 is a schematic diagram of a first filtration device, a second filtration device, and a third filtration device according to a third modification of the fourth embodiment. Note that the same components as those described in the embodiment described above are designated by the same reference numerals, and duplicate description will be omitted.

As shown in FIG. 20, a filtration system 200B according to the third modification of the fourth embodiment includes a first filtration device 91B, a second filtration device 92B, and a third filtration device 93B that are connected to each other in series. Each of the first filtration device 91B, the second filtration device 92B, and the third filtration device 93B includes eight filtration units 100 and two second filter chambers 35. Since the configuration is the same as shown in FIG. 10, the illustration is omitted, but the filtration system 200B according to the third modification of the fourth embodiment includes four first power supplies 51, four second power supplies 52, and four third power supplies 53.

The eight filtration units 100 include the filtration units 101, 102, 103, 104, 105, 106, 107, and 108. The filtration units 101, 102, 103, and 104 are arranged side by side in one direction X. The filtration unit 105, 106, 107 and 108 are arranged side by side in one direction X. The filtration unit 103 and the filtration unit 107 are arranged side by side in another direction Y. The filtration unit 104 and the filtration unit 108 are arranged side by side in another direction Y.

The first electrode 31, the second electrode 32, the third electrode 33, and the filter medium 34 included in one filtration unit 100 are shared with the filtration unit 100 adjacent thereto in another direction Y. In other words, one first electrode 31, one second electrode 32, one third electrode 33 and one filter medium 34 are shared by the filtration units 100 adjacent to each other in another direction Y (a set of the filtration unit 103 and the filtration unit 107, and a set of the filtration unit 104 and the filtration unit 108).

In the filtration unit 103 and the filtration unit 107, a plurality of electrodes are arranged in order of the third electrode 33, the first electrode 31, and the second electrode 32 in one direction X (from top toward bottom in FIG. 20). In the filtration unit 104 and the filtration unit 108, a plurality of electrodes are arranged in order of the second electrode 32, the first electrode 31, and the third electrode 33 in one direction X (from top toward bottom in FIG. 20).

The third electrode 33 included in the filtration unit 102 is shared with the filtration unit 103 adjacent thereto in one direction X. The third electrode 33 included in the filtration unit 106 is shared with the filtration unit 107 adjacent thereto in one direction X. In other words, two first filter chambers 30 arranged side by side in one direction X is partitioned by the third electrode 33 shared by the filtration units 100 adjacent to each other in one direction X (the set of filtration unit 102 and filtration unit 103, and the set of filtration unit 106 and filtration unit 107).

The slurry (raw material) 70 is introduced into the supply unit 16A provided in the filtration unit of the first filtration device 91B and supplied into the first filter chambers 30 of the filtration units 101 and 102 of the first filtration device 91B.

The first discharge unit 831 provided in the first filter chamber 30 discharges a part of the concentrated slurry (raw material) 70A of the first filter chambers 30 of the filtration units 105 and 106. The second discharge unit 851 is positioned in the second filter chamber 35 between the filtration units 105 and 106. The second discharge unit 851 is a pipe for discharging the first intermediate treated material 79a, the second intermediate treated material 79b, or the third intermediate treated material 79c from the second filter chamber 35. The liquid discharged from the second discharge unit 851 is connected to the first filter chambers 30 of the filtration units 103 and 104.

The third discharge unit 832 discharges the concentrated slurry 70A of the first filter chambers 30 of the filtration units 107 and 108. The fourth discharge unit 852 is a pipe for discharging the first intermediate treated material 79a, the second intermediate treated material 79b, or the third intermediate treated material (filtrate) 79c in the second filter chamber 35 between the filtration unit 107 and the filtration unit 108 from the second filter chamber 35.

Note that the four filtration units 100 may not be necessarily arranged side by side in one direction X in the first filtration device 91B, the second filtration device 92B, and the third filtration device 93B. The number of filtration units 100 arranged in one direction X may be three, five or more. The third electrode 33 arranged between the two first filter chambers 30 arranged side by side in the one direction X may not be necessarily shared by the two filtration units 100. That is, two third electrodes 33 insulated from each other may be arranged between the two first filter chambers 30 arranged side by side in one direction X.

In the filtration system 200B, the plurality of filtration units 100 may be arranged side by side in a direction (a depth direction of the paper surface in FIG. 20) orthogonal to both one direction X and another direction Y. That is, the plurality of filtration units 100 may be arranged three-dimensionally.

Each of the first filtration device 91B, the second filtration device 92B, and the third filtration device 93B may not necessarily include four first power supplies 51, four second power supplies 52, and four third power supplies 53, respectively. Among the first, second and third power supplies 51, 52 and 53, the number of power supplies that are constant voltage power supplies may be one. For example, when the first power supply 51 and the third power supply 53 are constant voltage power supplies, the number of first power supplies 51 may be one and the number of third power supplies 53 may be one. Here, the first power supply 51 is connected to a plurality of first electrodes 31 and the third power supply 53 is connected to a plurality of third electrodes 33.

In FIG. 20, symbol A (filtrate (the first intermediate treated material 79a, the second intermediate treated material 79b, the third intermediate treated material 79c)) discharged from the second discharge unit 851 provided in the filtration units 105 and 106 of the first filtration device 91B is introduced from the slurry supply unit 16B of the lower filtration unit 103 and supplied into the first filter chambers 30 of the filtration units 103 and 104.

Symbol B (filtrate (the first intermediate treated material 79a, the second intermediate treated material 79b, the third intermediate treated material 79c) discharged from the fourth discharge unit 852 of the filtration units 107 and 108 of the first filtration device 91B is introduced into the supply part 16A provided in the filtration unit of the second filtration device 92B arranged in series, and supplied into the first filter chamber 30 of the filtration units 101 and 102 of the second filtration device 92B.

Fifth Embodiment

Figure 21:
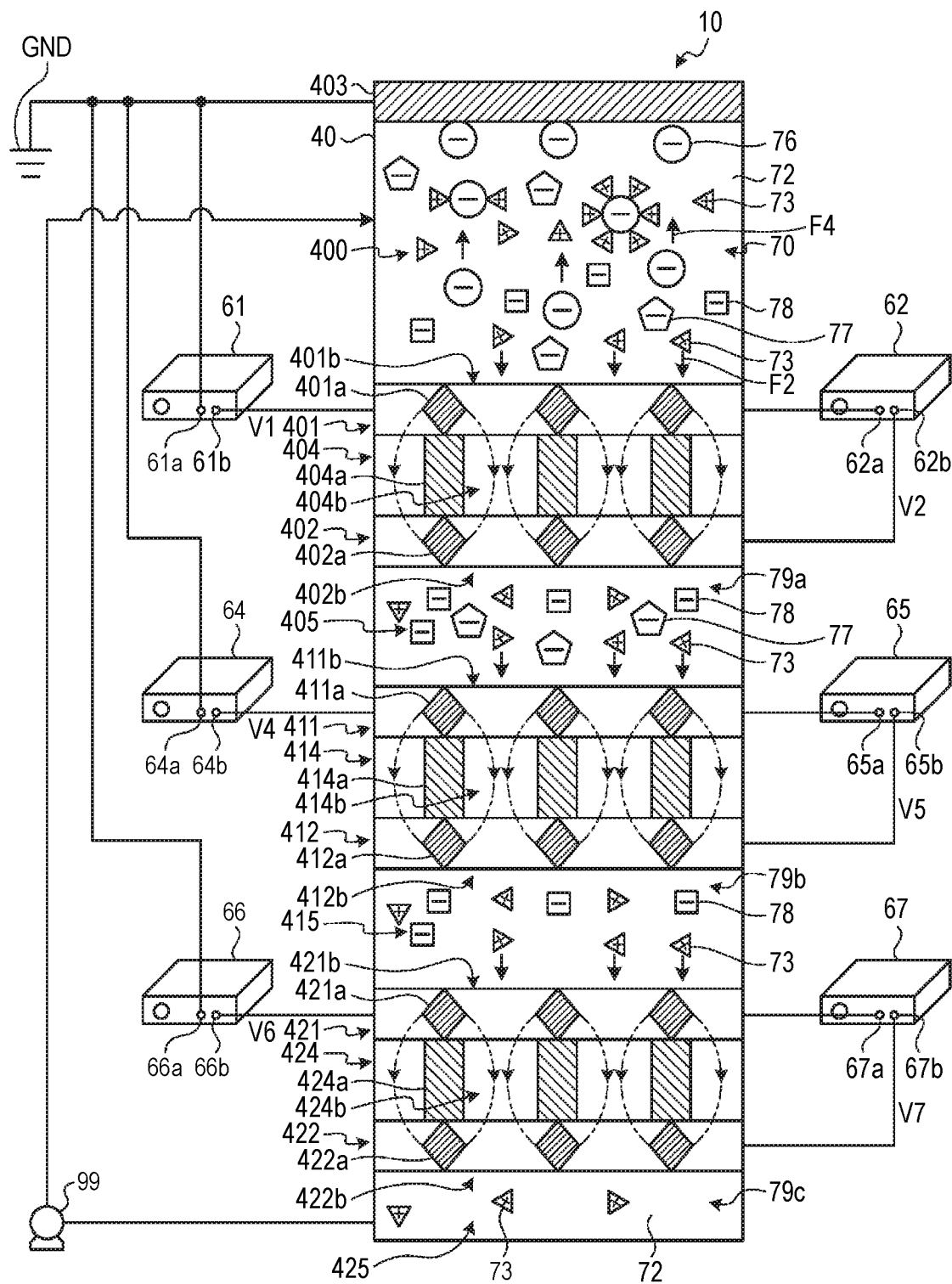
FIG. 21 is a schematic diagram of a filtration device according to a fifth embodiment.

FIG. 21 is a schematic diagram of a filtration device according to the fifth embodiment. Note that the same components as those described in the embodiment described above are designated by the same reference numerals, and duplicate description will be omitted.

As shown in FIG. 21, the filtration device 10 of the fifth embodiment includes a casing 40, a first filter chamber 400, a first electrode 401, a second electrode 402 and a third electrode 403, a first filter medium 404, a second filter chamber 405, a fourth electrode 411, a fifth electrode 412, a second filter medium 414, a third filter chamber 415, a sixth electrode 421, a seventh electrode 422, a third filter medium 424, a fourth filter chamber 425, a first power supply 61, a second power supply 62, a fourth power supply 64, a fifth power supply 65, a sixth power supply 66, and a seventh power supply 67.

The first filter chamber 400 is a space surrounded by the inner wall of the casing 40, the first electrode 401 and the third electrode 403. The first electrode 401 and the second electrode 402 are mesh-like electrodes. Specifically, the first electrode 401 includes a plurality of thin conductive wires 401a, and a plurality of first openings 401b are provided between the thin conductive wires 401a. The second electrode 402 includes a plurality of thin conductive wires 402a, and a plurality of second openings 402b are provided between the plurality of thin conductive wires 402a. The second electrode 402 is provided to face one surface (lower surface) of the first electrode 401 with the first filter medium 404 interposed therebetween. In other words, the first filter medium 404 is provided between the first electrode 401 and the second electrode 402. The first electrode 401 and the second electrode 402 are provided in direct contact with the first filter medium 404. The third electrode 403 is a plate-like member and is provided to face the other surface (upper surface) of the first electrode 401 with the first filter chamber 400 interposed therebetween.

The first filter medium 404 includes filtration membranes 404a and first apertures 404b. The plurality of first apertures 404b are provided in the filtration membranes 404a. The electric field acts on the filtration membranes 404a. For the first filter medium 404, a microfiltration membrane (MF membrane) is used, for example. In the fifth embodiment, the first filter medium 404 is made of an insulating material such as a resin material. The second filter chamber 405 is arranged on the side opposite to the first electrode 401 with the second electrode 402 interposed therebetween. The second filter chamber 405 is provided in contact with the second electrode 402.

The first electrode 401 is electrically connected to a second terminal 61b of the first power supply 61. The first electrode 401 is electrically connected to a first terminal 62a of the second power supply 62. The second electrode 402 is electrically connected to a second terminal 62b of the second power supply 62. The third electrode 403 and the first terminal 61a of the first power supply 61 are connected to the reference potential GND.

The first power supply 61 supplies the first electrode 401 with a first potential V1 having the same polarity as the third particles 76, the fourth particles 77 and the fifth particles 78. The first potential V1 is −20 V, for example. The second power supply 62 supplies the second electrode 402 with the second potential V2 having the same polarity as the polarities of the third particles 76, the fourth particles 77, and the fifth particles 78 and having a greater absolute value than the absolute value of the first potential V1. The second potential V2 is −30 V, for example. The potential difference (20 V) between the first potential V1 (−20 V) of the first electrode 401 and the third potential (0 V) of the third electrode 403 is greater than the potential difference (10 V) between the first potential V1 (−20 V) and the second potential V2 (−30 V) of the second electrode 402. The filtration device 10 further includes a third power supply, and the third power supply may supply the third electrode 403 with the third potential V3 (for example, +30 V) having a polarity different from the polarity of the third particles 76, the fourth particles 77 and the fifth particles 78. The absolute values of the first potential V1, the second potential V2, and the third potential V3 can be set within a range of 1 mV or more and 1000) V or less.

The fourth electrode 411 and the fifth electrode 412 are mesh-like electrodes. Specifically, the fourth electrode 411 includes a plurality of thin conductive wires 411a, and a plurality of fourth openings 411b are provided between the thin conductive wires 411a. The fourth electrode 411 and the second electrode 402 may be arranged with the second filter chamber 405 interposed therebetween. The fifth electrode 412 includes a plurality of thin conductive wires 412a, and a plurality of fifth openings 412b are provided between the thin conductive wires 412a. The fifth electrode 412 is provided to face one surface (lower surface) of the fourth electrode 411 with the second filter medium 414 interposed therebetween. In other words, the second filter medium 414 is provided between the fourth electrode 411 and the fifth electrode 412. The fourth electrode 411 and the fifth electrode 412 are provided in direct contact with the second filter medium 414. The fourth electrode 411 and the fifth electrode 412 are made of a titanium alloy or an alumite-treated aluminum alloy, for example.

The second filter medium 414 includes filtration membranes 414a and second apertures 414b. The plurality of second apertures 414b are provided in the filtration membranes 414a. The electric field acts on the filtration membranes 414a. The size of the second aperture 414b is the same as the first aperture 404b of the first filter medium 404. For the second filter medium 414, for example, a microfiltration membrane (MF membrane), an ultrafiltration membrane (UF membrane), or the like is used. The second filter medium 414 is made of an insulating material such as a resin material. The third filter chamber 415 is arranged on the side opposite to the fourth electrode 411 with the fifth electrode 412 interposed therebetween. The third filter chamber 415 is provided in contact with the fifth electrode 412.

The fourth electrode 411 is electrically connected to a second terminal 64b of the fourth power supply 64. The fourth electrode 411 is electrically connected to a first terminal 65a of the fifth power supply 65. The fifth electrode 412 is electrically connected to a second terminal 65b of the fifth power supply 65. A first terminal 64a of the fourth power supply 64 is connected to the reference potential GND.

The fourth power supply 64 supplies the fourth electrode 411 with a fourth potential V4 having the same polarity as the third particles 76, the fourth particles 77 and the fifth particles 78. The fourth potential V4 is −40 V, for example. The fifth power supply 65 supplies the fifth electrode 412 with the fifth potential V5 having the same polarity as the polarities of the third particles 76, the fourth particles 77, and the fifth particles 78 and having a greater absolute value than the absolute value of the fourth potential V4. The fifth potential V5 is −50 V, for example. The potential difference (40 V) between the fourth potential V4 (−40 V) of the fourth electrode 411 and the third potential V3 (0 V) is greater than the potential difference (10 V) between the fourth potential V4 (−40 V) and the fifth potential (−50 V) of the fifth electrode 412. The potential difference (40 V) between the fourth potential V4 (−40 V) and the third potential V3 (0 V) is greater than the potential difference (20 V) between the first potential V1 (−20) and the third potential V3 (0 V). The absolute values of the fourth potential V4 and the fifth potential V5 can be set within a range of 1 mV or more and 100) V or less.

The sixth electrode 421 and the seventh electrode 422 are mesh-like electrodes. Specifically, the sixth electrode 421 includes a plurality of thin conductive wires 421a, and a plurality of sixth openings 421b are provided between the thin conductive wires 421a. The sixth electrode 421 and the fifth electrode 412 may be arranged with the third filter chamber 415 interposed therebetween. The seventh electrode 422 includes a plurality of thin conductive wires 422a, and a plurality of seventh openings 422b are provided between the thin conductive wires 422a. The seventh electrode 422 is provided to face one surface (lower surface) of the sixth electrode 421 with the third filter medium 424 interposed therebetween. In other words, the third filter medium 424 is provided between the sixth electrode 421 and the seventh electrode 422. The sixth electrode 421 and the seventh electrode 422 are provided in direct contact with the third filter medium 424. The sixth electrode 421 and the seventh electrode 422 are made of a titanium alloy or an alumite-treated aluminum alloy, for example.

The third filter medium 424 includes filtration membranes 424a and third apertures 424b. The plurality of third apertures 424b are provided in the filtration membranes 424a. The electric field acts on the filtration membranes 424a. The size of the third aperture 424b is the same as that of the second aperture 414b of the second filter medium 414. For the third filter medium 424, a microfiltration membrane (MF membrane) is used, for example. The third filter medium 424 is made of an insulating material such as a resin material. The fourth filter chamber 425 is arranged on the side opposite to the sixth electrode 421 with the seventh electrode 422 interposed therebetween. The fourth filter chamber 425 is provided in contact with the seventh electrode 422.

The sixth electrode 421 is electrically connected to a second terminal 66b of the sixth power supply 66. The sixth electrode 421 is electrically connected to a first terminal 67a of the seventh power supply 67. The seventh electrode 422 is electrically connected to a second terminal 67b of the seventh power supply 67. A first terminal 66a of the sixth power supply 66 is connected to the reference potential GND.

The sixth power supply 66 supplies the sixth electrode 421 with a sixth potential V6 having the same polarity as the third particles 76, the fourth particles 77 and the fifth particles 78. The sixth potential V6 is −60 V, for example. The seventh power supply 67 supplies the seventh electrode 422 with the seventh potential V7 having the same polarity as the polarities of the third particles 76, the fourth particles 77, and the fifth particles 78 and having a greater absolute value than the absolute value of the sixth potential V6. The seventh potential V7 is −70 V, for example. The potential difference (60 V) between the sixth potential V6 (−60 V) of the sixth electrode 421 and the third potential V3 (0 V) is greater than the potential difference (10 V) between the sixth potential V6 (−60 V) and the seventh potential V7 (−70 V) of the seventh electrode 422. The potential difference (60 V) between the sixth potential V6 (−60 V) and the third potential V3 (0 V) is greater than the potential difference (40 V) between the fourth potential V4 (−40 V) and the third potential (0 V). The absolute values of the sixth potential V6 and the seventh potential V7 can be set within a range of 1 mV or more and 1000 V or less.

The pressurizing device 99 returns the filtrate 79c in the fourth filter chamber 425 to the first filter chamber 400. The pressurizing device 99 is a pressurizing pump, for example. Conveying the liquid using the pressurizing device 99 and piping are also referred to as a fluid conveyor. The pressurizing device 99 can apply to the first filter chamber 400 a pressure greater than the sum of the filtration resistances (pressure loss) of the first filter chamber 400, the second filter chamber 405 and the third filter chamber 415. The circulation flow rate of the pressurizing device 99 is equal to or less than the capacity of one of the first filter chamber 400, the second filter chamber 405 and the third filter chamber 415 that has the lowest filtration rate (obtained filtrate amount).

In the first filter chamber 400, a stronger repulsive force is generated on the third particles 76 positioned closer to the first electrode 401, and a stronger attractive force is generated on the third particles 76 positioned closer to the third electrode 403. The vector sum F4 of the generated repulsive force and attractive force in the negatively charged third particles 76 acts in the direction indicated by the arrow, that is, in the direction away from the first electrode 401 and close to the third electrode 403. The negatively charged third particles 76 are moved toward the third electrode 403 by electrophoresis.

As a result, in the first filter chamber 400, the third particles 76 are prevented from depositing and forming a cake layer on the surface of the first electrode 401 and the surface of the first filter medium 404. That is, it is possible to prevent an increase in the filtration resistance of the first aperture 404b of the first filter medium 404.

The positively charged water molecules 73 generate an attractive force with the first electrode 401. The attractive force F2 acting on the positively charged water molecules 73 acts in the direction indicated by the arrow, that is, in the direction from the third electrode 403 toward the first electrode 401. The positively charged water molecules 73 move to the first electrode 401 side. Here, by the potential difference between the first electrode 401 and the second electrode 402, an electric field directed from the first electrode 401 to the second electrode 402 is formed to penetrate the first filter medium 404 in the thickness direction.

The water molecules 73 that moved to the first electrode 401 side are subjected to force by the electric field E, pulled toward the second electrode 402 side, and passed through the first filter medium 404. As the positively charged water molecules 73 move, uncharged water molecules are also dragged toward the second electrode 402, forming an electroosmotic flow. As a result, the polar solvent 72 containing the positively charged water molecules 73 flows into the second filter chamber 405. As described above, by electrophoresis, the third particles 76 are separated from the first electrode 401 and moved toward the third electrode 403, and the polar solvent 72 removed of the third particles 76 is discharged, so that it is possible to increase the concentration of the third particles 76 in the slurry (raw material) 70 in the first filter chamber 400.

By controlling the electric field E formed between the first electrode 401 and the second electrode 402, the particle level (particle diameter) passing through the first filter medium 404 can also be controlled. For example, by applying a first potential V1=−20 V to the first electrode 401 and applying a second potential V2=−30 V to the second electrode 402, a barrier electric field E is formed between the first electrode 401 and the second electrode 402. As a result, the filtration device 10 blocks the third particles 76 from passing through the first filter medium 404 and allows the fourth particles 77 and the fifth particles 78 to pass through the first filter medium 404. Therefore, the concentration of the third particles 76 in the slurry (raw material) 70 in the first filter chamber 400 can be increased.

For example, by applying a fourth potential V4=−40 V to the fourth electrode 411 and applying a fifth potential V5=−50 V to the fifth electrode 412, a barrier electric field E is formed between the fourth electrode 411 and the fifth electrode 412. As a result, the filtration device 10 blocks the fourth particles 77 from passing through the second filter medium 414 and allows the fifth particles 78 to pass through the second filter medium 414. Therefore, the concentration of the fourth particles 77 in the first intermediate treated material 79a in the second filter chamber 405 can be increased.

For example, by applying a sixth potential V6=−60 V to the sixth electrode 421 and applying a seventh potential V7=−70 V to the seventh electrode 422, a barrier electric field is formed between the sixth electrode 421 and the seventh electrode 422. As a result, the filtration device 10 blocks the fifth particles 78 from passing through the third filter medium 424. Therefore, the concentration of the fifth particles 78 in the second intermediate treated material 79b in the third filter chamber 415 can be increased.

As described above, the filtration device 10 of the fifth embodiment includes the first electrode 401 provided with the plurality of first openings 401b, the second electrode 402 provided with the plurality of second openings 402b and provided to face the one surface of the first electrode 401, the first filter medium 404 provided with a plurality of first apertures 404b and provided between the first electrode 401 and the second electrode 402, the first filter chamber 400 provided in contact with the other surface of the first electrode 401, the third electrode 403 provided in the first filter chamber 400 and facing the first electrode 401, and the second filter chamber 405 provided in contact with the other surface of the second electrode 402. The filtration device 10 includes the fourth electrode 411 provided with a plurality of fourth openings 411b, in which the fourth electrode 411 and the second electrode 402 are arranged with the second filter chamber 405 interposed therebetween, the fifth electrode 412 provided with a plurality of fifth openings 412b and provided to face one surface of the fourth electrode 411, the second filter medium 414 provided with a plurality of second apertures 414b and provided between the fourth electrode 411 and the fifth electrode 412, and the third filter chamber 415 provided in contact with the other surface of the fifth electrode 412. The potential difference between the first potential V1 of the first electrode 401 and the third potential V3 of the third electrode 403 is greater than the potential difference between the first potential V1 and the second potential V2 of the second electrode 402. The potential difference between the fourth potential V4 of the fourth electrode 411 and the third potential V3 is greater than the potential difference between the fourth potential V4 and the fifth potential V5 of the fifth electrode 412. The potential difference between the fourth potential V4 and the third potential V3 is greater than the potential difference between the first potential V1 and the third potential V3.

Accordingly, in the filtration device 10, the particles are moved in the direction from the first electrode 401 toward the third electrode 403 by the Coulomb force F generated in the particles between the first electrode 401 and the third electrode 403. By the electrophoresis, the formation of a cake layer on the surface of the first electrode 401 and the surface of the first filter medium 404 can be prevented. It is possible to separate the particles by electroosmosis in which the water molecules 73 are moved by the electric field between the first electrode 401 and the second electrode 402 and passed through the first filter medium 404, and increase the degree of concentration of the particles of the slurry (raw material) 70 in the first filter chamber 400. As a result, compared to the method for simply applying pressure to the slurry (raw material) 70 to separate the particles having a particle size greater than the first apertures 404b of the first filter medium 404, the filtration rate can be improved several times to ten times or more. Different particles are separated in each of the first filter chamber 400 and the second filter chamber 405. The filtration device 10 can separate the third particles 76 and the fourth particles 77 from the slurry (raw material) 70 containing two types of particles.

The filtration device 10 of the fifth embodiment includes the sixth electrode 421 provided with a plurality of sixth openings 421b, in which the sixth electrode 421 and the fifth electrode 412 are arranged with the third filter chamber 415 interposed therebetween, the seventh electrode 422 provided with a plurality of seventh openings 422b and provided to face one surface of the sixth electrode 421, the third filter medium 424 provided with a plurality of third apertures 424b and provided between the sixth electrode 421 and the seventh electrode 422, and the fourth filter chamber 425 provided in contact with the other surface of the seventh electrode 422. The potential difference between the sixth potential V6 of the sixth electrode 421 and the third potential V3 is greater than the potential difference between the sixth potential V6 and the seventh potential V7 of the seventh electrode 422. The potential difference between the sixth potential V6 and the third potential V3 is greater than the potential difference between the fourth potential V4 and the third potential V3.

Accordingly, different particles are separated in each of the first filter chamber 400, the second filter chamber 405 and the third filter chamber 415. The filtration device 10 can separate the third particles 76, the fourth particles 77, and the fifth particles 78 from the slurry (raw material) 70 containing three types of particles.

The separated third particles 76, fourth particles 77, and fifth particles 78 are separately purified and recovered as valuable material such as health food additives, moisturizing cosmetics, and hair restorer components, according to the properties of the components.

Sixth Embodiment

Figure 22:
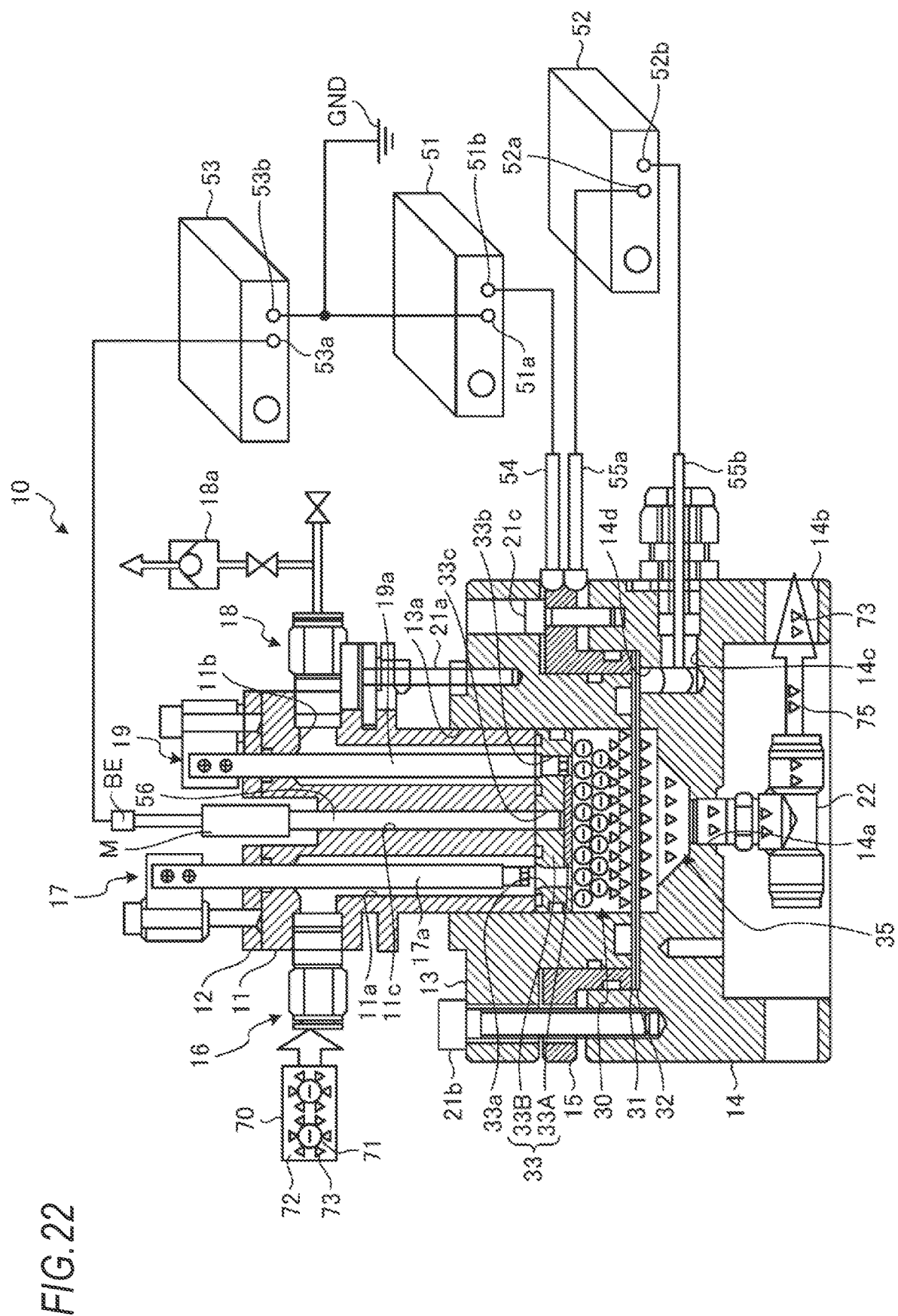
FIG. 22 is a cross-sectional view schematically showing a configuration example of a filtration device according to a sixth embodiment.
Figure 23:
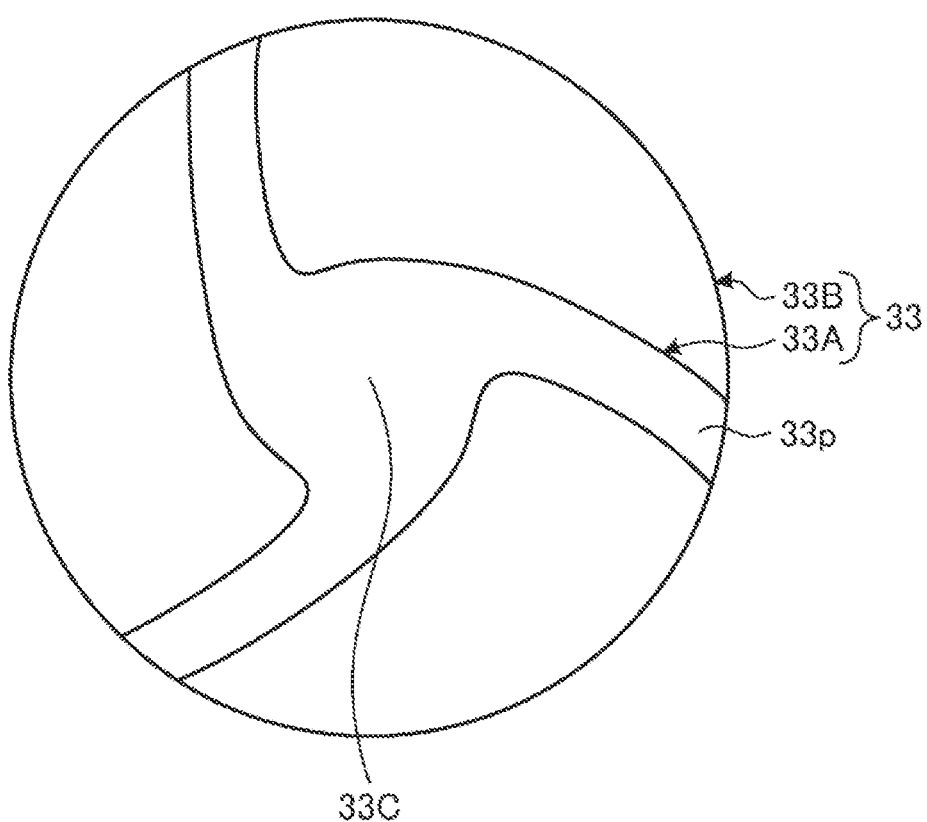
FIG. 23 is a plan view schematically showing a configuration example of a third electrode according to the sixth embodiment.

FIG. 22 is a cross-sectional view schematically showing a configuration example of a filtration device according to a sixth embodiment. FIG. 23 is a plan view schematically showing a configuration example of a third electrode according to the sixth embodiment. Note that the same components as those described in the embodiment described above are designated by the same reference numerals, and duplicate description will be omitted.

As shown in FIG. 22, in the filtration device 10 of the sixth embodiment, the third electrode 33 of the second embodiment is rotatable. The filtration device 10 of the sixth embodiment includes, in addition to the configuration of the first embodiment, a motor M and an electrode brush BE capable of supplying a potential even when the connection conductor 56 is rotated. The motor M rotates the connection conductor 56 and rotates the third electrode 33.

As shown in FIG. 23, the third electrode 33 includes a winged electrode 33A with a thickness of, for example, about 1 mm to 2 mm, which is exposed on the surface of a base material 33B made of resin. The winged electrode 33A includes a plurality of wing portions 33p and a central portion 33C electrically connecting the plurality of wing portions 33p. A connection conductor 56 is in contact with a rear surface of the central portion 33C, and the third electrode 33 is supplied with the third potential V3.

The first particles 71 stays around the third electrode 33. If the retention time of the first particles 71 is long, there is a possibility that the first particles 71 are denatured. Since the filtration device 10 of the sixth embodiment rotates the third electrode 33, the polar solvent 72 around the third electrode 33 can be stirred. As a result, it is possible to make the first particles 71 move and prevent the particles from staying in the vicinity of the surface of the third electrode 33. As a result, denaturation of the first particles 71 can be prevented, and the electric field distribution between the first electrode 31 and the third electrode 33 can be made uniform.

In the filtration device 10 of the sixth embodiment, the third electrode 33 of the embodiments described above other than that of the second embodiment may be rotatable. Although the third electrode 33 is rotated in the sixth embodiment, the first electrode 31 and the second electrode 32 may be rotated instead.

(Modification)

Note that the solvent of the slurry (raw material) 70 of the first to sixth embodiments is exemplified as the positively charged water molecules 73 that are polar solvents, but the present embodiment is not limited thereto, and non-polar solvents (for example, toluene, dioxane, ethylene glycol (EG), tetrahydrofuran (THF), oils (vegetable oil, mineral oil), and the like) may be used.

Note that the embodiments described above are provided for facilitating the understanding of the present disclosure, and are not to be construed as limiting the interpretation of the present disclosure. Variations/modifications are possible for the present disclosure without departing from its spirit, and equivalents thereof are also incorporated into the present disclosure.

(Supplementary Note)

The present embodiment includes the following configurations.

(1) A filtration device including
    a first electrode provided with a plurality of first openings;
    a second electrode provided with a plurality of second openings and provided to face one surface of the first electrode;
    a filter medium provided with a plurality of apertures and provided between the first electrode and the second electrode;
    a filter chamber provided in contact with the other surface of the first electrode and supplied with a material to be treated containing particles to be separated and a liquid, and a third electrode facing the first electrode across the filter chamber.

(2) The filtration device according to (1), in which a first potential having a same polarity as a polarity of the particles is supplied to the first electrode, and
    a second potential having the same polarity as the polarity of the particles and an absolute value different from an absolute value of the first potential is supplied to the second electrode.

(3) The filtration device according to (2), further including:
    a first power supply that supplies the first potential having the same polarity as the polarity of the particles to the first electrode; and
    a second power supply that supplies the second potential having the same polarity as the polarity of the particles to the second electrode, in which
    the third electrode is connected to a reference potential.

(4) The filtration device according to (3), in which the absolute value of the second potential is greater than the absolute value of the first potential, and
    a potential difference between the first potential and the reference potential is greater than a potential difference between the first potential and the second potential.

(5) The filtration device according to (3) or (4), in which the first power supply is a constant voltage source, and
    the second power supply is a constant current source.

(6) The filtration device according to (1), further including:
    a first power supply that supplies a first potential having the same polarity as the polarity of the particles to the first electrode;
    a second power supply that supplies a second potential having the same polarity as the polarity of the particles to the second electrode; and
    a third power supply that supplies a third potential having a polarity different from the polarity of the particles to the third electrode.

(7) The filtration device according to (6), in which the absolute value of the second potential is greater than the absolute value of the first potential, and
    a potential difference between the first potential and the third potential is greater than a potential difference between the first potential and the second potential.

(8) The filtration device according to (6) or (7), in which the first power supply and the third power supply are constant voltage sources, and
    the second power supply is a constant current source.

(9) The filtration device according to any one of (1) to (8), in which, in a direction perpendicular to the surface of the first electrode,
    the second electrode, the filter medium, the first electrode, the filter chamber, and the third electrode are stacked in this order, and a distance between the first electrode and the second electrode is less than a distance between the first electrode and the third electrode.

(10) The filtration device according to any one of (1) to (9), in which a size of the apertures is smaller than the first openings and the second openings.

(11) The filtration device according to any one of (1) to (10), further including:
    a side casing having a through hole, a lower casing supporting the side casing, and an upper casing inserted into the through hole of the side casing, in which
    outer edges of the first electrode, the second electrode, and the filter medium are interposed and fixed between the side casing and the lower casing,
    the third electrode is fixed to a surface of the upper casing facing the lower casing, and
    the filter chamber is formed in a space surrounded by the first electrode, the second electrode, the filter medium, the inner wall of the side casing, and the third electrode.

(12) The filtration device according to any one of (1) to (11), in which the third electrode is rotatable.

(13) A filtration device having a plurality of filtration units, in which the filtration unit includes:
    a first electrode provided with a plurality of first openings;
    a second electrode provided with a plurality of second openings and provided to face one surface of the first electrode,
    a filter medium provided with a plurality of apertures and provided between the first electrode and the second electrode;
    a first filter chamber provided in contact with the other surface of the first electrode; and
    a third electrode provided in the first filter chamber and facing the first electrode, in which two of the filtration units are arranged side by side in one direction, and include a second filter chamber provided between the two second electrodes.

(14) The filtration device according to (13), in which, in one of the filtration units, a plurality of electrodes are arranged in order of the third electrode, the first electrode, and the second electrode in the one direction, and
    in the other filtration units, a plurality of electrodes are arranged in order of the second electrode, the first electrode, and the third electrode in the one direction.

(15) The filtration device according to (13) or (14), in which the first filter chamber is connected to a supply unit for supplying the material to be treated and a first discharge unit provided at a position different from the supply unit and for discharging a part of the material to be treated.

(16) The filtration device according to any one of (13) to (15), in which the two filtration units are arranged side by side in another direction orthogonal to the one direction.

(17) The filtration device according to any one of (13) to (16), in which the second filter chamber is connected to a second discharge unit for discharging a filtrate present in the second filter chamber.

(18) The filtration device according to any one of (13) to (17), in which three or more of the filtration units are arranged side by side, and
    the two first filter chambers arranged side by side is partitioned by the third electrode shared by the filtration units adjacent to each other.

(19) The filtration device according to any one of (13) to (18), in which, in one filtration unit, an absolute value of the second potential of the second electrode is greater than an absolute value of the first potential of the first electrode, and a potential difference between the first potential and the third potential of the third electrode is greater than a potential difference between the first potential and the second potential.

(20) The filtration device according to any one of (13) to (19), including a first power supply that is a constant voltage power supply, in which one first power supply supplies a first potential to a plurality of the first electrodes.

(21) The filtration device according to any one of (13) to (20), in which, when the second power supply is a constant voltage power supply,
    one second power supply supplies a second potential to a plurality of the second electrodes.

(22) The filtration device according to any one of (13) to (21), including a third power supply that is a constant voltage power supply, in which one third power supply supplies a third potential to the plurality of the third electrodes.

(23) A filtration system including a first filtration device and a second filtration device, in which
    each of the first filtration device and the second filtration device includes:
        a first electrode provided with a plurality of first openings;
        a second electrode provided with a plurality of second openings and provided to face one surface of the first electrode,
        a filter medium provided with a plurality of apertures and provided between the first electrode and the second electrode;
        a first filter chamber provided in contact with the other surface of the first electrode;
        a third electrode provided in the first filter chamber and facing the first electrode; and
        a second filter chamber provided in contact with the other surface of the second electrode, and
    an intermediate treated material in the second filter chamber of the first filtration device is supplied to the first filter chamber of the second filtration device.

(24) The filtration system according to (23), in which an absolute value of a second potential of the second electrode is greater than an absolute value of a first potential of the first electrode,
    a first potential difference between the first potential and a third potential of the third electrode is greater than a second potential difference between the first potential and the second potential, and
    the first potential difference across the second filtration device is greater than the first potential difference across the first filtration device.

(25) The filtration system according to (23) or (24), further including a pressurizing device for supplying the intermediate treated material in the second filter chamber of the first filtration device to the first filter chamber of the second filtration device.

(26) The filtration system according to any one of (23) to (25), further including a third filtration device, in which
    the third filtration device includes:
        a first electrode provided with a plurality of first openings;
        a second electrode provided with a plurality of second openings and provided to face one surface of the first electrode;
        a filter medium provided with a plurality of apertures and provided between the first electrode and the second electrode;
        a first filter chamber provided in contact with the other surface of the first electrode;
        a third electrode provided in the first filter chamber and facing the first electrode; and
        a second filter chamber provided in contact with the other surface of the second electrode, and
    in the third filtration device, the first potential difference between the first potential of the first electrode and the third potential of the third electrode is greater than the second potential difference between the first potential and the second potential of the second electrode,
    the intermediate treated material in the second filter chamber in the second filtration device is supplied to the first filter chamber in the third filtration device, and
    the first potential difference across the third filtration device is greater than the first potential difference across the second filtration device.

(27) A filtration device including:
    a first electrode provided with a plurality of first openings;
    a second electrode provided with a plurality of second openings and provided to face one surface of the first electrode;
    a first filter medium provided with a plurality of first apertures and provided between the first electrode and the second electrode;
    a first filter chamber provided in contact with the other surface of the first electrode;
    a third electrode provided in the first filter chamber and facing the first electrode;
    a second filter chamber provided in contact with the other surface of the second electrode;
    a fourth electrode provided with a plurality of fourth openings, in which the fourth electrode and the second electrode are arranged with the second filter chamber interposed therebetween;

a fifth electrode provided with a plurality of fifth openings and provided to face one surface of the fourth electrode;

a second filter medium provided with a plurality of second apertures and provided between the fourth electrode and the fifth electrode; and a third filter chamber provided in contact with the other surface of the fifth electrode, in which a potential difference between a first potential of the first electrode and a third potential of the third electrode is greater than a potential difference between the first potential and a second potential of the second electrode, a potential difference between a fourth potential of the fourth electrode and the third potential is greater than a potential difference between the fourth potential and a fifth potential of the fifth electrode, and a potential difference between the fourth potential and the third potential is greater than a potential difference between the first potential and the third potential.

(28) The filtration device according to (27) including:

a sixth electrode provided with a plurality of sixth openings, in which the sixth electrode and the fifth electrode are arranged with the third filter chamber interposed therebetween;

a seventh electrode provided with a plurality of seventh openings and provided to face one surface of the sixth electrode;

a third filter medium provided with a plurality of third apertures and provided between the sixth electrode and the seventh electrode; and a fourth filter chamber provided in contact with the other surface of the seventh electrode, in which a potential difference between a sixth potential of the sixth electrode and the third potential is greater than a potential difference between the sixth potential and a seventh potential of the seventh electrode, and a potential difference between the sixth potential and the third potential is greater than the potential difference between the fourth potential and the third potential.

REFERENCE SIGNS LIST 10 filtration device
11 upper casing
12 lid portion
13 side casing
14 lower casing
15 conductor
16 slurry supply unit
17 slurry supply valve
18 air discharge unit
19 air discharge valve
22 discharge unit
30 first filter chamber
31 first electrode
31a, 32a thin conductive wires
31b first opening
32 second electrode
32b second opening
33 third electrode
34 filter medium
34a filtration membrane
34b aperture
35 second filter chamber
51 first power supply
52 second power supply
53 third power supply
70 slurry (raw material)
70A concentrated slurry
71 first particle (particle to be separated)
72 polar solvent
73 water molecules
74 second particles
75 filtrate
76 third particle
77 fourth particle
78 fifth particle
100, 101 to 108, 110 filtration unit
200A. 200B, 300A, 300B filtration system
F1 repulsive force generated in first particle
F2 attractive force acting on water molecules
F3 repulsive force and attractive force generated in first particle
F4 repulsive force and attractive force generated in third particle
F5 repulsive force and attractive force generated in fourth particle
F6 repulsive force and attractive force generated in fifth particle

The invention claimed is:

1. A filtration device comprising:
a first electrode provided with a plurality of first openings;
a second electrode provided with a plurality of second openings and provided to face one surface of the first electrode;
a filter medium provided with a plurality of apertures and provided between the first electrode and the second electrode;
a filter chamber provided in contact with the other surface of the first electrode and supplied with a material to be treated containing particles to be separated and a liquid;
a third electrode facing the first electrode across the filter chamber;
a first potential having a same polarity as a polarity of the particles is supplied to the first electrode; and
a second potential having the same polarity as the polarity of the particles and an absolute value different from an absolute value of the first potential is supplied to the second electrode.

2. The filtration device according to claim 1, further comprising:
a first power supply that supplies the first potential having the same polarity as the polarity of the particles to the first electrode; and
a second power supply that supplies the second potential having the same polarity as the polarity of the particles to the second electrode, wherein
the third electrode is connected to a reference potential.

3. The filtration device according to claim 1, further comprising:
a first power supply that supplies a first potential having the same polarity as the polarity of the particles to the first electrode;
a second power supply that supplies a second potential having the same polarity as the polarity of the particles to the second electrode; and
a third power supply that supplies a third potential having a polarity different from the polarity of the particles to the third electrode.

4. The filtration device according to claim 1, wherein
a size of the apertures is smaller than the first openings and the second openings.

5. The filtration device according to claim 1, further comprising:
- a side casing having a through hole, a lower casing supporting the side casing, and an upper casing inserted into the through hole of the side casing, wherein:
- outer edges of the first electrode, the second electrode, and the filter medium are interposed and fixed between the side casing and the lower casing;
- the third electrode is fixed to a surface of the upper casing facing the lower casing; and
- the filter chamber is formed in a space surrounded by the first electrode, the second electrode, the filter medium, the inner wall of the side casing, and the third electrode.

6. The filtration device according to claim 1, wherein the third electrode is rotatable.

7. The filtration device according to claim 1, in which the filter medium is a first filter medium, and the filter chamber is a first filter chamber, the device further comprising:
- a second filter chamber provided in contact with another surface of the second electrode;
- a fourth electrode provided with a plurality of fourth openings, wherein the fourth electrode and the second electrode are arranged with the second filter chamber interposed therebetween;
- a fifth electrode provided with a plurality of fifth openings and provided to face one surface of the fourth electrode;
- a second filter medium provided with a plurality of second apertures and provided between the fourth electrode and the fifth electrode; and
- a third filter chamber provided in contact with the other surface of the fifth electrode, wherein
- a potential difference between a first potential of the first electrode and a third potential of the third electrode is greater than a potential difference between the first potential and a second potential of the second electrode,
- a potential difference between a fourth potential of the fourth electrode and the third potential is greater than a potential difference between the fourth potential and a fifth potential of the fifth electrode, and
- a potential difference between the fourth potential and the third potential is greater than a potential difference between the first potential and the third potential.

8. The filtration device according to claim 7, further comprising:
- a sixth electrode provided with a plurality of sixth openings, wherein the sixth electrode and the fifth electrode are arranged with the third filter chamber interposed therebetween;
- a seventh electrode provided with a plurality of seventh openings and provided to face one surface of the sixth electrode;
- a third filter medium provided with a plurality of third apertures and provided between the sixth electrode and the seventh electrode; and
- a fourth filter chamber provided in contact with the other surface of the seventh electrode, wherein
- a potential difference between a sixth potential of the sixth electrode and the third potential is greater than a potential difference between the sixth potential and a seventh potential of the seventh electrode, and
- a potential difference between the sixth potential and the third potential is greater than the potential difference between the fourth potential and the third potential.

9. A filtration system comprising the filtration device according to claim 1 as a first filtration device, and a second filtration device, wherein the second filtration device includes
- a first electrode provided with a plurality of first openings,
- a second electrode provided with a plurality of second openings and provided to face one surface of the first electrode,
- a filter medium provided with a plurality of apertures and provided between the first electrode and the second electrode,
- a first filter chamber provided in contact with the other surface of the first electrode,
- a third electrode provided in the first filter chamber and facing the first electrode, and
- a second filter chamber provided in contact with the other surface of the second electrode, and
- an intermediate treated material in the second filter chamber of the first filtration device is supplied to the first filter chamber of the second filtration device.

10. The filtration system according to claim 9, further comprising a pressurizing device for supplying the intermediate treated material in the second filter chamber of the first filtration device to the first filter chamber of the second filtration device.

11. The filtration system according to claim 9, further comprising a third filtration device, wherein the third filtration device includes
- a first electrode provided with a plurality of first openings,
- a second electrode provided with a plurality of second openings and provided to face one surface of the first electrode,
- a filter medium provided with a plurality of apertures and provided between the first electrode and the second electrode,
- a first filter chamber provided in contact with the other surface of the first electrode,
- a third electrode provided in the first filter chamber and facing the first electrode, and
- a second filter chamber provided in contact with the other surface of the second electrode,
- in the third filtration device, the first potential difference between the first potential of the first electrode and the third potential of the third electrode is greater than the second potential difference between the first potential and the second potential of the second electrode,
- the intermediate treated material in the second filter chamber in the second filtration device is supplied to the first filter chamber in the third filtration device, and
- the first potential difference across the third filtration device is greater than the first potential difference across the second filtration device.

12. A filtration device including a plurality of filtration units, wherein
the filtration unit includes:
- a first electrode provided with a plurality of first openings;
- a second electrode provided with a plurality of second openings and provided to face one surface of the first electrode;
- a filter medium provided with a plurality of apertures and provided between the first electrode and the second electrode;
- a first filter chamber provided in contact with the other surface of the first electrode; and
- a third electrode provided in the first filter chamber and facing the first electrode, and two of the filtration units are arranged side by side in one direction, and include a second filter chamber provided between the two second electrodes.

13. The filtration device according to claim 12, wherein the first filter chamber is connected to a supply unit for supplying a material to be treated and a first discharge unit provided at a position different from the supply unit and for discharging a part of the material to be treated.

14. The filtration device according to claim 12, wherein the second filter chamber is connected to a second discharge unit for discharging a filtrate present in the second filter chamber.

* * * * *